United States Patent
Mihara

(10) Patent No.: US 8,149,522 B2
(45) Date of Patent: Apr. 3, 2012

(54) IMAGE FORMING OPTICAL SYSTEM AND ELECTRONIC IMAGE PICKUP APPARATUS USING THE SAME

(75) Inventor: Shinichi Mihara, Tama (JP)

(73) Assignee: Olympus Imaging Corp., Tokyo (JP)

( * ) Notice: Subject to any disclaimer, the term of this patent is extended or adjusted under 35 U.S.C. 154(b) by 0 days.

(21) Appl. No.: 13/066,062

(22) Filed: Apr. 5, 2011

(65) Prior Publication Data
US 2011/0181758 A1 Jul. 28, 2011

Related U.S. Application Data

(63) Continuation of application No. PCT/JP2009/067537, filed on Oct. 8, 2009.

(30) Foreign Application Priority Data

Oct. 9, 2008 (JP) ................. 2008-263187

(51) Int. Cl.
*G02B 13/18* (2006.01)
*G02B 3/02* (2006.01)
(52) U.S. Cl. .................. 359/716; 359/686; 359/784
(58) Field of Classification Search .............. 359/676, 359/686, 687, 688, 716, 784, 785
See application file for complete search history.

(56) References Cited

U.S. PATENT DOCUMENTS

| | | | | |
|---|---|---|---|---|
| 2,600,610 | A * | 6/1952 | Bertele | ............ 359/776 |
| 6,483,648 | B1 | 11/2002 | Yamanashi | |
| 2006/0109557 | A1 | 5/2006 | Maetaki | |
| 2008/0049333 | A1 | 2/2008 | Satori | |
| 2008/0117315 | A1 | 5/2008 | Ichikawa et al. | |
| 2008/0117523 | A1 | 5/2008 | Ichikawa et al. | |
| 2008/0130141 | A1 * | 6/2008 | Ishibashi | ............ 359/774 |

FOREIGN PATENT DOCUMENTS

| | | |
|---|---|---|
| JP | 2001-208964 | 1/2000 |
| JP | 2005-352265 | 1/2000 |
| JP | 2001-042212 | 2/2001 |

(Continued)

OTHER PUBLICATIONS

International Preliminary Report on Patentability, issued in corresponding International Application No. PCT/JP2009/067537.

(Continued)

*Primary Examiner* — Darryl J Collins
(74) *Attorney, Agent, or Firm* — Kenyon & Kenyon LLP

(57) ABSTRACT

There is provided an image forming optical system in which, it is possible to achieve both, the small-sizing and slimming of an optical system, and a favorable correction of various aberrations, mainly the chromatic aberration.

In an image forming optical system including a lens component in which, a shape of another optical surface C of an intermediate layer L2 which is made of a transparent material having Abbe's number vd2 which is in a close contact with one optical surface B of a lens L1 which is made of a transparent material having Abbe's number vd1, is an aspheric shape differing from (a shape of) the optical surface B, and furthermore, a lens L3 which is made of a transparent material having Abbe's number vd3 is in a close contact with the optical surface C, the following conditions are satisfied $$0.012 < 1/vd3 - 1/vd1 < 0.090 \quad (1)$$

$$0.010 < 1/vd3 - 1/vd2 \quad (2)$$

where,
vd1 denotes Abbe's number for the lens L1,
vd2 denotes Abbe's number for the intermediate layer L2, and
vd3 denotes Abbe's number for the lens L3.

26 Claims, 55 Drawing Sheets

FOREIGN PATENT DOCUMENTS

| | | |
|---|---|---|
| JP | 2001-083420 | 3/2001 |
| JP | 2003-255228 | 9/2003 |
| JP | 2004-117826 | 4/2004 |
| JP | 2005-316047 | 6/2006 |
| JP | 2006-145823 | 6/2006 |
| JP | 2006-189598 | 7/2006 |
| JP | 2008-052110 | 3/2008 |
| JP | 2008-129458 | 6/2008 |
| JP | 2008-129460 | 6/2008 |
| JP | 2008-191286 | 8/2008 |
| JP | 2008-191291 | 8/2008 |

OTHER PUBLICATIONS

International Search Report issued on Dec. 1, 2009 for PCT/JP2009/067537.

* cited by examiner

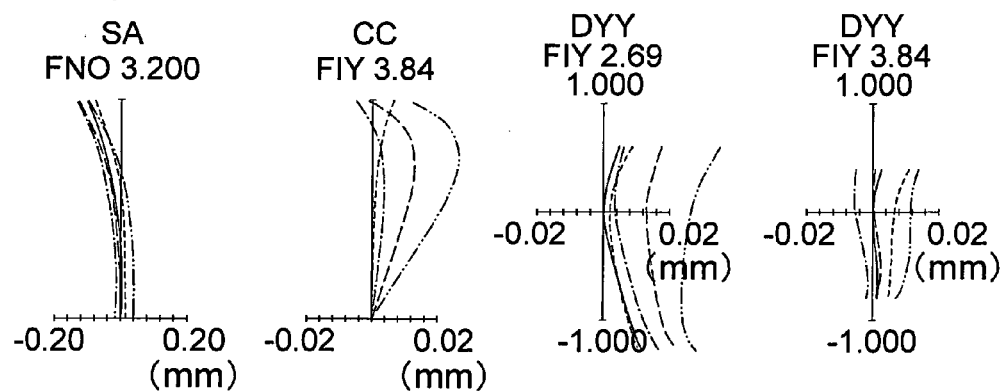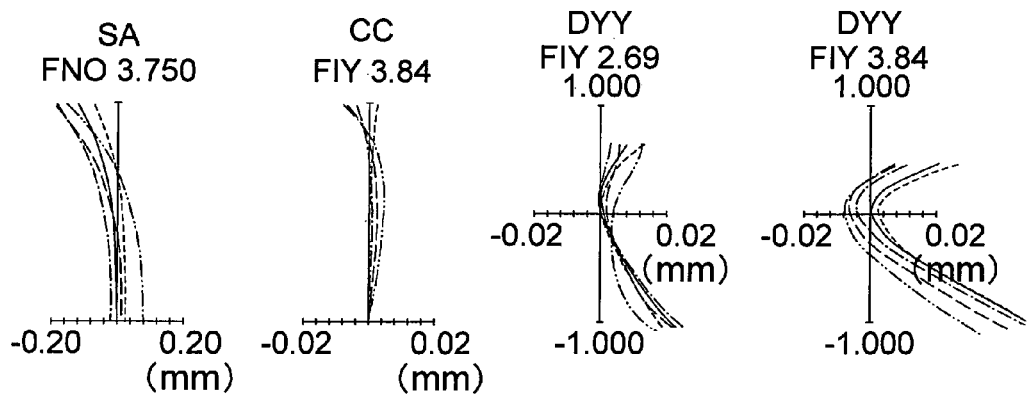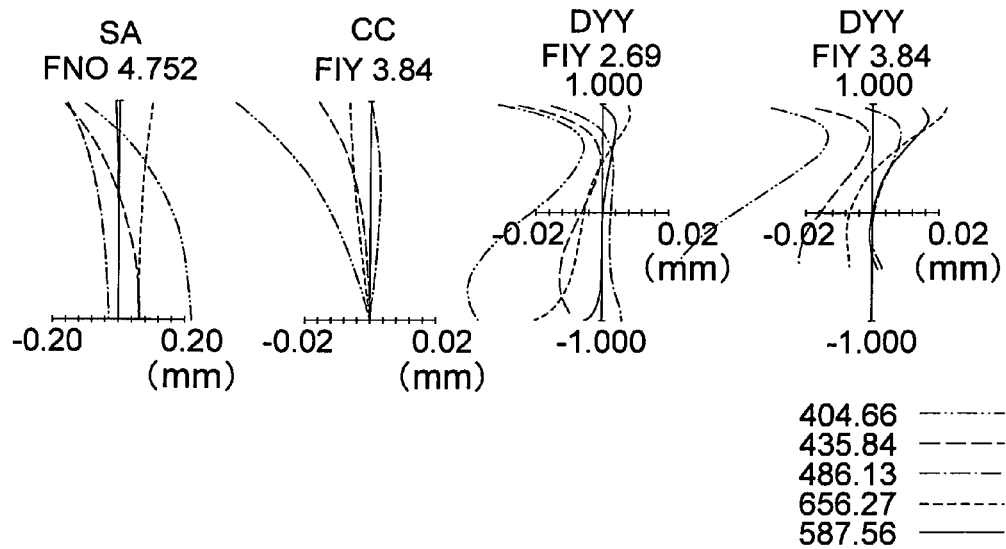

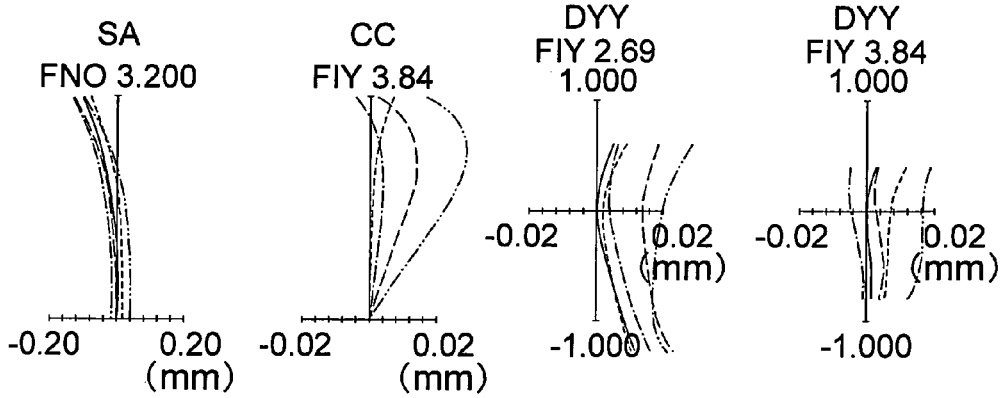
FIG.4A θgF=0.6307
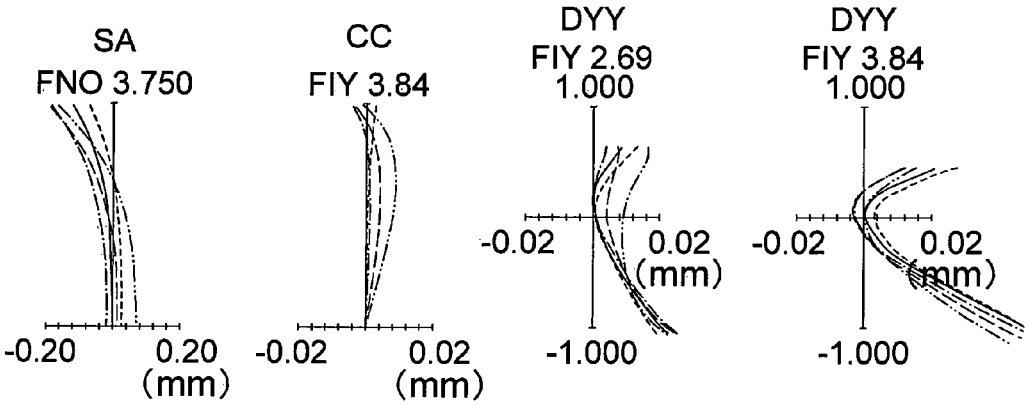
FIG.4B
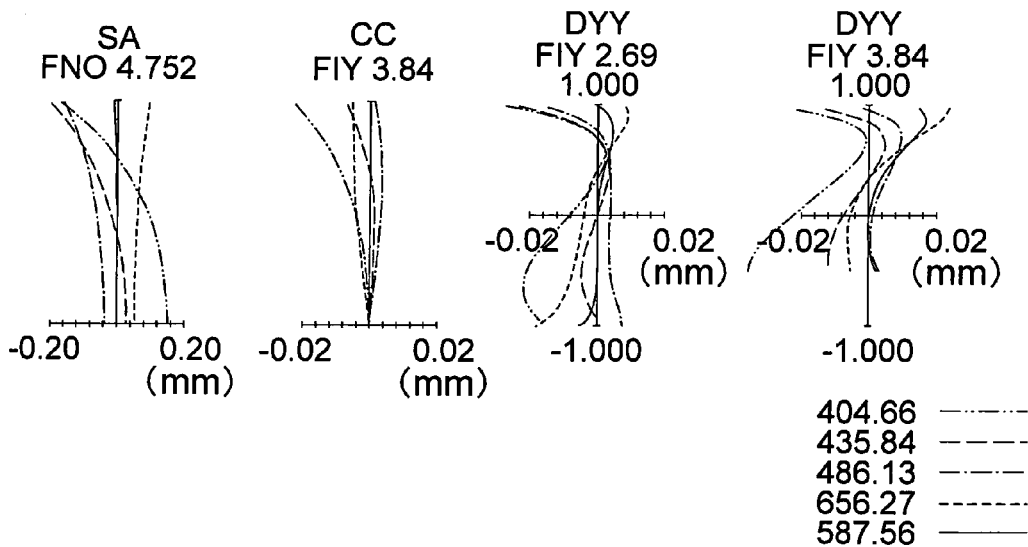
FIG.4C

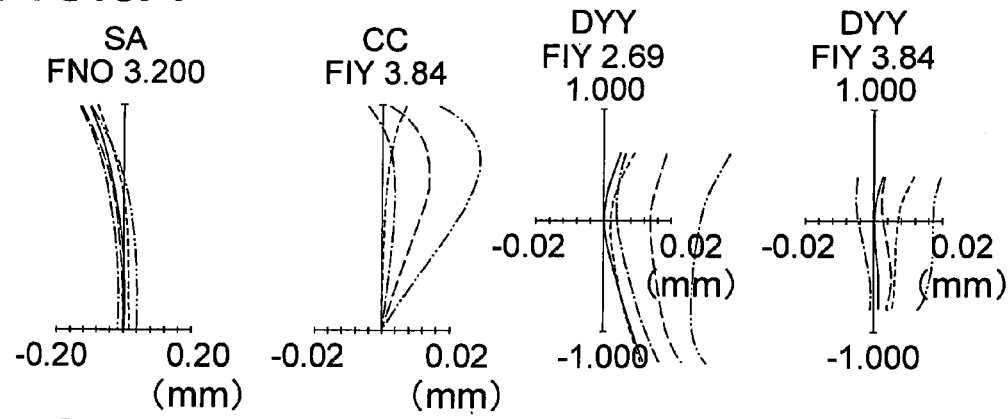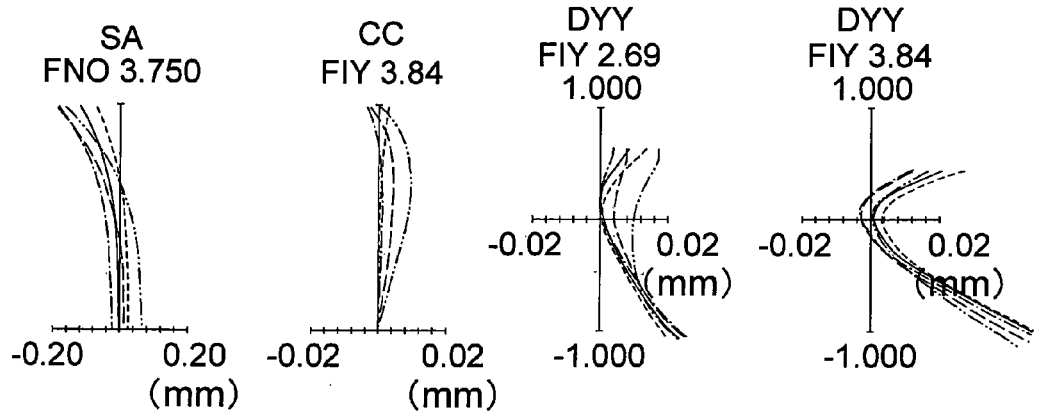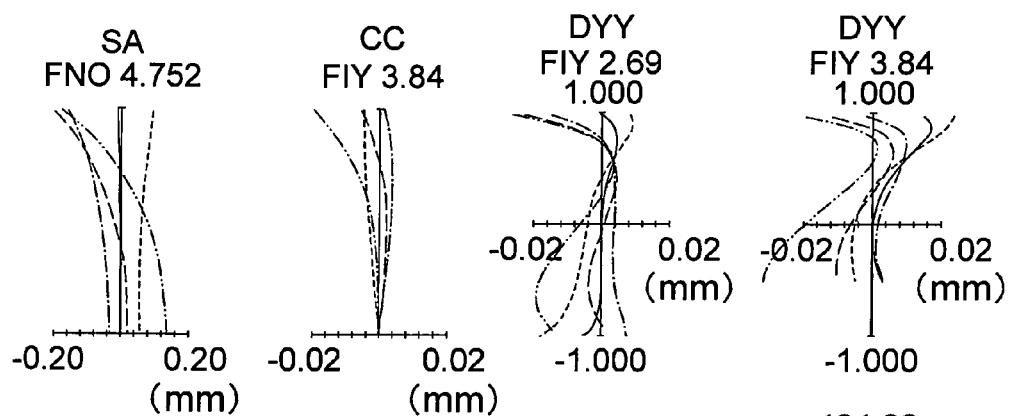

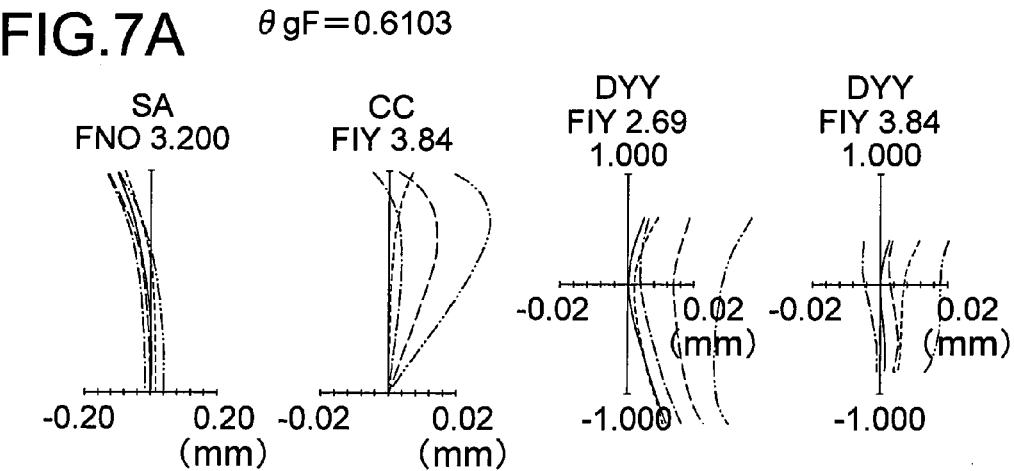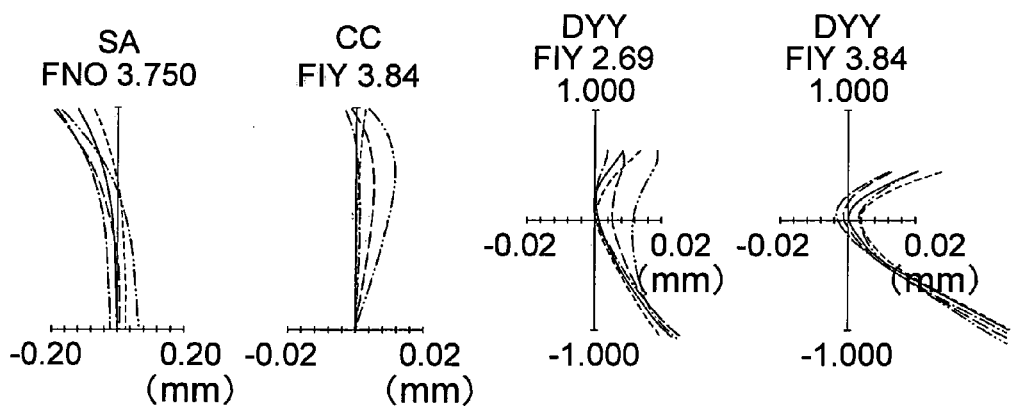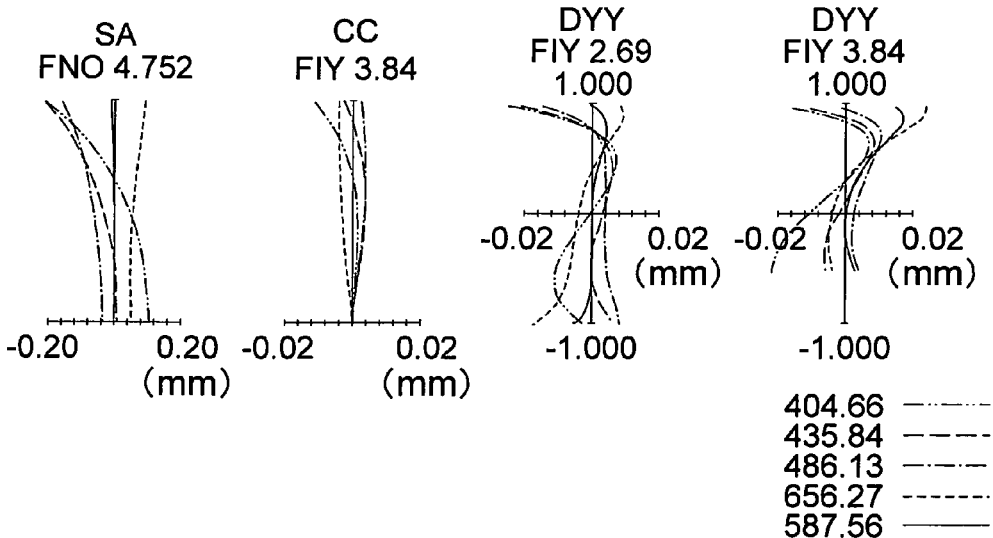

FIG.11A  θgF=0.6684
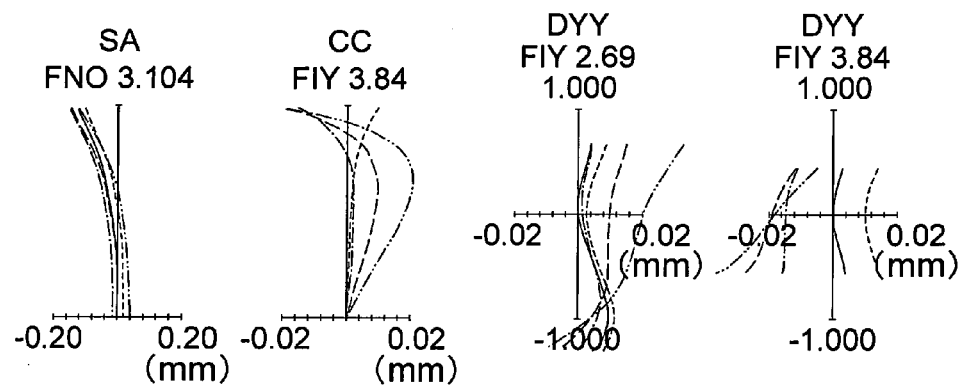
FIG.11B
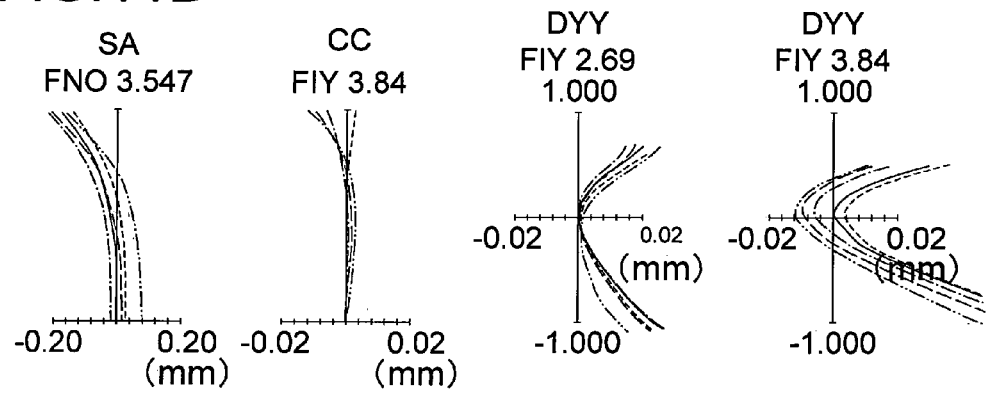
FIG.11C
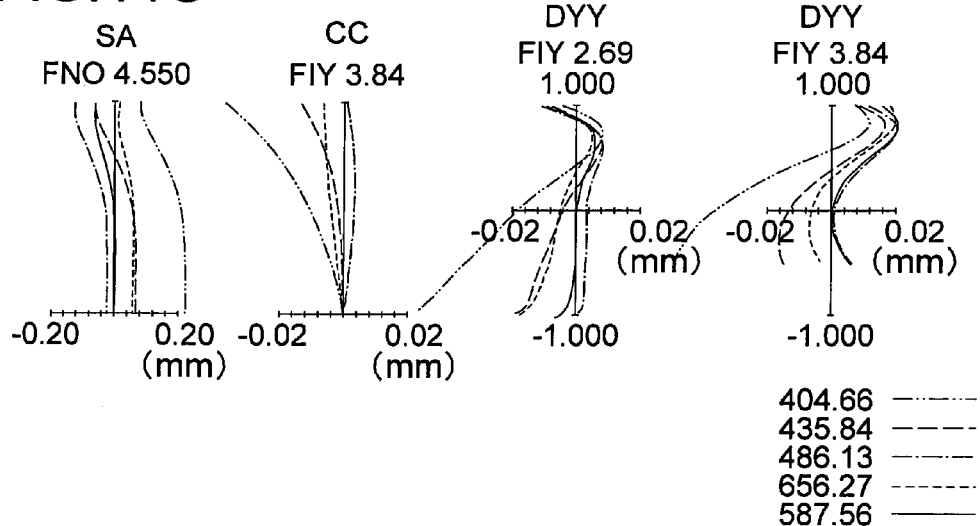
404.66 —·—
435.84 ———
486.13 —··—
656.27 -----
587.56 ——

FIG.13A  θgF=0.6255
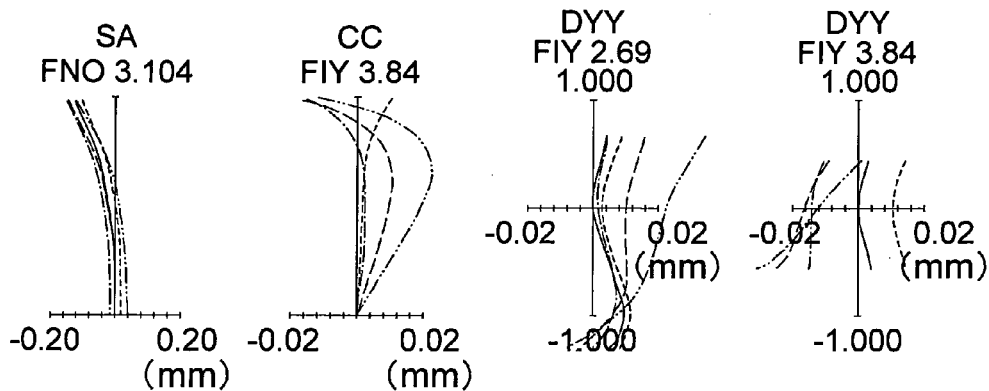
FIG.13B
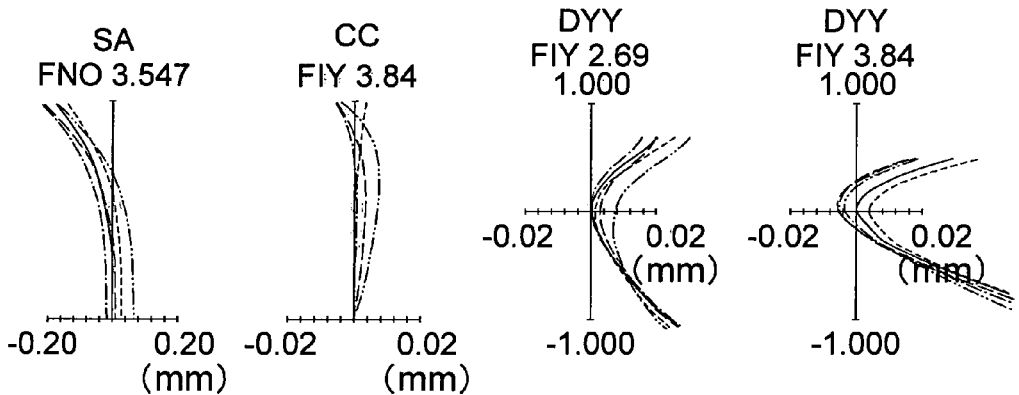
FIG.13C
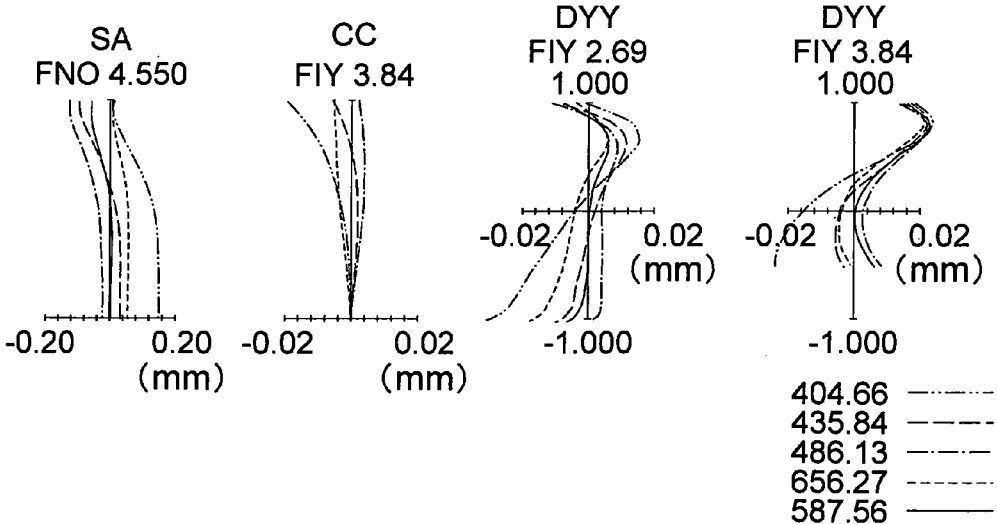

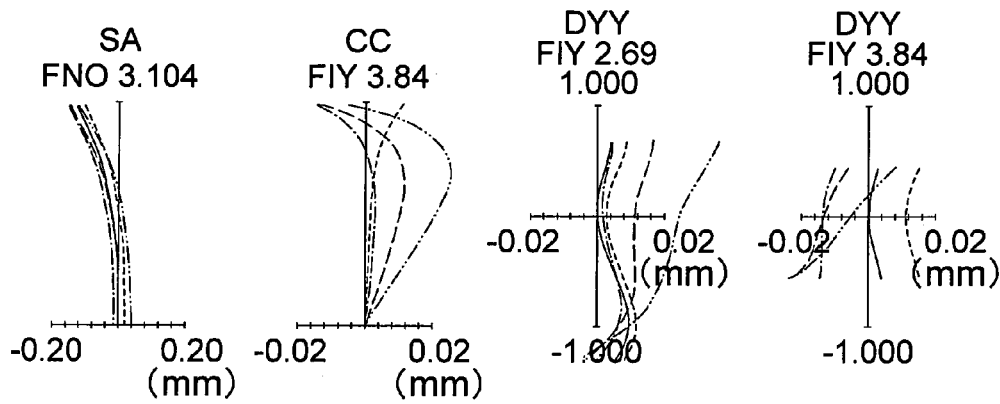
FIG.16A  θgF=0.5840
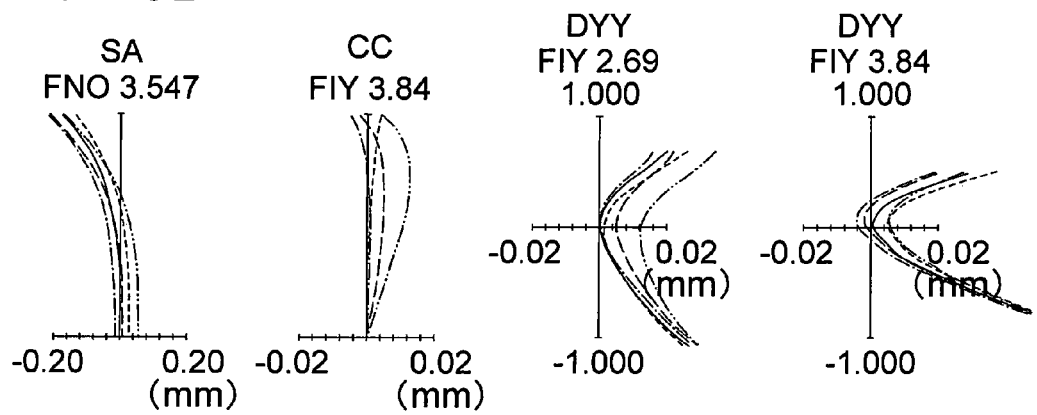
FIG.16B
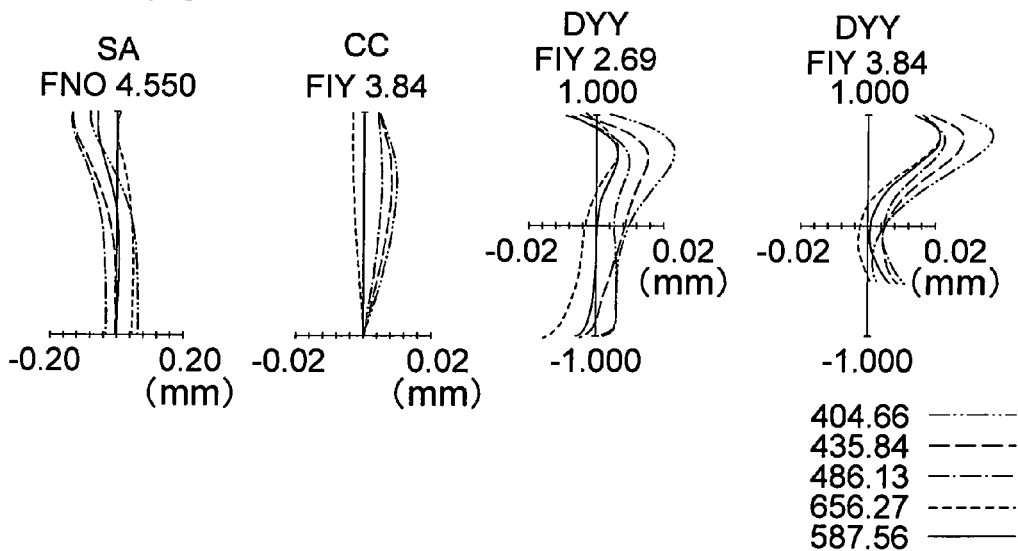
FIG.16C

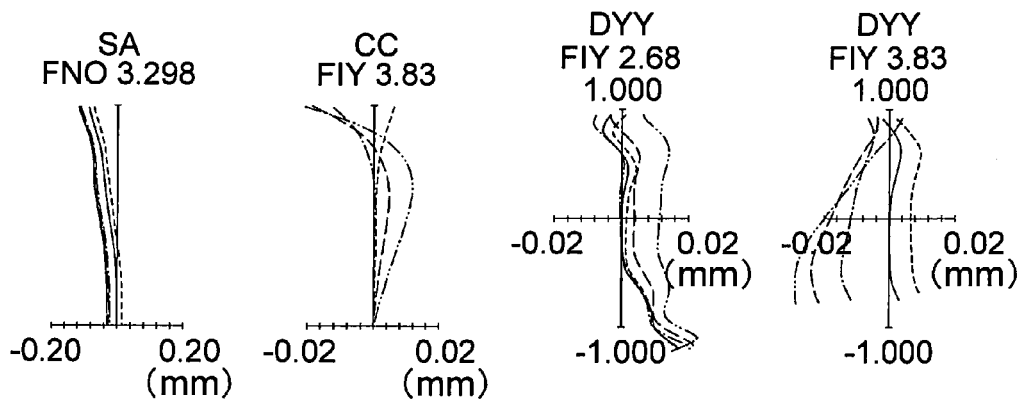
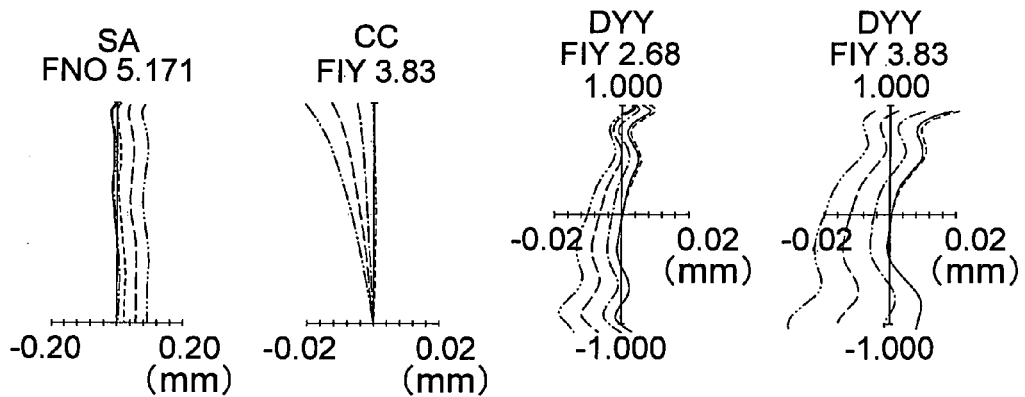
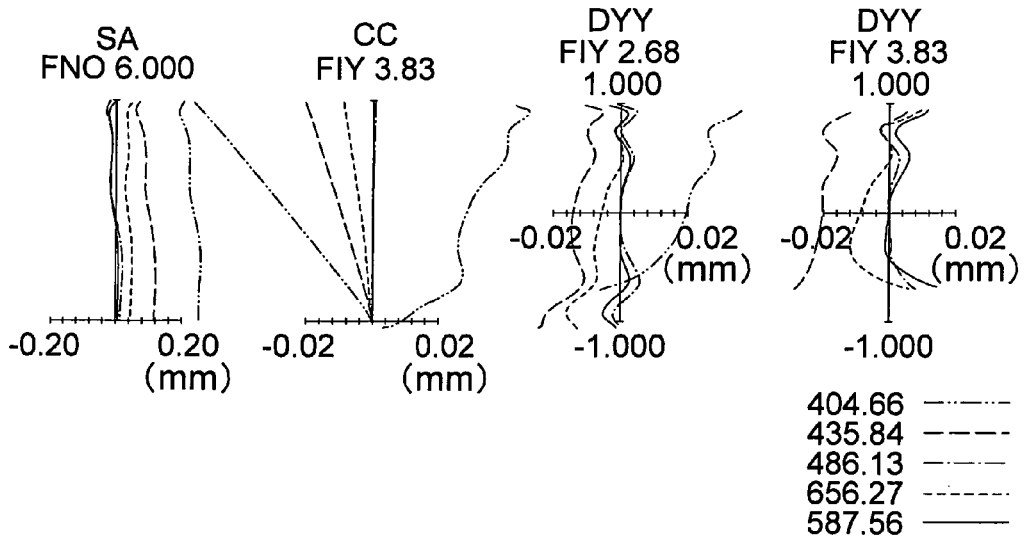

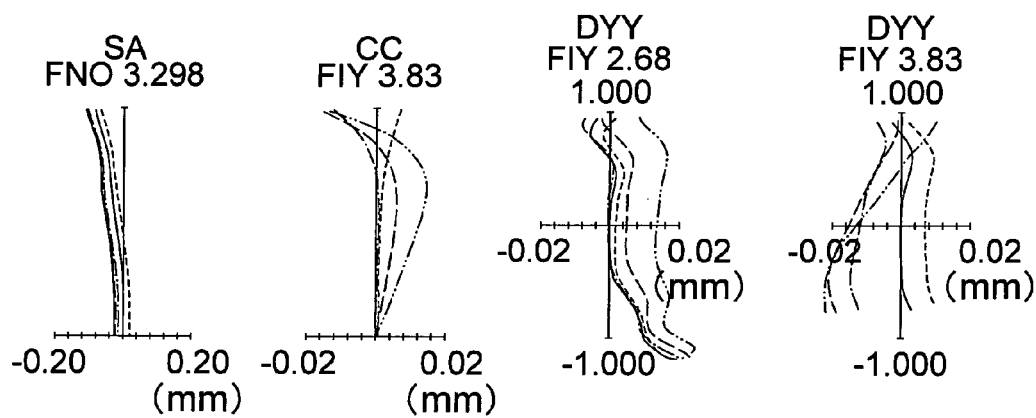
FIG.21A  θgF=0.6255
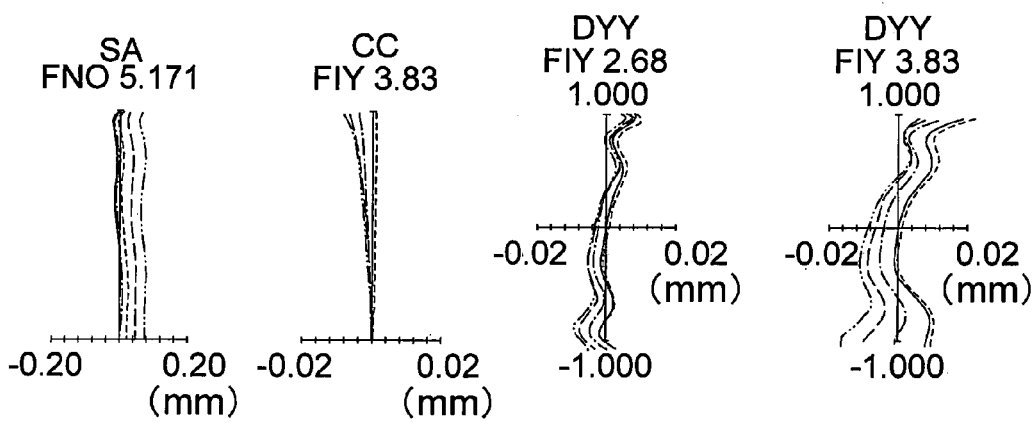
FIG.21B
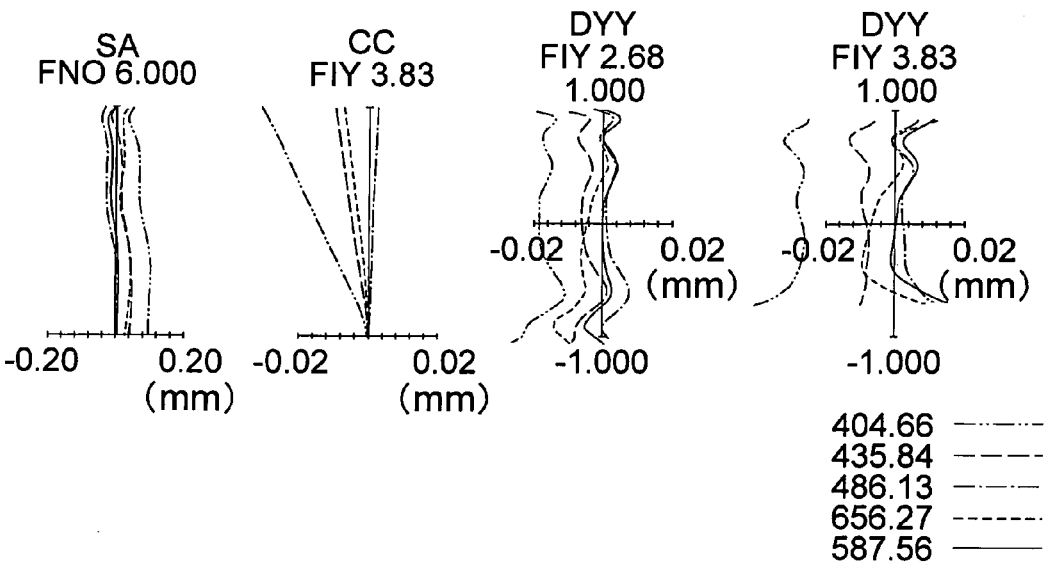
FIG.21C

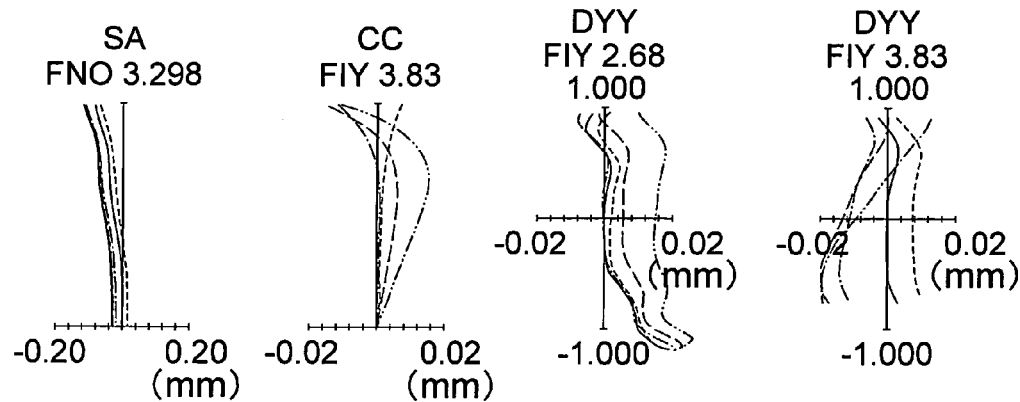
FIG.23A  θgF=0.6103
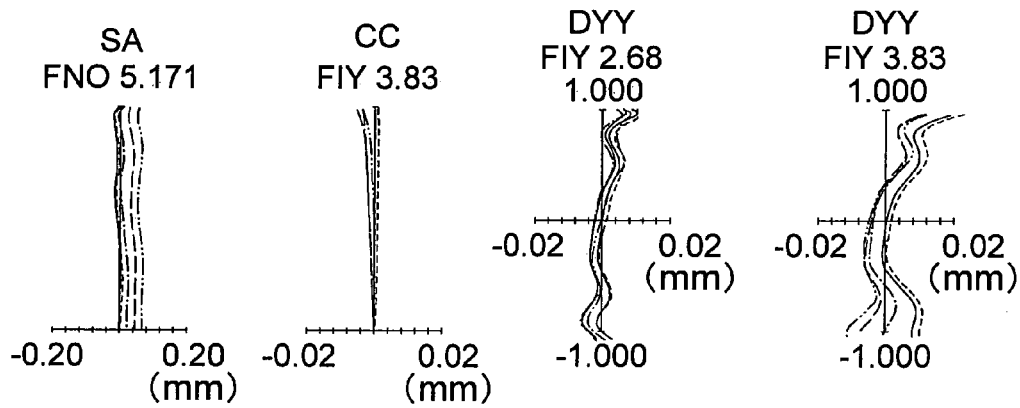
FIG.23B
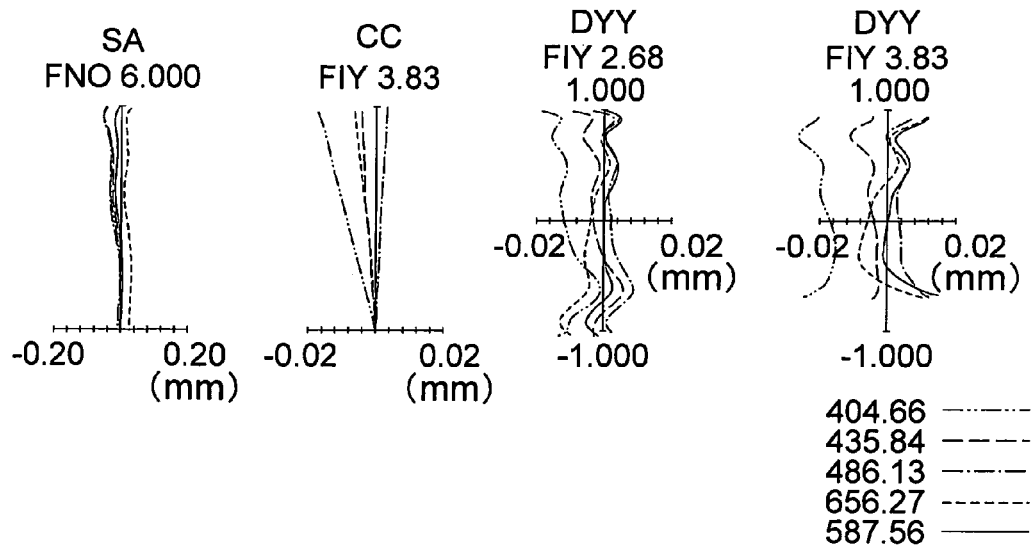
FIG.23C

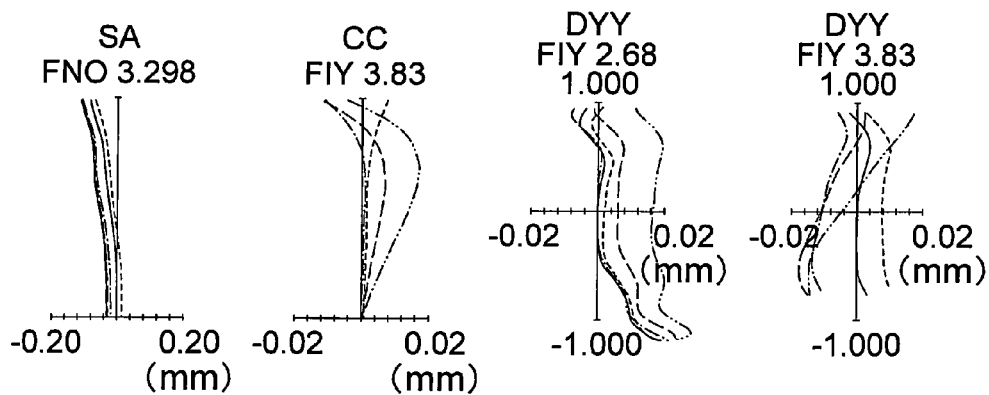
FIG.24A θgF=0.5840
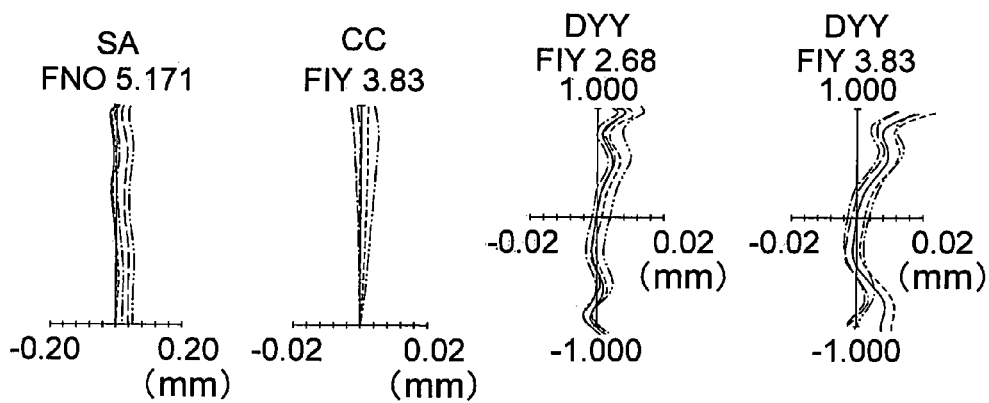
FIG.24B
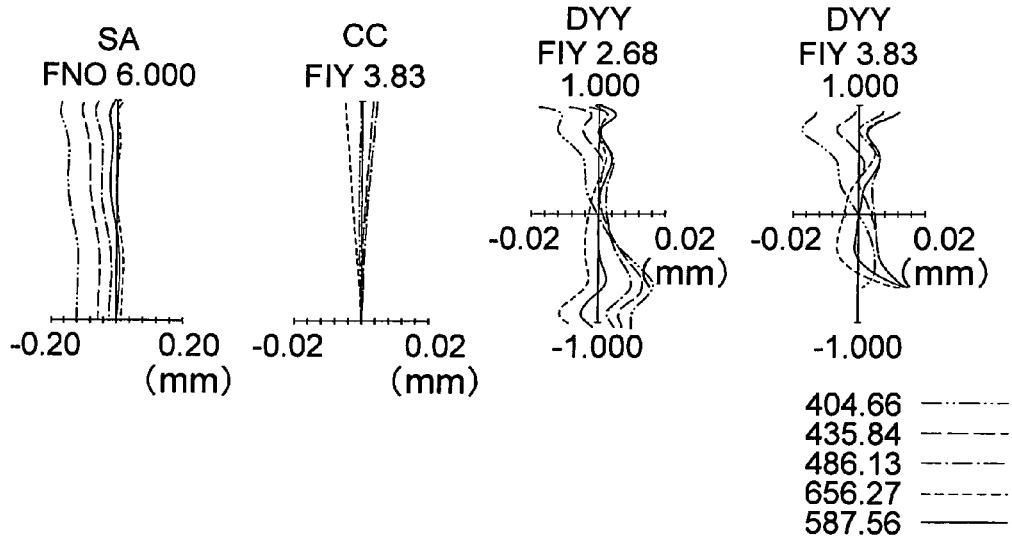
FIG.24C

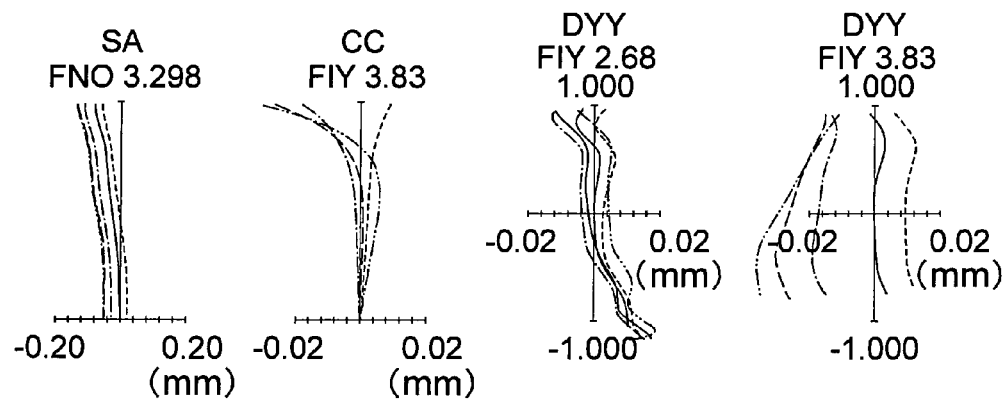
FIG.28A  θgF=0.6307
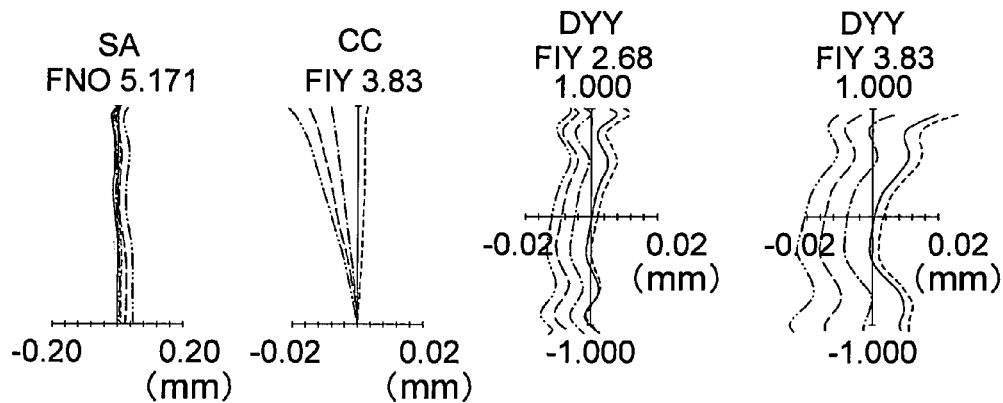
FIG.28B
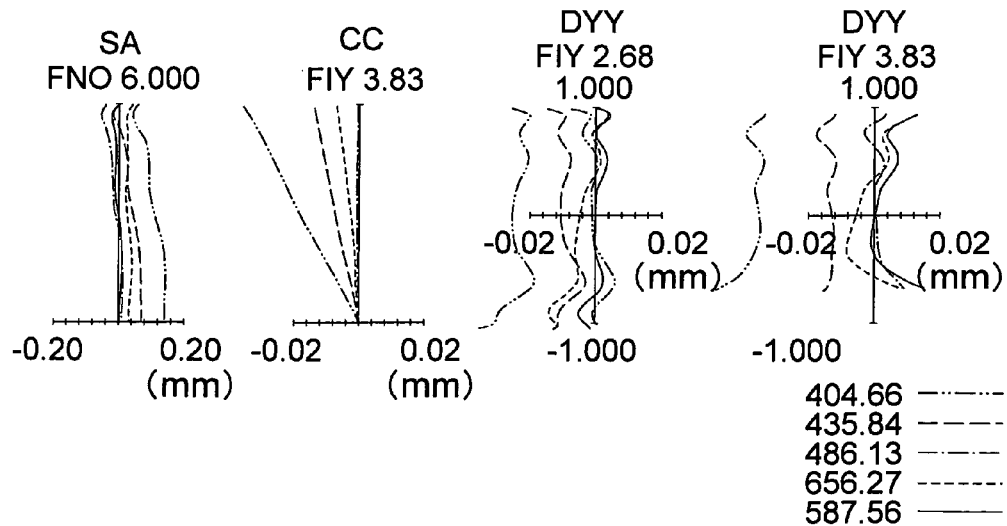
FIG.28C

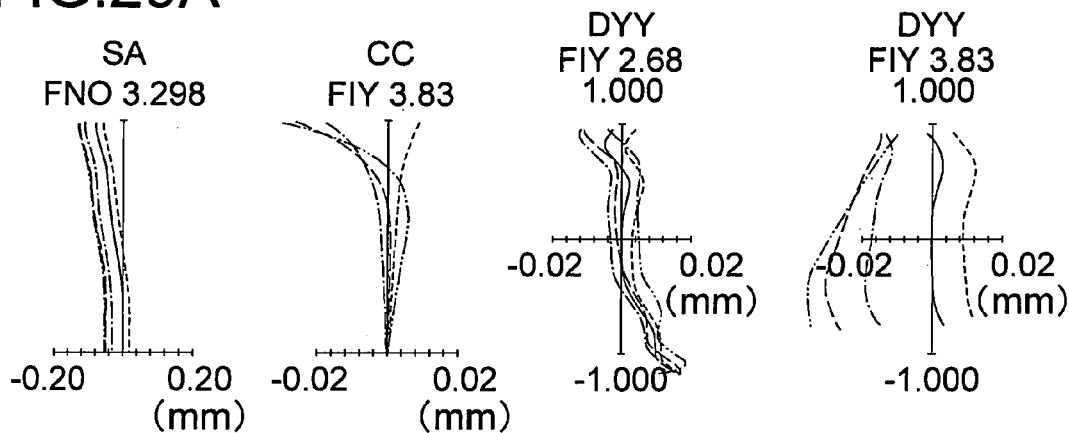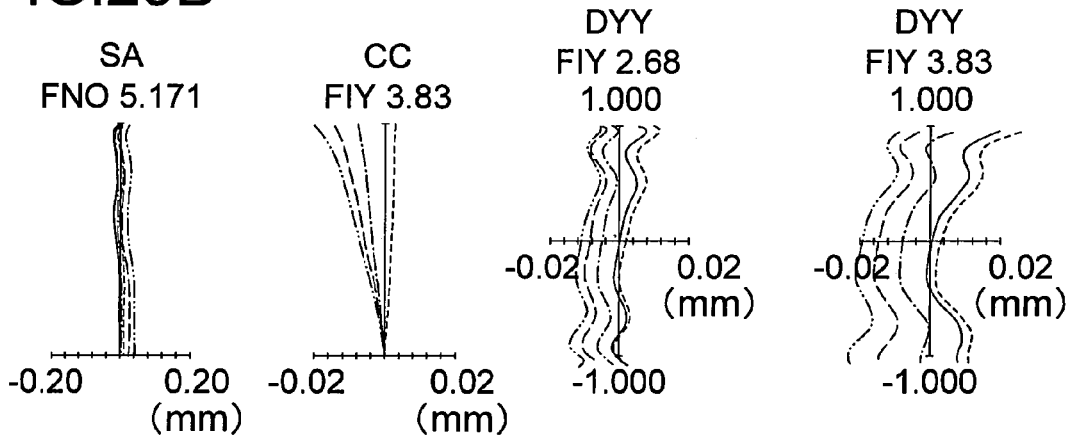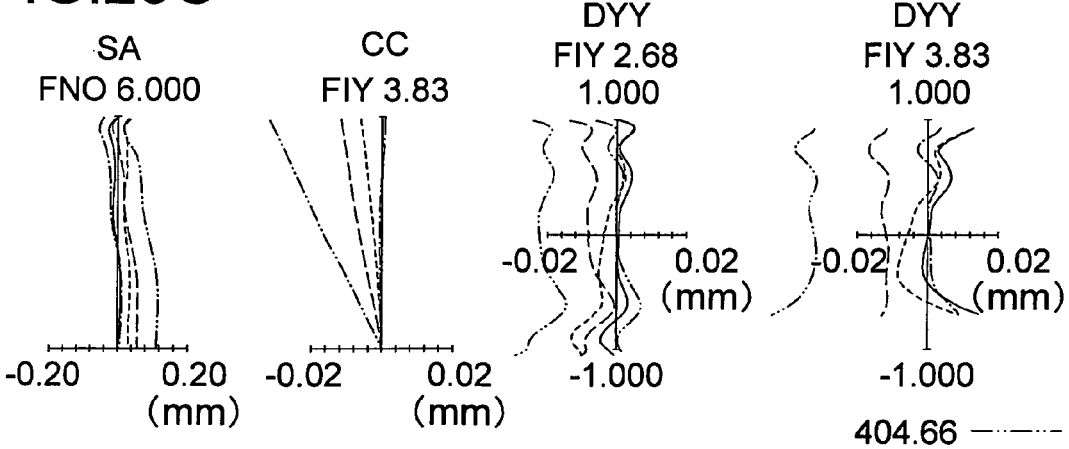

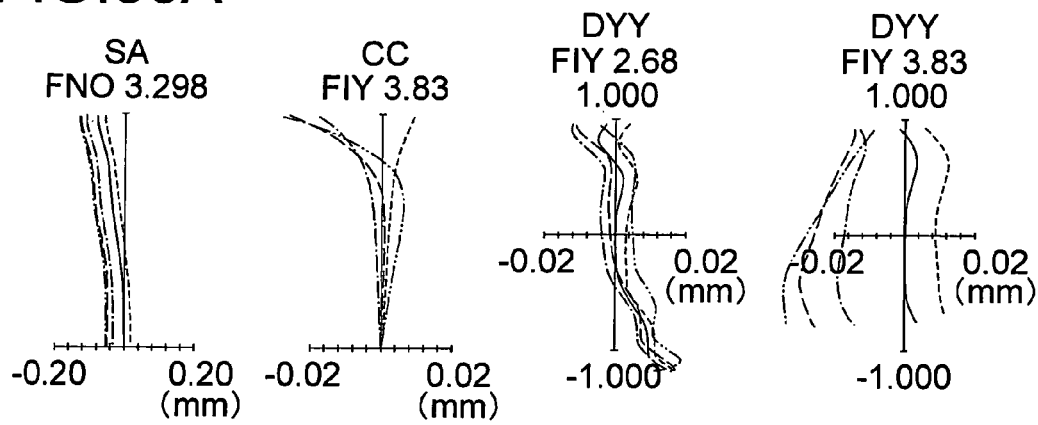
FIG.30A  θgF=0.6203
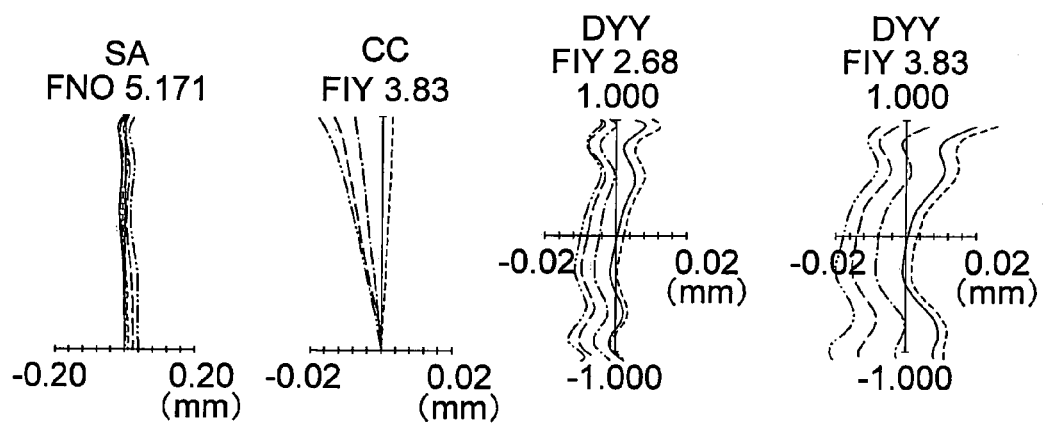
FIG.30B
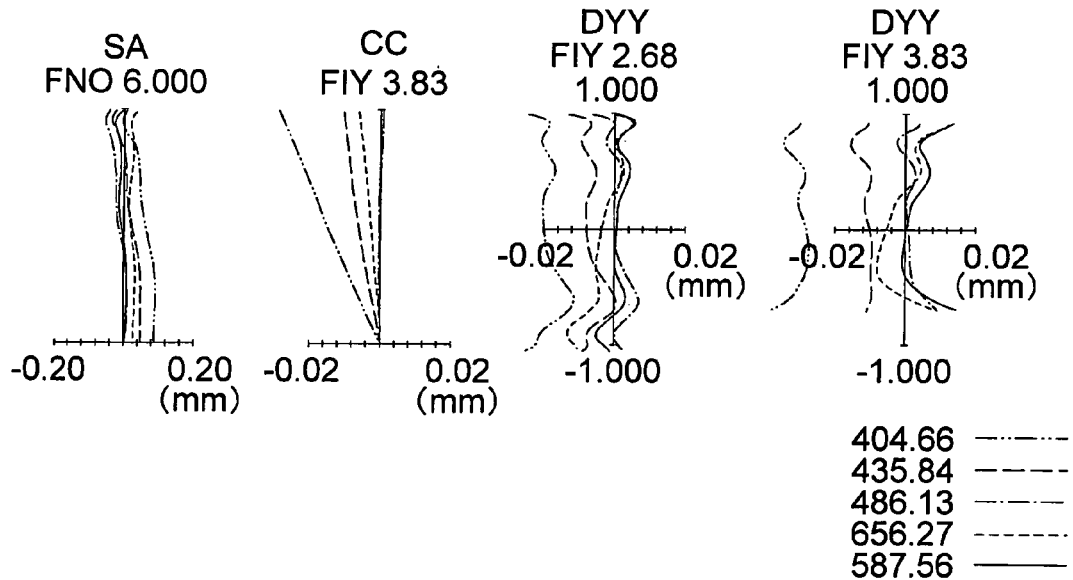
FIG.30C
404.66 —··—··
435.84 — — —
486.13 —·—·
656.27 - - - - -
587.56 ———

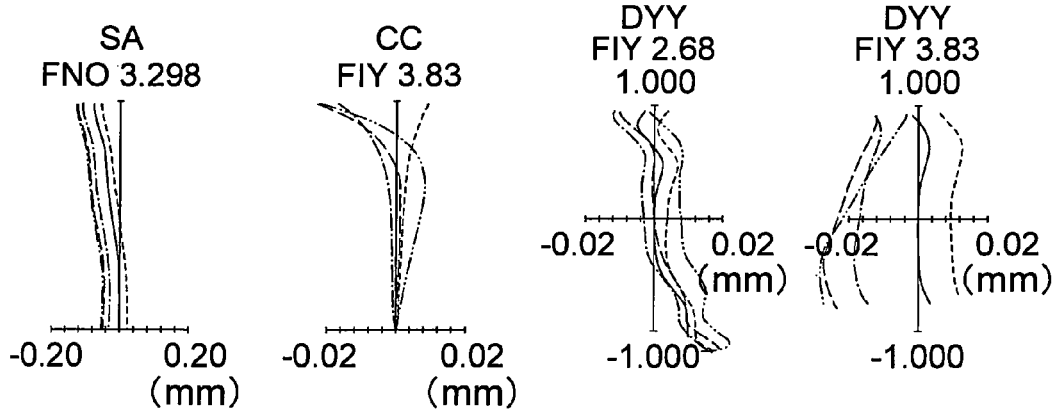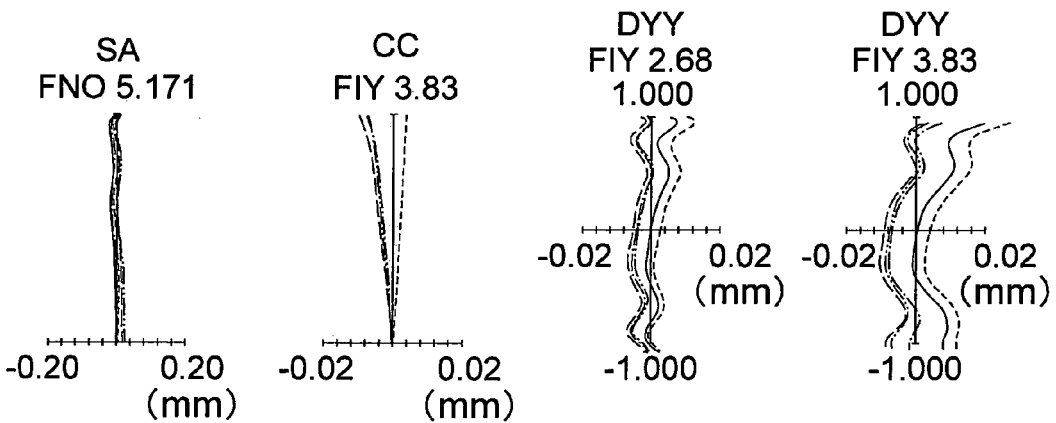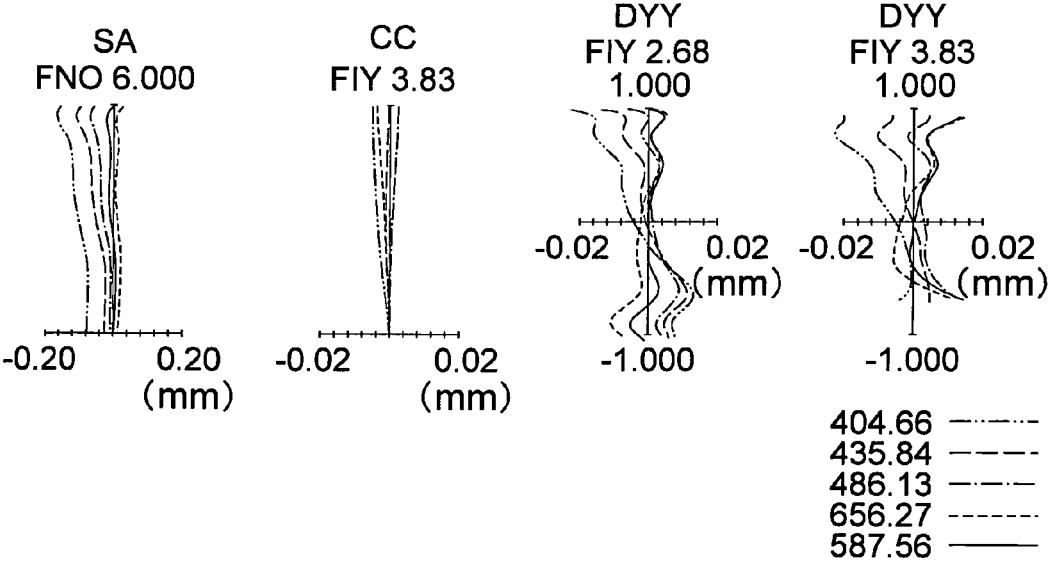

FIG.35A  θgF=0.6684
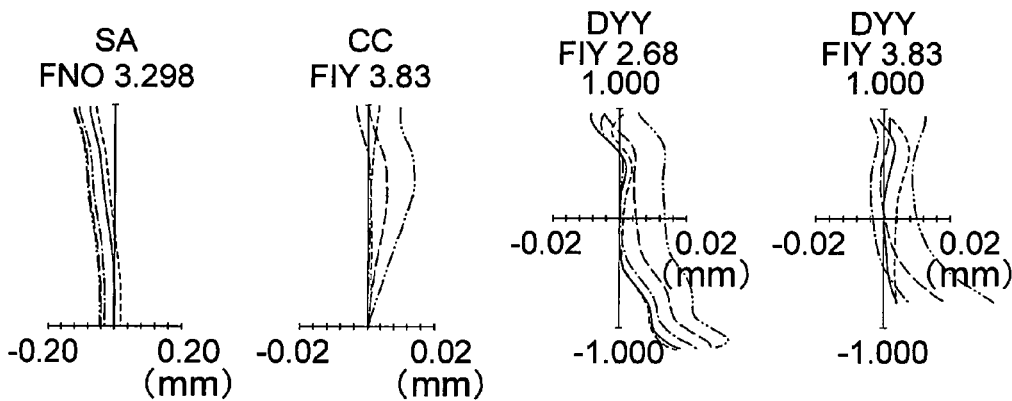
FIG.35B
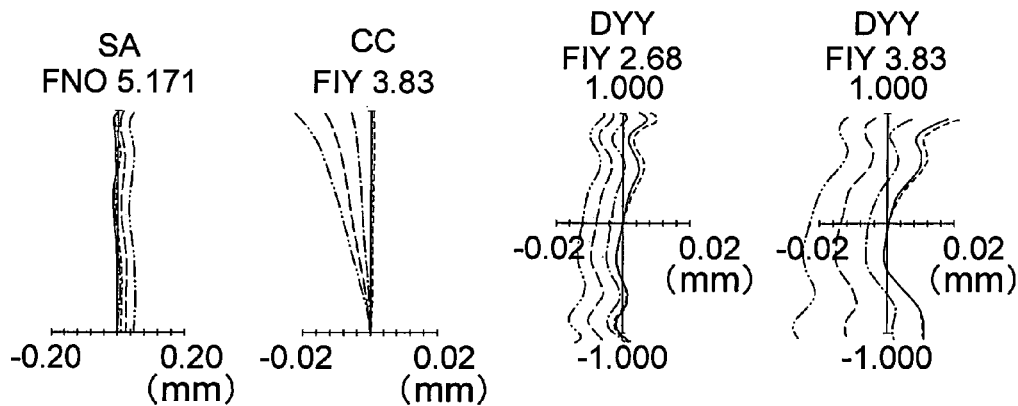
FIG.35C
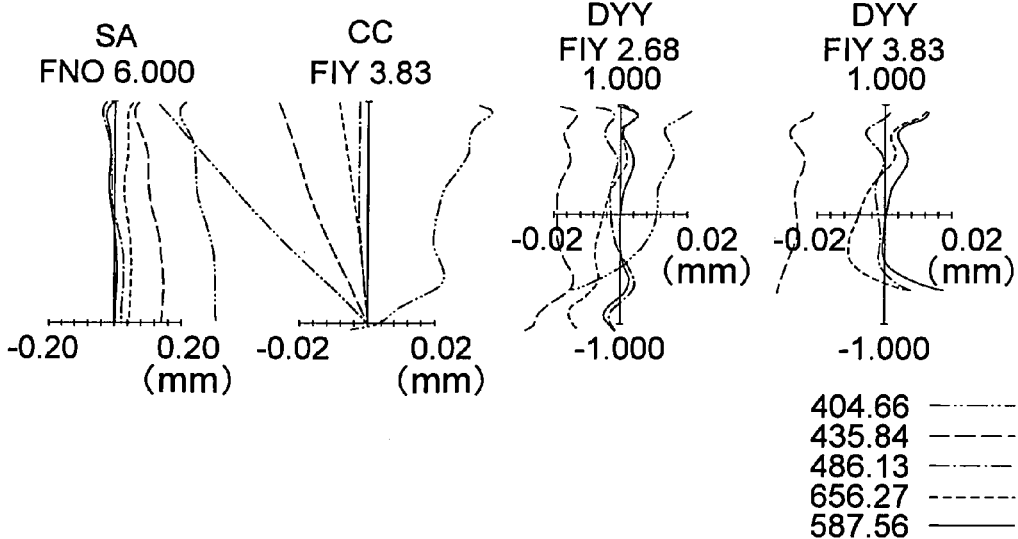
404.66 —·——·
435.84 ———
486.13 —·—·
656.27 — — —
587.56 ———

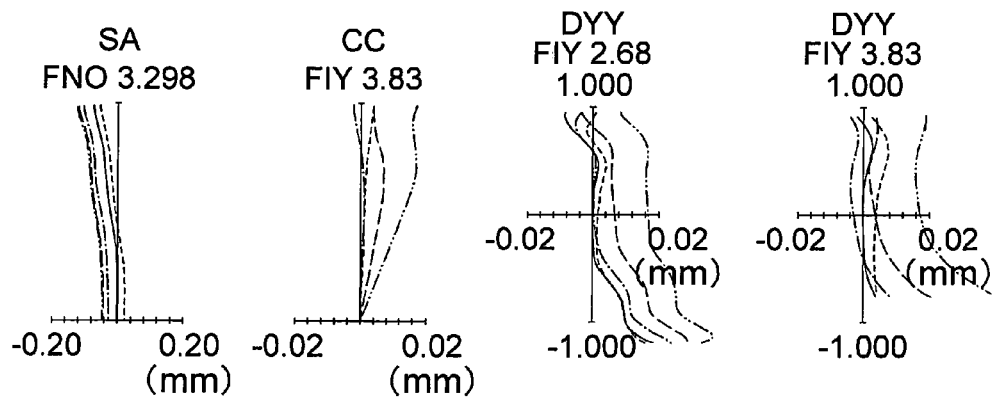
FIG.37A  θgF=0.6255
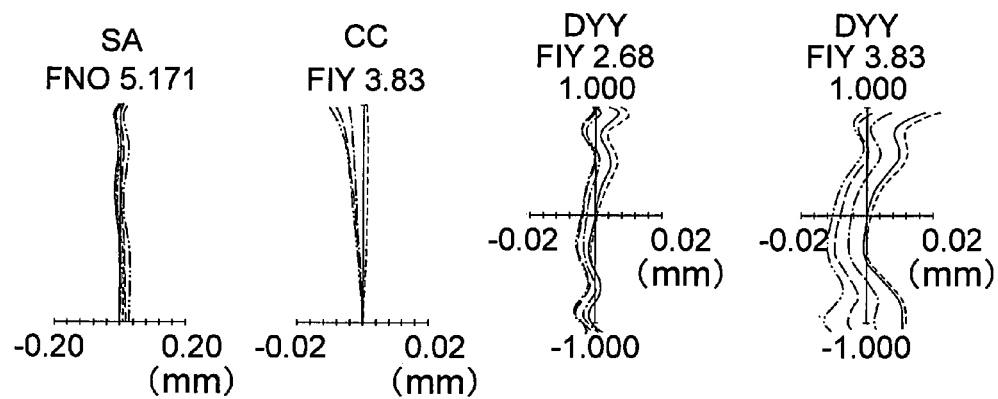
FIG.37B
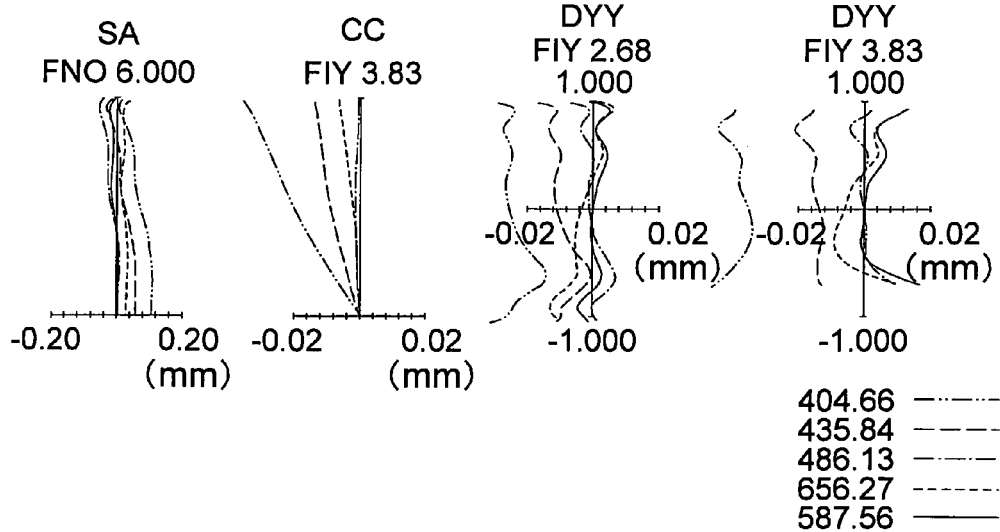
FIG.37C

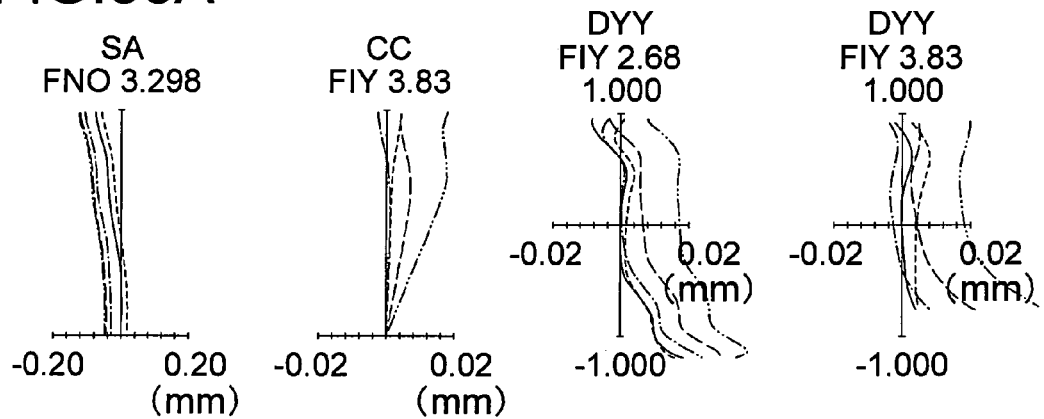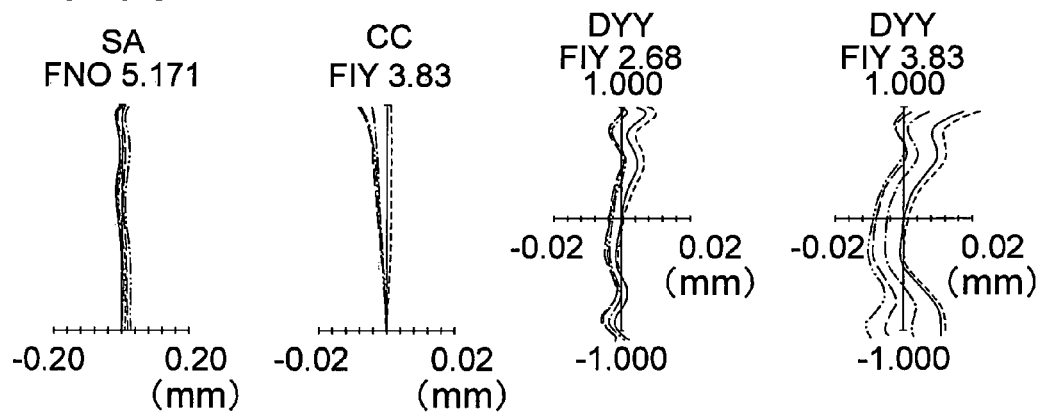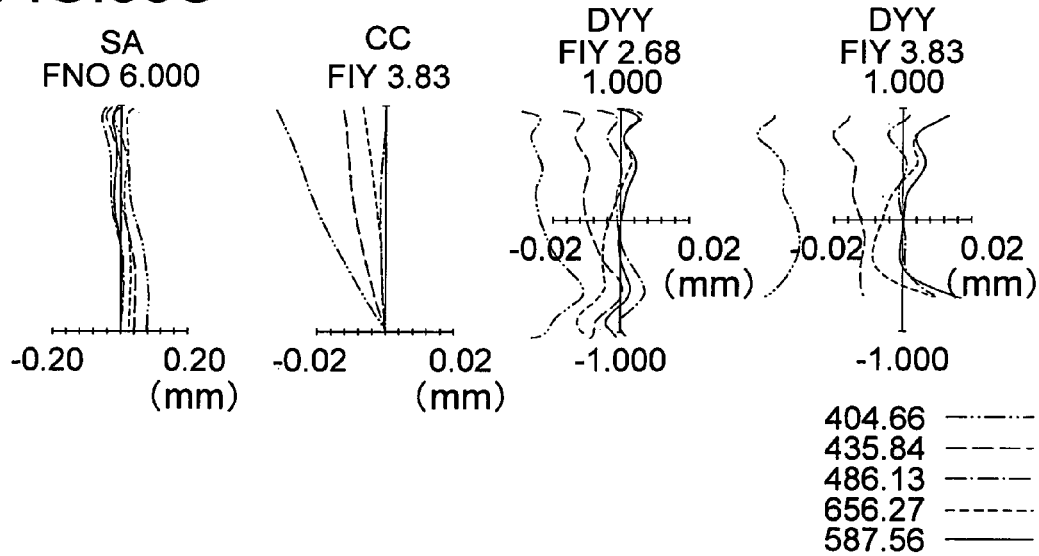

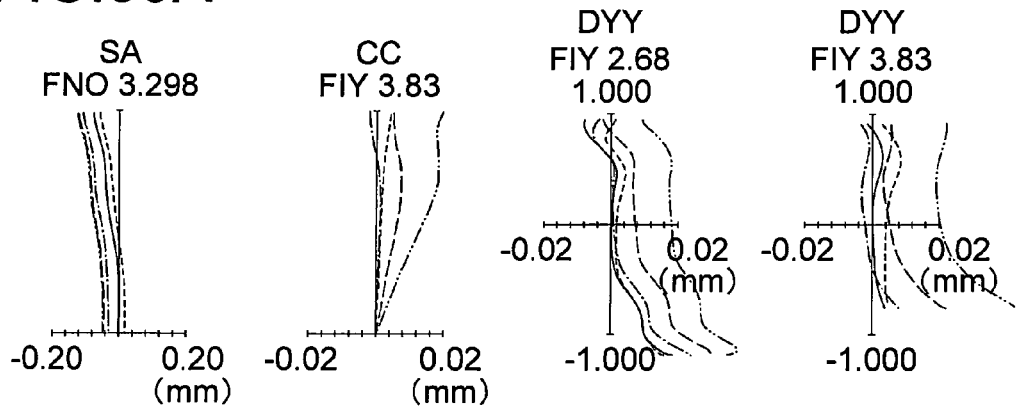
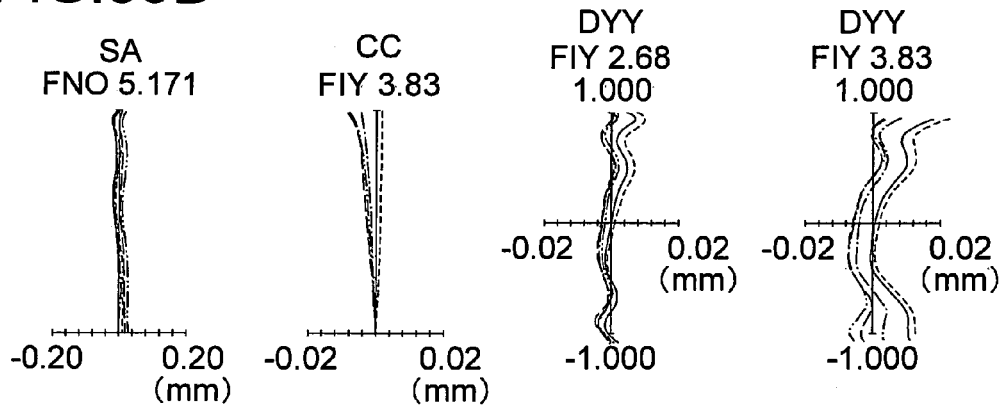
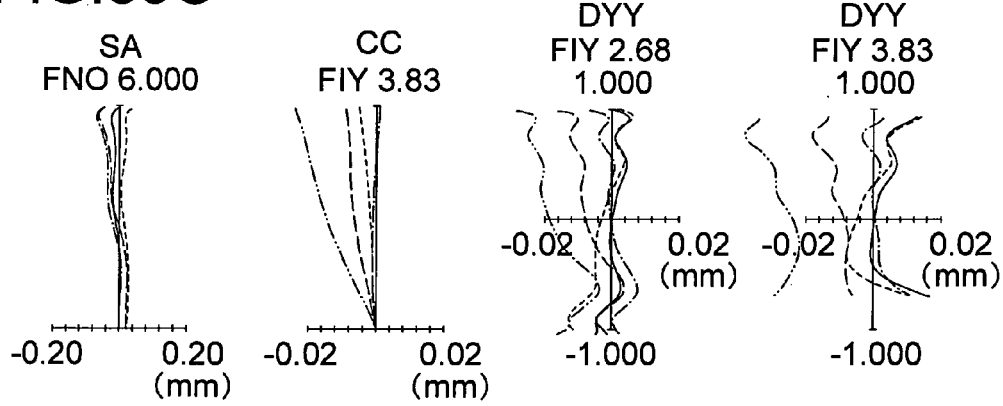

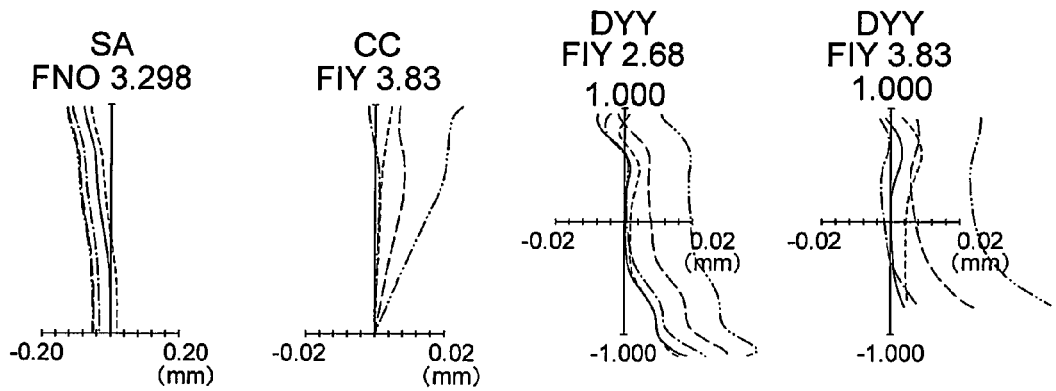
FIG.40A  θgF=0.5840
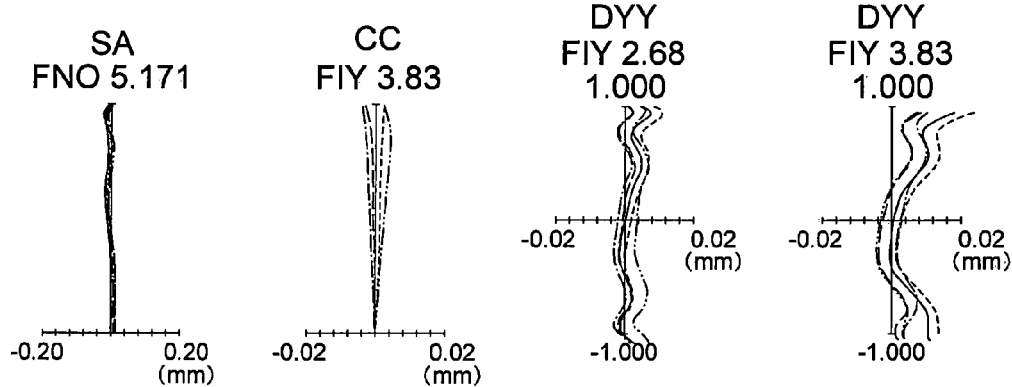
FIG.40B
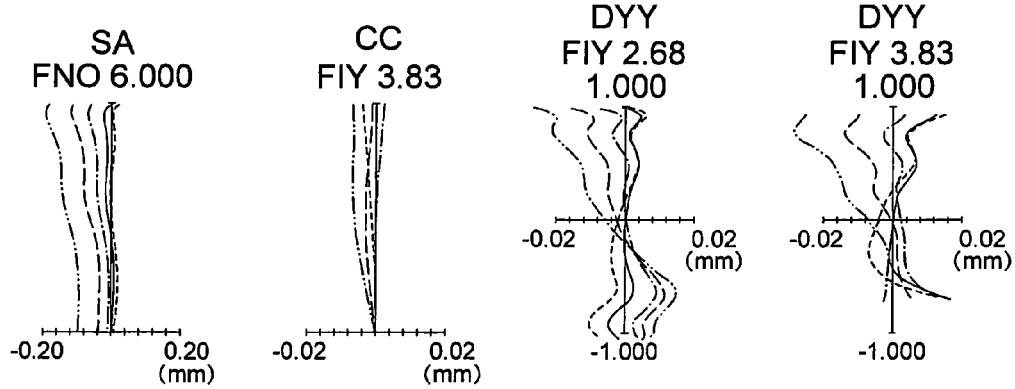
FIG.40C
404.66 —··—··—
435.84 — — — —
486.13 —·—·—
656.27 — — — —
587.56 ————

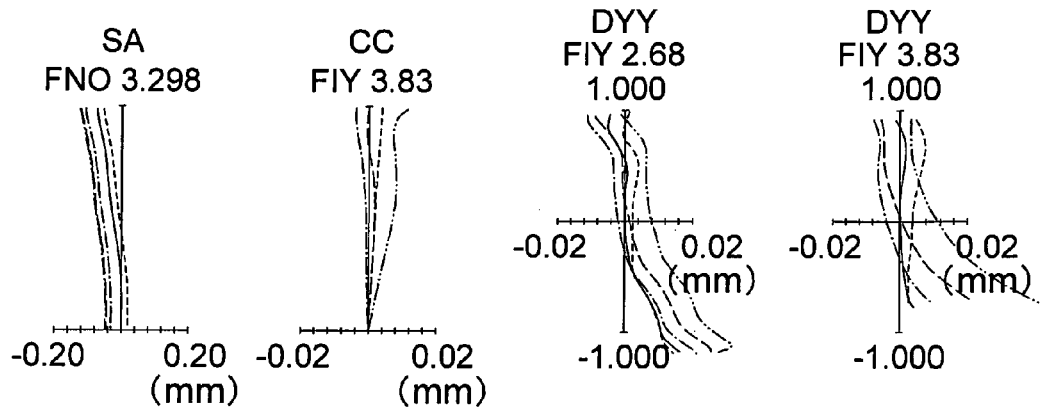
FIG.43A  θgF=0.6684
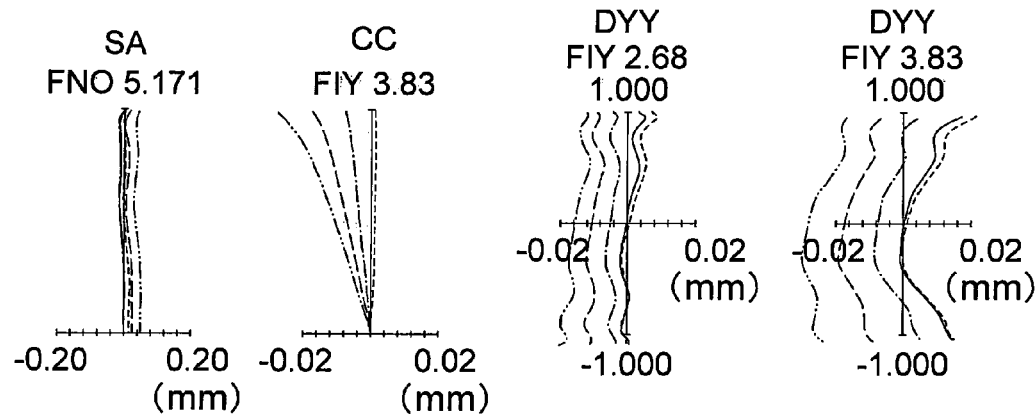
FIG.43B
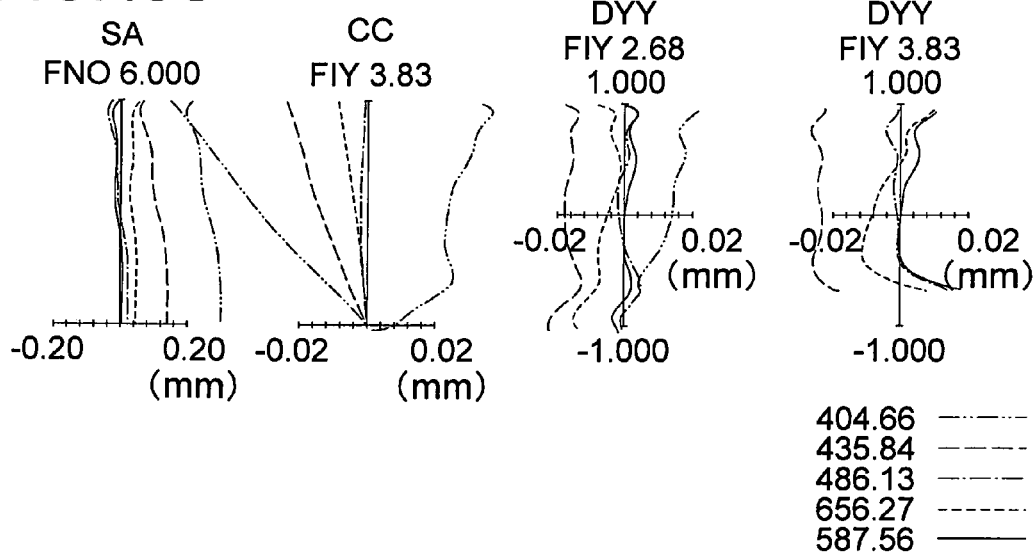
FIG.43C

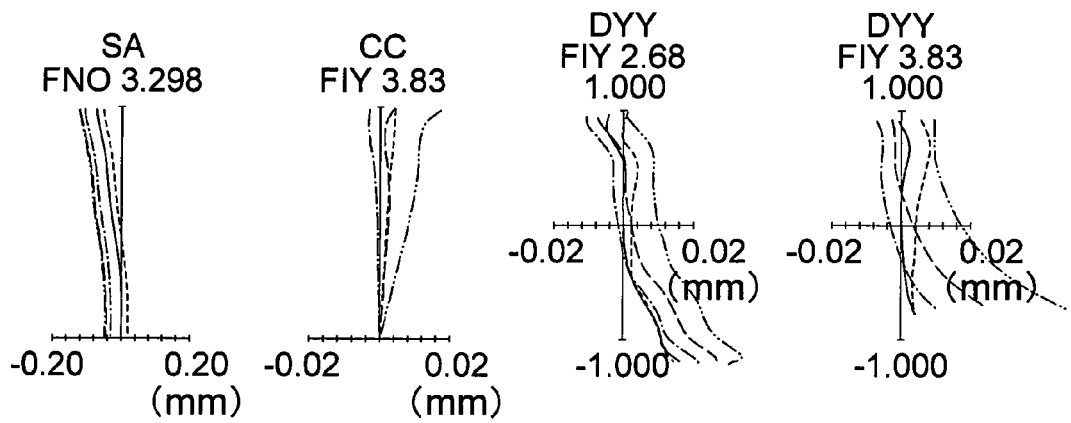
FIG.44A  θgF=0.6307
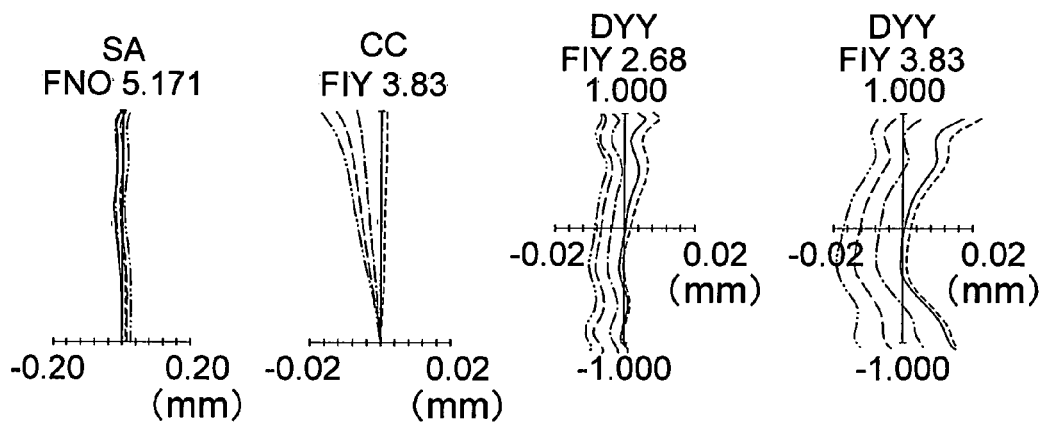
FIG.44B
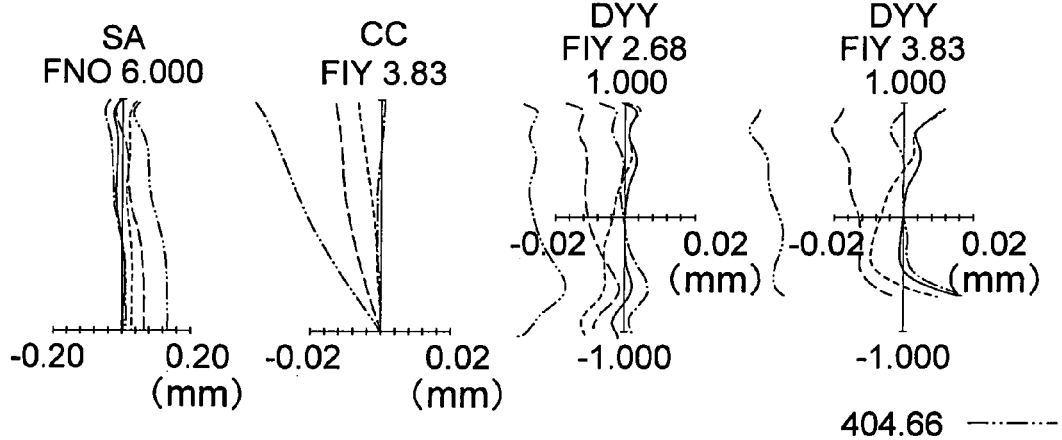
FIG.44C
404.66 —··—··—
435.84 — — —
486.13 —·—·—
656.27 - - - - -
587.56 ————

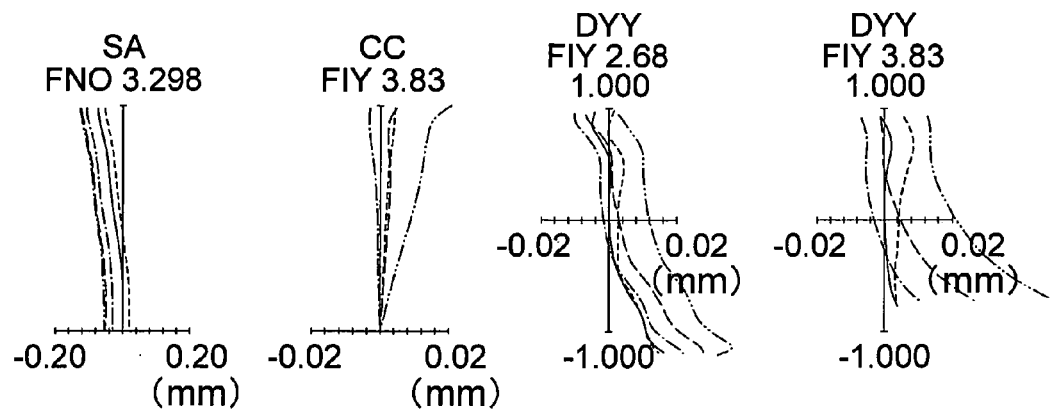
FIG.47A  θgF=0.6103
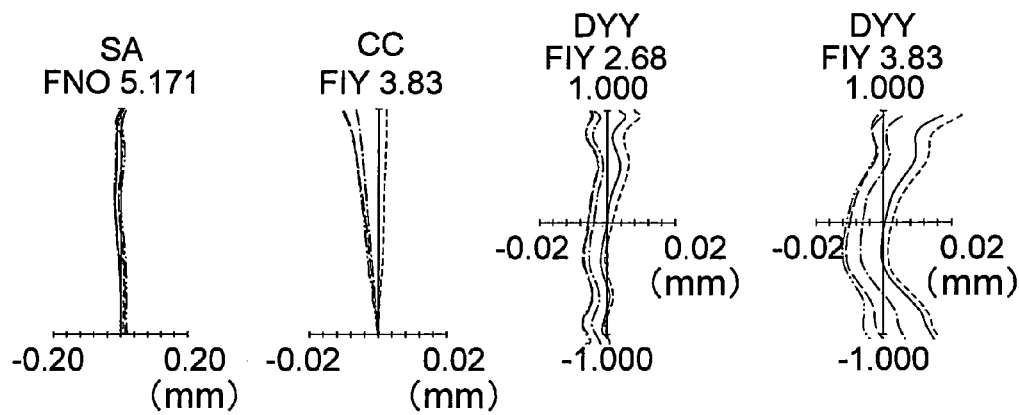
FIG.47B
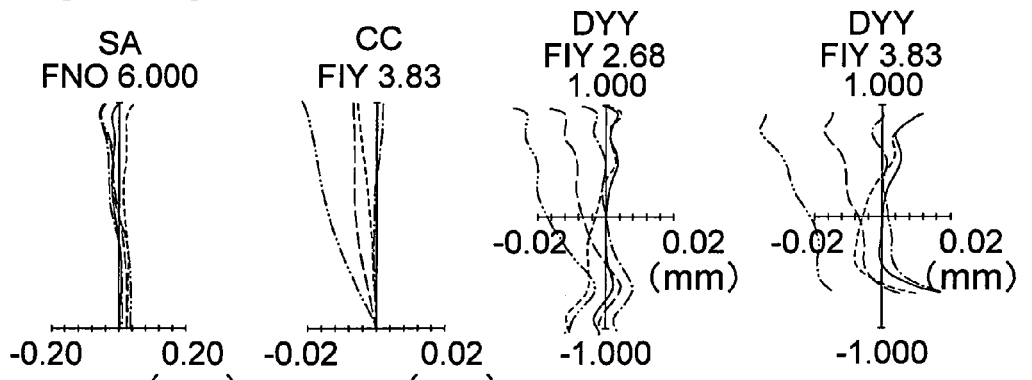
FIG.47C

IMAGE FORMING OPTICAL SYSTEM AND ELECTRONIC IMAGE PICKUP APPARATUS USING THE SAME

CROSS-REFERENCE TO RELATED APPLICATIONS

This application is a continuation of PCT International Application No. PCT/JP2009/067537 filed on Oct. 8, 2009, which designates the United States. A claim of priority and the benefit of the filing date under 35 U.S.C. §120 is hereby made to PCT International Application No. PCT/JP2009/067537 filed on Oct. 8, 2009, which in turn claims priority under 35 U.S.C. §119 to Japanese Application No. 2008-263187 filed on Oct. 9, 2008, the entire contents of each of which are expressly incorporated herein in its entirety by reference thereto.

BACKGROUND OF THE INVENTION

1. Field of the Invention

The present invention relates to an image forming optical system which is useful for both, slimming (thinning) of an optical system and achieving improved performance, and an electronic image pickup apparatus using such image forming optical system.

2. Description of the Related Art

A digital camera has reached a level of being used practically, regarding making large the number of pixels (high image quality), and small-sizing and slimming. Also from a function point of view and a market point of view, a digital camera has substituted a silver salt 35 mm film camera. Therefore, improvement in optical specifications such as a high zooming ratio of an optical system, a wide angle, and a large aperture ratio, as well as further increase in the number of pixels with the same small-size and slimness, have been sought strongly as a next trend of evolution.

For instance, as a zooming optical system which has hitherto been used as favorable for high zooming ratio, an optical system disclosed in Japanese Patent Application Laid-open Publication No. 2003-255228 is available. In Japanese Patent Application Laid-open Publication No. 2003-255228, a so-called positive-lead zooming optical system in which, an initial lens group (a first lens group), in order from an object side, has a positive refractive power, has been disclosed.

Moreover, when an attempt is made to realize small-sizing and slimming of a high-magnification zooming optical system by using a similar zooming optical system, a correction of chromatic aberration is susceptible to be a problem.

Here, the chromatic aberration will be described in detail.

The chromatic aberration includes a paraxial chromatic aberration and a high-order chromatic aberration. Moreover, The paraxial chromatic aberration includes a chromatic aberration of a focal-point position and a chromatic aberration of a focal length. The correction of such chromatic aberrations has been achieved normally, by coinciding of the focal point position and the focal length for two predetermined wavelengths, (such as, for a C-line (656.27 nm) and for an F-line (486.13 nm)). This state is called as a state in which, an achromatism of the C-line and the F-line has been possible. This can be achieved by selecting an appropriate Abbe's number for a plurality of lenses in an optical system.

However, for the other wavelengths which differ from the two predetermined wavelengths, the focal-point position and the focal length do not coincide. Or in other words, in most of the cases, an aberration remains. The chromatic aberration which has remained is called as a secondary spectrum. An optical characteristic which has an effect on an amount remained is a partial dispersion ratio.

In a case of a normal optical material, an optical material with a low dispersion (high Abbe's number) has a relatively small partial dispersion ratio, and an optical material with a high dispersion (low Abbe's number) has a large partial dispersion ratio. Consequently, a low-dispersion optical material having the partial dispersion ratio as large as possible, and a high-dispersion optical material having the partial dispersion ratio as small as possible are to be selected. Accordingly, it is possible to reduce the secondary spectrum.

Whereas, the chromatic aberration of high-order corresponds to a high-order component (a distortion of color) for an image height of a spherical aberration of color (chromatic spherical aberration), a chromatic coma, and a chromatic aberration of magnification. In these aberrations, dispersion of the material and a source of origin of the high-order aberration for a reference wavelength (for example, 587.56 nm for d-line) are intertwined intricately. Generally, for correcting these, correction of aberration for the reference wavelength and correction of paraxial chromatic aberration are to be sacrificed. Consequently, it is desirable to correct independently.

As a technology for correcting the chromatic aberration, optical systems disclosed in Japanese Patent Application Laid-open Publication Nos. 2005-316047 and 2005-352265 have been known. In Japanese Patent Application Laid-open Publication Nos. 2005-316047 and 2005-352265, a transparent medium having an effective dispersion characteristic or a partial dispersion characteristic which a conventional glass does not have, has been introduced in the optical system.

Furthermore, in an electronic image pickup apparatus in which, an electronic image pickup element has been used, a flare due to the chromatic aberration for an h-line (404.66 nm) is susceptible to occur. As a patent literature in which an importance of correction of the chromatic aberration for h-line has been described, Japanese Patent Application Laid-open Publication No. 2001-208964 has been known.

SUMMARY OF THE INVENTION

The optical system described in Japanese Patent Application Laid-open Publication No. 2003-255228 has a high zooming ratio, and an improved image forming performance in spite of a small F-value at a wide angle end. However, in the optical system described in Japanese Patent Application Laid-open Publication No. 2003-255228, a thickness in an optical axial direction of each lens group (particularly, a first lens group) is substantial. Therefore, even when a so-called collapsible lens barrel which accommodates a lens barrel unit in a direction of thickness (depth) of a camera casing is used, it is difficult to make the camera casing slim.

Moreover, a transparent material described in Japanese Patent Application Laid-open Publication Nos. 2005-316047 and 2005-352265, has effective dispersion characteristics and partial dispersion characteristics which hitherto have not been there. However, the optical systems disclosed in Japanese Patent Application Laid-open Publication Nos. 2005-316047 and 2005-352265 are not slimmed sufficiently as compared to the optical systems in conventional examples.

Moreover, a concrete effective means for removing a chromatic flare in the optical system has not been described in Japanese Patent Application Laid-open Publication No. 2001-208964.

The present invention has been made in view of the above-mentioned issues which have hitherto been there, and an object of the present invention is to achieve an image forming optical system in which, it is possible to achieve both, the small-sizing and slimming of the optical system, and a favorable correction of various aberrations, mainly the chromatic aberration, and an image pickup apparatus which includes such image forming optical system.

To achieve the object, an image forming optical system including a lens component, according to the present invention has a lens component which consists of a lens L1 which is made of a transparent material having Abbe's number vd1, an intermediate layer L2 which is made of a transparent material having Abbe's number vd2, and a lens L3 which is made of a transparent material having Abbe's number vd3, and the intermediate layer L2 is in a close contact with an optical surface B of the lens L1, and a shape of an optical surface C of the intermediate layer L2 is an aspheric shape, and the lens L3 is in a close contact with the optical surface C.

Moreover, the image forming optical system satisfies the following conditional expressions (1) and (2)

$$0.012 < 1/vd3 - 1/vd1 < 0.090 \quad (1)$$

$$0.010 < 1/vd3 - 1/vd2 \quad (2)$$

where, vd1 denotes Abbe's number $(nd1-1)/(nF1-nC1)$ for the lens L1, vd2 denotes Abbe's number $(nd2-1)/(nF2-nC2)$ for the intermediate layer L2, and vd3 denotes Abbe's number $(nd3-1)/(nF3-nC3)$ for the lens L3, where, nd1, nC1, and nF1 denote refractive indices of the lens L1 for a d-line, a C-line, and an F-line respectively, nd2, nC2, and nF2 denote refractive indices of the intermediate layer L2 for the d-line, the C-line, and the F-line respectively, and nd3, nC3, and nF3 denote refractive indices of the lens L3 for the d-line, the C-line, and the F-line respectively.

Moreover, according to a preferable aspect of the present invention, it is preferable that the optical surface C is a refractive surface.

Moreover, according to a preferable aspect of the present invention, it is preferable that the optical surface B is a refractive surface.

Moreover, according to a preferable aspect of the present invention, it is preferable that the image forming optical system satisfies the following conditional expression (3).

$$|nd2 - nd3| < 0.27 \quad (3)$$

where, nd2 and nd3 denote refractive indices for the d-line of the intermediate layer L2 and the lens L3 respectively.

Moreover, according to a preferable aspect of the present invention, it is preferable that the image forming optical system satisfies the following conditional expression (4).

$$1.65 < nd1 \quad (4)$$

where, nd1 denotes a refractive index of the lens L1 for the d-line.

Moreover, according to a preferable aspect of the present invention, it is preferable that the image forming optical system satisfies the following conditional expressions (5) and (6).

$$-0.70 < \phi 3/\phi 1 < -0.10 \quad (5)$$

$$|\phi 1| > |\phi 3| > |\phi 2| \quad (6)$$

where, $\phi 1$, $\phi 2$, and $\phi 3$ denote refractive powers in air, of the lens L1, the intermediate layer L2, and the lens L3 respectively.

Moreover, according to a preferable aspect of the present invention, it is preferable that the intermediate layer L2 is made of an energy curable resin, and a thickness on an optical axis of the intermediate layer L2 is in a range of 0.03 mm to 2.00 mm.

Moreover, according to a preferable aspect of the present invention, it is preferable that the lens L3 is made of an energy curable resin, and a thickness on the optical axis of the lens L3 is in a range of 0.03 mm to 2.00 mm.

Moreover, according to a preferable aspect of the present invention, it is preferable that the lens L1 has an optical surface A, and both the optical surface B and the optical surface A are spherical surfaces.

Moreover, according to a preferable aspect of the present invention, it is preferable that the lens L1 has the optical surface A, and the lens L3 has an optical surface D, and both the optical surface A and the optical surface D are surfaces in contact with air.

According to a preferable aspect of the present invention, in a rectangular coordinate system with a horizontal axis let to be vd3 and a vertical axis let to be $\theta gF3$, when a straight line expressed by $\theta gF3 = \alpha 3 \times vd3 + \beta gF3$ (provided that $\alpha 3 = -0.00566$) is set, an area which is determined by a straight line when it is a lower limit value of a range of the following conditional expression (7) and a straight line when it is an upper limit value of the range of the following conditional expression (7), and in a rectangular coordinate system with a horizontal axis let to be vd3 and a vertical axis let to be nd3, when a straight line expressed by $nd3 = \alpha 3 \times vd3 + b3$ (provided that $\alpha 3 = -0.0267$) is set, an area which is determined by a straight line when it is a lower limit value of a range of the following conditional expression (8) and a straight line when it is an upper limit value of the range of the following conditional expression (8), and an area determined by the following conditional expression (9), it is preferable that these three areas include $\theta gf3$, nd3, and vd3 of the lens L3

$$0.6520 < \beta gF3 < 0.8150 \quad (7)$$

$$2.0 < b3 < 2.4 \text{ (provided that } nd3 > 1.3) \quad (8)$$

$$10 < vd3 < 35 \quad (9)$$

where, $\theta gF3$ denotes a partial dispersion ratio $(ng3-nF3)/(nF3-nC3)$ of the lens L3, vd3 denotes Abbe's number $(nd3-1)/(nF3-nC3)$ for the lens L3, and nd3, nC3, nF3, and ng3 denote refractive indices of the lens L3 for the d-line, the C-line, the F-line, and the g-line respectively.

Moreover, according to a preferable aspect of the present invention, in a rectangular coordinate system with a horizontal axis let to be vd3 and a vertical axis let to be $\theta hg3$, other than the rectangular coordinates, when a straight line expressed by $\theta hg3 = \alpha hg3 \times vd3 + \beta hg3$ (provided that $\alpha hg3 = -0.00834$) is set, an area which is determined by a straight line when it is a lower limit value of a range of the following conditional expression (10) and a straight line when it is an upper limit value of the range of the following conditional expression (10), and in a rectangular coordinate system with a horizontal axis let to be vd3 and a vertical axis let to be nd3, when a straight line expressed by $nd3 = a3 \times vd3 + b3$ (provided that $a3 = -0.0267$) is set, an area which is determined by a straight line when it is a lower limit value of a range of the following conditional expression (8) and a straight line when it is an upper limit value of the range of the following conditional expression (8), and an area determined by the following conditional expression (9), it is preferable that there three areas include θhg3, nd3, and vd3 of the lens L3.

$$0.6000 < \beta hg3 < 0.8320 \quad (10)$$

$$2.0 < b3 < 2.4 \text{ (provided that nd3} > 1.3) \quad (8)$$

$$10 < vd3 < 35 \quad (9)$$

where,

θhg3 denotes a partial dispersion ratio (nh3−ng3)/(nF3−nC3) of the lens L3, and nh3 denotes a refractive index of the lens L3 for an h-line.

Moreover, according to a preferable aspect of the present invention, it is preferable that the image forming optical system satisfies the following conditional expression (11).

$$-0.0700 \leq \theta gF3 - \theta gF1 \leq 0.1500 \quad (11)$$

where,

θgF1 denotes a partial dispersion ratio (ng1−nF1)/(nF1−nC1) of the lens L1, where, nd1, nC1, nF1, and ng1 denote refractive indices of the lens L1 for the d-line, the C-line, the F-line, and the g-line respectively.

Moreover, according to a preferable aspect of the present invention, it is preferable that the image forming optical system satisfies the following conditional expression (12).

$$-0.1000 \leq \theta hg3 - \theta hg1 \leq 0.2000 \quad (12)$$

where,

θhg1 denotes a partial dispersion ratio (nh1−ng1)/(nF1−nC1) of the lens L1, where, nh1 denotes a refractive index of the lens L1 for the h-line.

Moreover, according to a preferable aspect of the present invention, it is preferable that the lens component has a combined positive refractive power.

Moreover, according to a preferable aspect of the present invention, it is preferable that when a lens having a negative value for a paraxial focal length is let to be a negative lens, the lens L3 is a negative lens.

Moreover, according to a preferable aspect of the present invention, it is preferable that when a lens having a positive value for a paraxial focal length is let to be a positive lens, the lens L1 is a positive lens.

According to a preferable aspect of the present invention, it is preferable that the image forming optical system is a zooming optical system, and the zooming optical system, in order from an object side, consists of a first lens group having a positive refractive power, a second lens group having a negative refractive power, and a rear group having a positive refractive power. Moreover, it is preferable that the rear group consists of a plurality of lens groups of which, relative distances are variable at the time of zooming, and relative distances between the first lens group, the second lens group, and the rear group are variable at the time of zooming, and the lens component is used in the first lens group.

According to a preferable aspect of the present invention, it is preferable that the first lens group includes only the lens component.

Moreover, according to a preferable aspect of the present invention, it is preferable that a lens nearest to the object side, in the lens component is the lens L1.

Moreover, according to a preferable aspect of the present invention, it is preferable that each of a shape of the optical surface B and a shape of the optical surface C is a shape having a convex surface directed toward an image side.

Moreover, according to a preferable aspect of the present invention, when coordinate axes are let to be such that, an optical axial direction is z, and a direction perpendicular to the optical axis is h, R is let to be a radius of curvature on an optical axis of a spherical surface component, k is let to be a conical constant, and $A_4$, $A_6$, $A_8$, $A_{10}$, ... are let to be aspherical coefficients, and when a shape of the aspheric surface is expressed by the following expression (13)

$$z = h^2/R/[1+\{1-(1+k)h^2/R^2\}^{1/2}]+A_4h^4+A_6h^6+A_8h^8+ A_{10}h^{10}+\ldots \quad (13),$$

and when an amount of deviation is expressed by the following expression (14)

$$\Delta z = z - h^2/R/[1+\{1-h^2/R^2\}^{1/2}] \quad (14)$$

it is preferable that the image forming optical system satisfies the following conditional expression (15)

$$(\Delta z_A(h)+\Delta z_D(h))/2 \leq \Delta z_C(h) \leq 10 \cdot (\Delta z_A(h)+\Delta z_D(h))/2$$
$$\text{(provided that } h = 2.5a) \quad (15)$$

where, $z_A$ is a shape of the optical surface A, which is according to expression (13), $z_D$ is a shape of the optical surface D, which is according to expression (13), and $z_C$ is a shape of the optical surface C, which is according to expression (13), and $\Delta z_A$ denotes an amount of deviation at the optical surface A, which is an amount according to expression (14), $\Delta z_D$ denotes an amount of deviation at the optical surface D, which is an amount according to expression (14), $\Delta z_C$ denotes an amount of deviation at the optical surface C, which is an amount according to expression (14), $R_C$ is a paraxial radius of curvature of the optical surface C, a is an amount according to the following conditional expression (16)

$$a = (y_{10})^2 \cdot \log_{10} \gamma / fw \quad (16)$$

and moreover in expression (16), $y_{10}$ is the maximum image height, fw is a focal length of the overall image forming optical system at a wide angle end, γ is a zooming ratio in the image forming optical system (a focal length of the overall image forming optical system at a telephoto end/a focal length of the overall image forming optical system at the wide angle end), and moreover, for letting an apex of each surface to be an origin point, z(0)=0 all the time.

Moreover, according to a preferable aspect of the present invention, it is preferable that the second lens group, in order from the object side, consists of a negative lens component, and a lens component in which, three lenses are cemented, and a lens at a center of the three lenses satisfy the conditional expressions (7), (8), and (9).

Moreover, according a preferable aspect of the present invention, it is preferable that the rear group consists of two positive lens groups.

Moreover, according to a preferable aspect of the present invention, it is preferable that among the two positive lens groups, the lens group on the object side consists of one positive lens component and one negative lens component, and the negative lens component has three lenses which are cemented, and the negative lens component includes a positive lens nearest to the object side, a lens at the center, and a negative lens nearest to the image side, and the lens at the center satisfies conditional expressions (7), (8), and (9).

Moreover, an electronic image pickup apparatus according to the present invention includes the image forming optical system, an electronic image pickup element, and an image processing unit which processes image data which has been obtained by picking up an image formed by the image forming optical system, by the electronic image pickup element, and outputs as image data in which, a shape of the image has been changed, and the image forming optical system is a zoom lens, and the zoom lens satisfies the following conditional expression (16) at the time of infinite object point focusing.

$$0.70 < y_{07}/(fw \cdot \tan \omega_{07w}) < 0.97 \quad (16)$$

provided that, $y_{07}$ is expressed as $y_{07} = 0.7 \cdot y_{10}$, when a distance (the maximum image height) from a center up to the farthest point on an effective image pickup surface (on a surface on which an image can be picked up) of the electronic image pickup element is let to be $y_{10}$, $\omega_{07w}$ is an angle with respect to an optical axis in an object-point direction corresponding to an image point from a center on the image pickup surface up to a position of $y_{07}$, at a wide angle end, and fw is a focal length of the overall image forming zoom lens system at the wide angle end.

According to the present invention, an effect is shown that it is possible to achieve an image forming optical system in which, it is possible to achieve both, the small-sizing and slimming of an optical system, and a favorable correction of various aberrations, mainly the chromatic aberration, and an image pickup apparatus which includes such image forming optical system.

BRIEF DESCRIPTION OF THE DRAWINGS

FIG. 1A shows a state at a wide angle end, FIG. 1B shows an intermediate state, and FIG. 1C shows a state at a telephoto end;

FIG. 2A shows a state at the wide angle end, FIG. 2B shows an intermediate state, and FIG. 2C shows a state at the telephoto end;

FIG. 3A, FIG. 3B, and FIG. 3C are diagrams showing the spherical aberration (SA), the chromatic aberration of magnification (CC), and a chromatic coma (DYY) (image height ratio 0.7, 1.0) when θgF=0.6684, at the time of infinite object point focusing of the zoom lens according to the first embodiment, where, FIG. 3A shows a state at the wide angle end, FIG. 3B shows an intermediate focal length state, and FIG. 3C shows a state at the telephoto end;

FIG. 4A, FIG. 4B, and FIG. 4C are diagrams showing the spherical aberration (SA), the chromatic aberration of magnification (CC), and the chromatic coma (DYY) (image height ratio 0.7, 1.0) when θgF=6307, at the time of infinite object point focusing of the zoom lens according to the first embodiment, where, FIG. 4A shows a state at the wide angle end, FIG. 4B shows an intermediate focal length state, and FIG. 4C shows a state at the telephoto end;

FIG. 5A, FIG. 5B, and FIG. 5C are diagrams showing the spherical aberration (SA), the chromatic aberration of magnification (CC), and the chromatic coma (DYY) (image height ratio 0.7, 1.0) when θgF=0.6255, at the time of infinite object point focusing of the zoom lens according to the first embodiment, where, FIG. 5A shows a state at the wide angle end, FIG. 5B shows an intermediate focal length state, and FIG. 5C shows a state at the telephoto end;

FIG. 6A shows a state at the wide angle end, FIG. 6B shows an intermediate focal length state, and FIG. 6C shows a state at the telephoto end;

FIG. 7A, FIG. 7B, and FIG. 7C are diagrams showing the spherical aberration (SA), the chromatic aberration of magnification (CC), and the chromatic coma (DYY) (image height ratio 0.7, 1.0) when θgF=0.6103, at the time of infinite object point focusing of the zoom lens according to the first embodiment, where, FIG. 7A shows a state at the wide angle end, FIG. 7B shows an intermediate focal length state, and FIG. 7C shows a state at the telephoto end;

FIG. 8A shows a state at the wide angle end, FIG. 8B shows an intermediate focal length state, and FIG. 8C shows a state at the telephoto end;

FIG. 9A shows a state at a wide angle end, FIG. 9B shows an intermediate state, and FIG. 9C shows a state at a telephoto end;

FIG. 10A shows a state at the wide angle end; FIG. 10B shows an intermediate state, and FIG. 10C shows a state at the telephoto end;

FIG. 11A, FIG. 11B, and FIG. 11C are diagrams showing the spherical aberration (SA), the chromatic aberration of magnification (CC), and a chromatic coma (DYY) (image height ratio 0.7, 1.0) when θgF=0.6684, at the time of infinite object point focusing of the zoom lens according to the second embodiment, where, FIG. 11A shows a state at the wide angle end, FIG. 11B shows an intermediate focal length state, and FIG. 11C shows a state at the telephoto end;

FIG. 12A shows a state at the wide angle end, FIG. 12B shows an intermediate focal length state, and FIG. 12C shows a state at the telephoto end;

FIG. 13A, FIG. 13B, and FIG. 13C are diagrams showing the spherical aberration (SA), the chromatic aberration of magnification (CC), and the chromatic coma (DYY) (image height ratio 0.7, 1.0) when θgF=0.6255, at the time of infinite object point focusing of the zoom lens according to the second embodiment, where, FIG. 13A shows a state at the wide angle end, FIG. 13B shows an intermediate focal length state, and FIG. 13C shows a state at the telephoto end;

FIG. 14A shows a state at the wide angle end, FIG. 14B shows an intermediate focal length state, and FIG. 14C shows a state at the telephoto end;

FIG. 15A shows a state at the wide angle end, FIG. 15B shows an intermediate focal length state, and FIG. 15C shows a state at the telephoto end;

FIG. 16A, FIG. 16B, and FIG. 16C are diagrams showing the spherical aberration (SA), the chromatic aberration of magnification (CC), and the chromatic coma (DYY) (image height ratio 0.7, 1.0) when θgF=0.5840, at the time of infinite object point focusing of the zoom lens according to the second embodiment, where, FIG. 16A shows a state at the wide angle end, FIG. 16B shows an intermediate focal length state, and FIG. 16C shows a state at the telephoto end;

FIG. 17A shows a state at a wide angle end, FIG. 17B shows an intermediate state, and FIG. 17C shows a state at a telephoto end;

FIG. 18A shows a state at the wide angle end, FIG. 18B shows an intermediate state, and FIG. 18C shows a state at the telephoto end;

FIG. 19A, FIG. 19B, and FIG. 19C are diagrams showing the spherical aberration (SA), the chromatic aberration of magnification (CC), and a chromatic coma (DYY) (image height ratio 0.7, 1.0) when θgF=0.6684, at the time of infinite object point focusing of the zoom lens according to the third embodiment, where, FIG. 19A shows a state at the wide angle end, FIG. 19B shows an intermediate focal length state, and FIG. 19C shows a state at the telephoto end;

FIG. 20A shows a state at the wide angle end, FIG. 20B shows an intermediate focal length state, and FIG. 20C shows a state at the telephoto end;

FIG. 21A, FIG. 21B, and FIG. 21C are diagrams showing the spherical aberration (SA), the chromatic aberration of magnification (CC), and the chromatic coma (DYY) (image height ratio 0.7, 1.0) when θgF=0.6255, at the time of infinite object point focusing of the zoom lens according to the third embodiment, where, FIG. 21A shows a state at the wide angle end, FIG. 21B shows an intermediate focal length state, and FIG. 21C shows a state at the telephoto end;

FIG. 22A shows a state at the wide angle end, FIG. 22B shows an intermediate focal length state, and FIG. 22C shows a state at the telephoto end;

FIG. 23A, FIG. 23B, and FIG. 23C are diagrams showing the spherical aberration (SA), the chromatic aberration of magnification (CC), and the chromatic coma (DYY) (image height ratio 0.7, 1.0) when θgF=0.6103, at the time of infinite object point focusing of the zoom lens according to the third embodiment, where, FIG. 23A shows a state at the wide angle end, FIG. 23B shows an intermediate focal length state, and FIG. 23C shows a state at the telephoto end;

FIG. 24A, FIG. 24B, and FIG. 24C are diagrams showing the spherical aberration (SA), the chromatic aberration of magnification (CC), and the chromatic coma (DYY) (image height ratio 0.7, 1.0) when θgF=0.5840, at the time of infinite object point focusing of the zoom lens according to the third embodiment, where, FIG. 24A shows a state at the wide angle end, FIG. 24B shows an intermediate focal length state, and FIG. 24C shows a state at the telephoto end;

FIG. 25A shows a state at a wide angle end, FIG. 25B shows an intermediate state, and FIG. 25C shows a state at a telephoto end;

FIG. 26A shows a state at the wide angle end, FIG. 26B shows an intermediate state, and FIG. 26C shows a state at the telephoto end;

FIG. 27A shows a state at the wide angle end, FIG. 27B shows an intermediate focal length state, and FIG. 27C shows a state at the telephoto end;

FIG. 28A, FIG. 28B, and FIG. 28C are diagrams showing the spherical aberration (SA), the chromatic aberration of magnification (CC), and the chromatic coma (DYY) (image height ratio 7.0, 1.0) when θgF=0.6307, at the time of infinite object point focusing of the zoom lens according to the fourth embodiment, where, FIG. 28A shows a state at the wide angle end, FIG. 28B shows an intermediate focal length state, and FIG. 28C shows a state at the telephoto end;

FIG. 29A, FIG. 29B, and FIG. 29C are diagrams showing the spherical aberration (SA), the chromatic aberration of magnification (CC), and the chromatic coma (DYY) (image height ratio 0.7, 1.0) when θgF=0.6255, at the time of infinite object point focusing of the zoom lens according to the fourth embodiment, where, FIG. 29A shows a state at the wide angle end, FIG. 29B shows an intermediate focal length state, and FIG. 29C shows a state at the telephoto end;

FIG. 30A, FIG. 30B, and FIG. 30C are diagrams showing the spherical aberration (SA), the chromatic aberration of magnification (CC), and the chromatic coma (DYY) (image height ratio 0.7, 1.0) when θgF=0.6203, at the time of infinite object point focusing of the zoom lens according to the fourth embodiment, where, FIG. 30A shows a state at the wide angle end, FIG. 30B shows an intermediate focal length state, and FIG. 30C shows a state at the telephoto end;

FIG. 31A shows a state at the wide angle end, FIG. 31B shows an intermediate focal length state, and FIG. 31C shows a state at the telephoto end;

FIG. 32A, FIG. 32B, and FIG. 32C are diagrams showing the spherical aberration (SA), the chromatic aberration of magnification (CC), and the chromatic coma (DYY) (image height ratio 0.7, 1.0) when θgF=0.5840, at the time of infinite object point focusing of the zoom lens according to the fourth embodiment where, FIG. 32A shows a state at the wide angle end, FIG. 32B shows an intermediate focal length state, and FIG. 32C shows a state at the telephoto end;

FIG. 33A shows a state at a wide angle end, FIG. 33B shows an intermediate state, and FIG. 33C shows a state at a telephoto end;

FIG. 34A shows a state at the wide angle end, FIG. 34B shows an intermediate state, and FIG. 34C shows a state at the telephoto end;

FIG. 35A, FIG. 35B, and FIG. 35C are diagrams showing the spherical aberration (SA), the chromatic aberration of magnification (CC), and a chromatic coma (DYY) (image height ratio 7.0, 1.0) when θgF=0.6684, at the time of infinite object point focusing of the zoom lens according to the fifth embodiment, where, FIG. 35A shows a state at the wide angle end, FIG. 35B shows an intermediate focal length state, and FIG. 35C shows a state at the telephoto end;

FIG. 36A shows a state at the wide angle end, FIG. 36B shows an intermediate focal length state, and FIG. 36C shows a state at the telephoto end;

FIG. 37A, FIG. 37B, and FIG. 37C are diagrams showing the spherical aberration (SA), the chromatic aberration of magnification (CC), and the chromatic coma (DYY) (image height ratio 7.0, 1.0) when θgF=0.6255, at the time of infinite object point focusing of the zoom lens according to the fifth embodiment, where, FIG. 37A shows a state at the wide angle end, FIG. 37B shows an intermediate focal length state, and FIG. 37C shows a state at the telephoto end;

FIG. 38A, FIG. 38B, and FIG. 38C are diagrams showing the spherical aberration (SA), the chromatic aberration of magnification (CC), and the chromatic coma (DYY) (image height ratio 7.0, 1.0) when θgF=0.6203, at the time of infinite object point focusing of the zoom lens according to the fifth embodiment, where, FIG. 38A shows a state at the wide angle end, FIG. 38B shows an intermediate focal length state, and FIG. 38C shows a state at the telephoto end;

FIG. 39A, FIG. 39B, and FIG. 39C are diagrams showing the spherical aberration (SA), the chromatic aberration of magnification (CC), and the chromatic coma (DYY) (image height ratio 7.0, 1.0) when θgF=0.6103, at the time of infinite object point focusing of the zoom lens according to the fifth embodiment, where, FIG. 39A shows a state at the wide angle end, FIG. 39B shows an intermediate focal length state, and FIG. 39C shows a state at the telephoto end;

FIG. 40A, FIG. 40B, and FIG. 40C are diagrams showing the spherical aberration (SA), the chromatic aberration of magnification (CC), and the chromatic coma (DYY) (image height ratio 0.7, 1.0) when θgF=0.5840, at the time of infinite object point focusing of the zoom lens according to the fifth embodiment, where, FIG. 40A shows a state at the wide angle end, FIG. 40B shows an intermediate focal length state, and FIG. 40C shows a state at the telephoto end;

FIG. 41A shows a state at a wide angle end, FIG. 41B shows an intermediate state, and FIG. 41C shows a state at a telephoto end;

FIG. 42A shows a state at the wide angle end, FIG. 42B shows an intermediate state, and FIG. 42C shows a state at the telephoto end;

FIG. 43A, FIG. 43B, and FIG. 43C are diagrams showing the spherical aberration (SA), the chromatic aberration of magnification (CC), and a chromatic coma (DYY) (image height ratio 7.0, 1.0) when θgF=0.6684, at the time of infinite object point focusing of the zoom lens according to the sixth embodiment, where, FIG. 43A shows a state at the wide angle end, FIG. 43B shows an intermediate focal length state, and FIG. 43C shows a state at the telephoto end;

FIG. 44A, FIG. 44B, and FIG. 44C are diagrams showing the spherical aberration (SA), the chromatic aberration of magnification (CC), and the chromatic coma (DYY) (image height ratio 0.7, 1.0) when θgF=0.6307, at the time of infinite object point focusing of the zoom lens according to the sixth embodiment, where, FIG. 44A shows a state at the wide angle end, FIG. 44B shows an intermediate focal length state, and FIG. 44C shows a state at the telephoto end;

FIG. 45A shows a state at the wide angle end, FIG. 45B shows an intermediate focal length state, and FIG. 45C shows a state at the telephoto end;

FIG. 46A shows a state at the wide angle end, FIG. 46B shows an intermediate focal length state, and FIG. 46C shows a state at the telephoto end;

FIG. 47A, FIG. 47B, and FIG. 47C are diagrams showing the spherical aberration (SA), the chromatic aberration of magnification (CC), and the chromatic coma (DYY) (image height ratio 0.7, 1.0) when θgF=0.6103, at the time of infinite object point focusing of the zoom lens according to the sixth embodiment, where, FIG. 47A shows a state at the wide angle end, FIG. 47B shows an intermediate focal length state, and FIG. 47C shows a state at the telephoto end;

FIG. 48A shows a state at the wide angle end, FIG. 48B shows an intermediate focal length state, and FIG. 48C shows a state at the telephoto end;

FIG. 55A is a front view of a mobile telephone 400, FIG. 55B is a side view of the mobile telephone 400, and FIG. 55C is a cross-sectional view of a photographic optical system 405.

EXPLANATION OF SYMBOLS

Figure 1A:
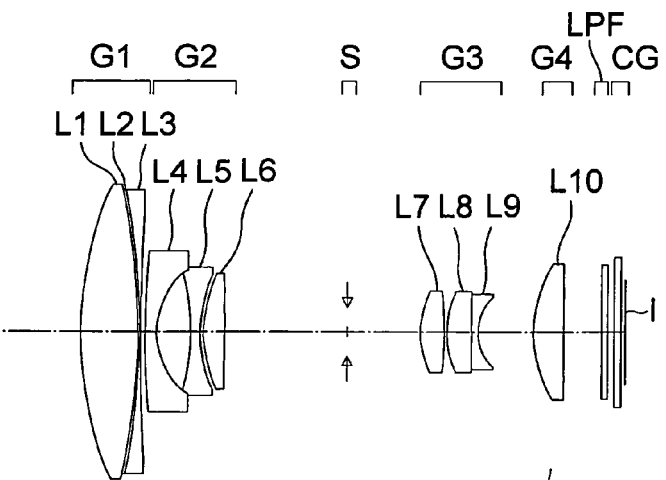
FIG. 1A, FIG. 1B, and FIG. 1C are cross-sectional views along an optical axis showing an optical arrangement at the time of infinite object point focusing of a zoom lens according to a first embodiment of the present invention, where.

G1: first lens group
G2: second lens group
G3: third lens group
G4: fourth lens group
L1 to L12: lens
LPF: low pass filter
CG: cover glass
I: image pickup surface
E: viewer's eye
40: digital camera
41: taking optical system
42: taking optical path
43: finder optical system
44: optical path for finder
45: shutter
46: flash
47: liquid crystal display monitor
48: zoom lens
49: CCD
50: image pickup surface
51: processing unit
53: objective optical system for finder
55: Porro prism
57: field frame
59: eyepiece optical system
66: focusing lens
67: image plane
100: objective optical system
102: cover glass
162: electronic image pickup element chip
166: terminal
300: personal computer
301: keyboard
302: monitor
303: taking optical system
304: taking optical path
305: image
400: cellular phone
401: microphone portion
402: speaker portion
403: input dial
404: monitor
405: taking optical system
406: antenna
407: taking optical path

DETAILED DESCRIPTION OF THE PREFERRED EMBODIMENTS

Prior to the description of embodiments, an action and an effect of an image forming optical system according to the embodiments will be described below.

A predetermined lens component is used in an image forming optical system according to the embodiments. The predetermined lens component consists of a lens L1 which is made of a transparent material having Abbe's number vd1, an intermediate layer which is made of a transparent material having Abbe's number vd2, and a lens L3 which is made of a transparent material having Abbe's number vd3. Here, the intermediate layer L2 is in a close contact with an optical surface B of the lens L1, and a shape of an optical surface C of the intermediate layer L2 is an aspheric shape, and the lens L3 is in a close contact with the optical surface C. Moreover, the lens L1, the intermediate layer L2, and the lens L3 are in a close contact.

When an aspheric surface is used for a surface in contact with air, by the aspheric surface, it is possible to achieve a substantial correction effect with respect to a spherical aberration, a coma aberration, and a distortion. However, even when the surface in contact with air is let to be an aspheric surface, it is not possible to achieve sufficient correction effect with respect to a high-order component (distortion of color) for an image height of a high-order chromatic aberration, or in other words, a spherical aberration of color, a chromatic coma, and a chromatic aberration of magnification. Therefore, in the image forming optical system of the embodiments, an interface of a transparent material having substantially different dispersion, or in other words, the optical surface C is made an aspheric surface. By doing so, it is possible to achieve a substantial correction effect with respect to the chromatic aberration of high-order. As a result, it is possible to achieve both, the small-sizing and slimming of an optical system, and a favorable correction of various aberrations, mainly the chromatic aberration.

In the image forming optical system of the embodiments, the following conditional expressions (1) and (2) are satisfied.

$$0.012 < 1/vd3 - 1/vd1 < 0.090 \quad (1)$$

$$0.010 < 1/vd3 - 1/vd2 \quad (2)$$

where, vd1 denotes Abbe's number $(nd1-1)/(nF1-nC1)$ for (of) the lens L1, vd2 denotes Abbe's number $(nd2-1)/(nF2-nC2)$ for the intermediate layer L2, and vd3 denotes Abbe's number $(nd3-1)/(nF3-nC3)$ for the lens L3, where, nd1, nC1, and nF1 denote refractive indices of the lens L1 for a d-line, a C-line, and an F-line respectively, nd2, nC2, and nF2 denote refractive indices of the intermediate layer L2 for the d-line, the C-line, and the F-line respectively, and nd3, nC3, and nF3 denote refractive indices of the lens L3 for the d-line, the C-line, and the F-line respectively.

Conditional expression (1) is an expression in which, a difference in Abbe's number for a medium forming the lens L1 and Abbe's number for a medium forming the lens L3 is regulated. Conditional expression (1) is significant as a condition for correcting the chromatic aberration of a focal position and the chromatic aberration of a focal length. When a lower limit value of conditional expression (1) is surpassed, correction of these chromatic aberrations is susceptible to be insufficient. Whereas, when an upper limit value of conditional expression (1) is surpassed, due to relevance to correction of other aberration such as the spherical aberration, the correction of these chromatic aberrations is susceptible to be excessive. The chromatic aberration of the focal position and the chromatic aberration of the focal point in this case means a difference in chromatic aberration between (for) two wavelengths for a C-line and an F-line.

Conditional expression (2) is an expression in which, a difference in Abbe's number for a medium forming the intermediate layer L2 and Abbe's number for the medium forming the lens L3 is regulated. Conditional expression (2) is significant as a condition for correcting the chromatic aberration of a high order. When a lower limit value of conditional expression (2) is surpassed, it is not possible to correct these chromatic aberrations sufficiently. Moreover, higher the difference in the Abbe's number, the effect is more, and furthermore, an effect on other aberrations tends to be smaller. Therefore, there is no limit on the upper limit value of conditional expression (1) (is determined by a medium which exists in reality).

It is more preferable that the image forming optical system of the embodiments satisfies the following conditional expressions (1') and (2') instead of conditional expressions (1) and (2).

$$0.017 < 1/vd3 - 1/vd1 < 0.090 \quad (1')$$

$$0.015 < 1/vd3 - 1/vd2 \quad (2')$$

Furthermore, it is all the more preferable that the image forming optical system of the embodiments satisfies the following conditional expressions (1") and (2").

$$0.022 < 1/vd3 - 1/vd1 < 0.090 \quad (1'')$$

$$0.020 < 1/vd3 - 1/vd2 \quad (2'')$$

In the image forming optical system of the embodiments, it is preferable to use the optical surface C as a refractive surface.

Moreover, similarly, it is preferable to use the optical surface B as a refractive surface.

Moreover, it is preferable that the image forming optical system of the embodiments satisfy the following conditional expression (3).

$$|nd2 - nd3| < 0.27 \quad (3)$$

where, nd2 and nd3 denote refractive indices for the d-line of the intermediate layer L2 and the lens L3 respectively.

When the image forming optical system satisfies conditional expression (3), since a difference in the refractive indices of the intermediate layer L2 and the lens L3 becomes small, in a case of correcting the chromatic aberration of high order, an effect on other aberrations is small. When an upper limit value of conditional expression (3) is surpassed, although it is possible to correct the chromatic aberration of high order, the coma aberration and the spherical aberration of high order are susceptible to occur.

It is more preferable that the image forming optical system of the embodiments satisfy the following conditional expression (3') instead of conditional expression (3).

$$|nd2 - nd3| < 0.20 \quad (3')$$

It is all the more preferable that the image forming optical system of the embodiments satisfy the following conditional expression (3") instead of conditional expression (3).

$$|nd2 - nd3| < 0.13 \quad (3'')$$

Moreover, it is preferable that the image forming optical system of the embodiments satisfies conditional expression (4).

$$1.65 < nd1 \quad (4)$$

where, nd1 denotes a refractive index of the lens L1 for the d-line.

When a lower limit value of conditional expression (4) is surpassed, it becomes difficult to shorten an overall length of the optical system with the spherical aberration and the coma aberration being corrected beyond certain level.

It is more preferable that the image forming optical system of the embodiments satisfies the following conditional expression (4') instead of conditional expression (4).

$$1.73 < nd1 \quad (4')$$

It is all the more preferable that the image forming optical system of the embodiments satisfies the following conditional expression (4") instead of conditional expression (4).

$$1.80 < nd1 \quad (4'')$$

It is preferable that the image forming optical system of the embodiments satisfies the following conditional expressions (5) and (6).

$$-0.70 < \phi3/\phi1 < -0.10 \quad (5)$$

$$|\phi1| > |\phi3| > |\phi2| \quad (6)$$

where, $\phi1$, $\phi2$, and $\phi3$ denote a refractive power in air, of the lens L1, the intermediate layer L2, and the lens L3 respectively.

Conditional expression (5) is an expression in which, a power ratio of each of the lens L1 and. L3 is regulated. When an upper limit value of conditional expression (5) is surpassed, correction of the spherical aberration, the coma aberration, the chromatic aberration of the focal position, and the chromatic aberration of the focal length becomes difficult. Moreover, when a lower limit value of conditional expression (5) is surpassed, a power as the lens component becomes insufficient, and the overall length of the optical system increases.

Conditional expression (6) is an expression in which, a power of the lens L1 is made to be the strongest, and a power of the intermediate layer L2 is made to be the weakest. When the image forming optical system does not satisfy conditional expression (6) (when order is reversed by even one), it becomes difficult to secure a necessary paraxial amount (particularly, the power) as the overall lens component while carrying out correction of the spherical aberration, the coma aberration, the chromatic aberration of the focal position, and the chromatic aberration of the focal length.

It is more preferable that the image forming optical system of the embodiments satisfies the following conditional expression (5') instead of conditional expression (5).

$$-0.60 < \phi3/\phi1 < -0.20 \quad (5')$$

It is all the more preferable that the image forming optical system of the embodiments satisfies the following conditional expression (5") instead of conditional expression (5).

$$-0.50<\phi 3/\phi 1<-0.30 \tag{5"}$$

It is preferable to form the predetermined lens component by bringing the intermediate layer L2 in a close contact with the optical surface B of the lens L1, and furthermore, by bringing the lens L3 in a close contact with the optical surface C of the intermediate layer L2. At this time, when the lens L1 is let to be a reference, it is preferable that Abbe's number for the intermediate layer L2 is close to Abbe's number for the lens L1, and Abbe's number for the lens L3 differs substantially from Abbe's number for lens L1. Moreover, it is preferable to cure the intermediate layer L2 with respect to the Lens L1, and to cure the lens L3 with respect to the intermediate layer L2 during formation. Accordingly, it is possible to bring the lens the intermediate layer L2, and the lens L3 in a close contact mutually.

Here, it is preferable to form the intermediate layer L2 by an energy curable resin. In this case, it is preferable to let a thickness of the intermediate layer L2 in a range of 0.03 mm to 2.00 mm. Moreover, it is preferable to form the lens L3 by an energy curable resin. In this case, it is preferable to let a thickness of the lens L3 in a range of 0.03 mm to 2.00 mm.

By doing so, it is possible to form the intermediate layer L2 and the lens L3 by an extremely thin layer. Therefore, it is possible to reduce a thickness of the predetermined lens component as a whole. Moreover, this not only leads to slimming of the predetermined lens component, but in the optical system it is possible to make a position of an entrance pupil shallow without carrying out the aberration correction forcedly. Therefore, it is possible to realize small sizing of the overall optical system. The thickness in this case is a thickness of the lens L1 measured on an optical axis.

As it has been described above, in the predetermined lens component, the optical surface C is formed by an aspheric surface. Therefore, it is preferable to form both surfaces (the optical surface A and the optical surface B) of the lens L1 by spherical surfaces. Presumptively, when the lens L1 is formed by an aspheric surface, in a case in which, a processing difference between an optical axis of the lens L1 (a line connecting centers of paraxial curvatures) and an axis of symmetry of rotation of the aspheric surface, an aberration of asymmetric rotation occurs.

In the predetermined lens component, another optical element may be added to the optical surface D of the lens L3. For instance, a fourth lens and a fifth lens, or layers of optical medium may be cemented in order, to the optical surface D of the lens L3. When such an arrangement is made, it is possible to correct not only the chromatic aberration but also high-order aberrations related to the spherical aberration, the coma aberration, and the distortion. However, another optical element may not be added practically. In other words, the optical surface D may be an air-contact surface.

So far, a method for correcting the chromatic aberration of the focal position and the chromatic aberration of the focal length between two wavelengths fro the C-line and the F-line, and high-order component related to an image height of the chromatic aberration of magnification, the chromatic coma, and the spherical aberration of color, or in other words, the chromatic aberration of high order, has been mentioned. Furthermore, it is all the more preferable when it is possible to correct the remaining chromatic aberration for other wavelengths when the chromatic aberration between the two wavelengths for the C-line and the F-line has been corrected.

Therefore, in the image forming optical system of the embodiments, in a rectangular coordinate system with a horizontal axis let to be vd3 and a vertical axis let to be θgF3, when a straight line expressed by θgF3=α3×vd3+βgF3 (provided that α3=−0.00566) is set, an area which is determined by a straight line when it is a lower limit value of a range of the following conditional expression (7) and a straight line when it is an upper limit value of the range of the following conditional expression (7), and in a rectangular coordinate system with a horizontal axis let to be vd3 and a vertical axis let to be nd3, when a straight line expressed by nd3=a3×vd3+b3 (provided that a3=−0.0267) is set, an area which is determined by a straight line when it is a lower limit value of a range of the following conditional expression (8) and a straight line when it is an upper limit value of the range of the following conditional expression (8), and an area determined by the following conditional expression (9), it is preferable that these three areas include θgf3, nd3, and vd3 of the lens L3

$$0.6520<\beta gF3<0.8150 \tag{7}$$

$$2.0<b3<2.4 \text{ (provided that nd3>1.3)} \tag{8}$$

$$10<vd3<35 \tag{9}$$

where,

θgF3 denotes a partial dispersion ratio (ng3−nF3)/(nF3−nC3) of the lens L3, vd3 denotes Abbe's number (nd3−1)/(nF3−nC3) of the lens L3, and nd3, nC3, nF3, and ng3 denote refractive indices of the lens L3 for the d-line, the C-line, the F-line, and the g-line respectively.

Conditional expression (7) is an expression related to the partial dispersion ratio θgF3 of a glass material of the lens L3. When a glass material not satisfying a range of conditional expression (7) is used for the lens L3, (when the lens L3 is used in the optical system), correction of a longitudinal chromatic aberration and the chromatic aberration of magnification due to a secondary spectrum, or in other words, the chromatic aberration of magnification and the longitudinal chromatic aberration for the g-line when achromatized for the F-line and the C-line, is not sufficient. Therefore, in an image which has been picked up, it is difficult to secure a sharpness on the overall screen.

Conditional expression (8) is an expression related to a refractive index of the glass material of the lens L3. When a glass material which surpasses an upper limit value of conditional expression (8) has been used for the lens L3 (when the lens L3 is used in the optical system), Petzval's sum for the overall optical system is susceptible to increase, and correction of a curvature of field is difficult. Whereas, when a glass material which surpasses a lower limit value of conditional expression (8) has been used for the lens L3 (when the lens L3 is used in the optical system), the spherical aberration for the overall optical system is susceptible to increase.

Conditional expression (9) is an expression related to Abbe's number for the glass material of the lens L3. When a glass material which surpasses an upper limit value of conditional expression (9) has been used for the lens L3 (when the lens L3 is used in the optical system), achromatizing for the F-line and the C-line for the overall optical system becomes difficult. When a glass material which surpasses a lower limit value of conditional expression (9) has been used for the lens L3 (when the lens L3 is used in the optical system), although achromatizing for the F-line and the C-line for the overall optical system may be possible, correction effect with respect to five Seidal aberrations becomes small.

It is more preferable that the image forming optical system of the embodiments satisfies the following conditional expression (7') instead of conditional expression (7).

$$0.6820 < \beta gF3 < 0.7640 \tag{7'}$$

It is all the more preferable that the image forming optical system of the embodiments satisfies the following conditional expression (7") instead of conditional expression (7).

$$0.7020 < \beta gF3 < 0.7530 \tag{7"}$$

Furthermore, it is more preferable that the image forming optical system of embodiments satisfies the following conditional expression (8') instead of conditional expression (8).

$$2.06 < b3 < 2.34 \text{ (provided that nd3>1.3)} \tag{8'}$$

Furthermore, it is all the more preferable that the image forming optical system satisfies the following conditional expression (8") instead of conditional expression (8).

$$2.11 < b3 < 2.28 \text{ (provided that nd3>1.3)} \tag{8"}$$

It is more preferable that the image forming optical system of the embodiments satisfies the following conditional expression (9') instead of conditional expression (9).

$$12.5 < vd3 < 28 \tag{9'}$$

Furthermore, it is all the more preferable that the image forming optical system of the embodiments satisfies the following conditional expression (9") instead of conditional expression (9).

$$14.8 < vd3 < 25 \tag{9"}$$

Moreover, in the image forming optical system of the embodiments, in a rectangular coordinate system with a horizontal axis let to be vd3 and a vertical axis let to be θhg3, other than the rectangular coordinates, when a straight line expressed by θhg3=αhg3×vd3+βhg3 (provided that 60 hg3=−0.00834) is set, an area which is determined by a straight line when it is a lower limit value of a range of the following conditional expression (10) and a straight line when it is an upper limit value of the range of the following conditional expression (10), and in a rectangular coordinate system with a horizontal axis let to be vd3 and a vertical axis let to be nd3, when a straight line expressed by nd3=a3×vd3+b3 (provided that a3=−0.0267) is set, an area which is determined by a straight line when it is a lower limit value of a range of the following conditional expression (8) and a straight line when it is an upper limit value of the range of the following conditional expression (8), and an area determined by the following conditional expression (9), it is preferable that there three areas include θhg3, nd3, and vd3 of the lens L3.

$$0.6000 < \beta hg3 < 0.8320 \tag{10}$$

$$2.0 < b3 < 2.4 \text{ (provided that nd3>1.3)} \tag{8}$$

$$10 < vd3 < 35 \tag{9}$$

where,
θhg3 denotes a partial dispersion ratio (nh3−ng3)/(nF3−nC3) of the lens L3, and
nh3 denotes a refractive index of the lens L3 for an h-line.

Conditional expression (10) is an expression related to the partial dispersion ratio θhg3 of a glass material of the lens L3. When a glass material which does not satisfy a range of conditional expression (10) is used for the lens L3, correction of the longitudinal chromatic aberration and the chromatic aberration of magnification due to the secondary spectrum, or in other words, the chromatic aberration of magnification and the longitudinal chromatic aberration for the h-line when achromatized for the F-line and the C-line, is not sufficient. Therefore, in an image which has been picked up, chromatic spreading and chromatic flare of purple are susceptible to occur on the overall screen.

It is more preferable that the image forming optical system of the embodiments satisfies the following conditional expression (10') instead of conditional expression (10).

$$0.6400 < \beta hg3 < 0.7800 \tag{10'}$$

Furthermore, it is all the more preferable that the image forming optical system of the embodiments satisfies the following conditional expression (10") instead of conditional expression (10).

$$0.6700 < \beta hg3 < 0.7600 \tag{10"}$$

Incidentally, the partial dispersion ratio θgF and θhg for an optical material with a high dispersion are generally higher as compared to the partial dispersion ratio θgF and θhg for an optical material with a low dispersion. Therefore, when the chromatic aberration of the focal position and the chromatic aberration of the focal length are corrected for the C-line and the F-line, the chromatic aberrations for the g-line and the h-line remain. In other words, the secondary spectrum occurs. Therefore, it is preferable to make a difference in the partial dispersion ratio θgF and θhg of the lens L3 (high-dispersion lens) and the lens L1 (low-dispersion lens) as small as possible. By doing so, it is possible to achromatize for the g-line and the h-line.

Consequently, it is preferable that the image forming optical system of the embodiments satisfies the following conditional expression (11).

$$-0.0700 \leq \theta gF3 - \theta gF1 \leq 0.1500 \tag{11}$$

where,
θgF1 denotes a partial dispersion ratio (ng1−nF1)/(nF1−nC1) of the lens L1,
where,
nd1, nC1, nF1, and ng1 denote refractive indices of the lens L1 for the d-line, the C-line, the F-line, and the g-line respectively.

When the image forming optical system satisfies conditional expression (11), correction with respect to the secondary spectrum (particularly, the chromatic aberration for the g-line) becomes more effective. As a result, there is an increase in a sharpness of an image which has been picked up (the effect is more, particularly at the telephoto end, in a case of the zooming optical system).

Moreover, it is more preferable that the image forming optical system of the embodiments satisfies the following conditional expression (11') instead of conditional expression (11).

$$-0.0400 \leq \theta gF3 - \theta gF1 \leq 0.0900 \tag{11'}$$

Furthermore, it is all the more preferable that the image forming optical system of the embodiments satisfies the following conditional expression (11") instead of conditional expression (11).

$$-0.0100 \leq \theta gF3 - \theta gF1 \leq 0.0800 \tag{11"}$$

Moreover, it is preferable that the image forming optical system of the embodiments satisfies the following conditional expression (12).

$$-0.1000 \leq \theta hg3 - \theta hg1 \leq 0.2000 \tag{12}$$

where,
θhg1 denotes a partial dispersion ratio (nh1−ng1)/(nF1−nC1) of the lens L1,
where,
nh1 denotes a refractive index of the lens L1 for the h-line.

When the image forming optical system satisfies conditional expression (12), correction with respect to the secondary spectrum (particularly the chromatic aberration of the h-line) is more effective. As a result, in an image which has been picked up, it is possible to reduce the chromatic flare and the chromatic spreading. An effect of the reduction in the chromatic flare and the chromatic spreading, in a case of the zooming optical system, is remarkable particularly at the telephoto end.

Moreover, it is more preferable that the image forming optical system of the embodiments satisfies the following conditional expression (12') instead of conditional expression (12).

$$-0.0600 \leq \theta hg3 - \theta hg1 \leq 0.1400 \quad (12')$$

Furthermore, it is all the more preferable that the image forming optical system of the embodiment satisfies the following conditional expression (12") instead of conditional expression (12).

$$-0.0200 \leq \theta hg3 - \theta hg1 \leq 0.1200 \quad (12")$$

Incidentally, in the optical system, the lens component which is deeply involved in the occurrence of the chromatic aberration is a lens component through which, an axial light ray height (axial beam height) and a principal light ray height (principal beam height) pass at a high position. Such lens component has a combined positive refractive power in many cases. Consequently, it is preferable to use the predetermined lens component as a positive lens component.

Moreover, when a lens having a negative value for a paraxial focal length is let to be a negative lens, it is desirable that the lens L3 is a negative lens. A function of the lens L3 in the predetermined lens component is aberration correction. When the lens L3 is a negative lens, it is preferable from a point of aberration correction.

Moreover, when a lens having a positive value for a paraxial focal length is let to be a positive lens, it is desirable that the lens L1 is a positive lens. The lens L1 becomes a lens which mainly bears a power of the predetermined lens component. Therefore, it is preferable that the lens L1 is a positive lens.

Moreover, it is preferable that the image forming optical system which uses the predetermined lens component is a zooming optical system. It is preferable that the zooming optical system is a so-called positive-lead (a first lens group has a positive refractive power) zooming optical system. Concretely, it is preferable that the zooming optical system, in order from an object side, consists of a first lens group having a positive refractive power, a second lens group having a negative refractive power, and a rear group having a positive refractive power, and the rear group consists of a plurality of lens groups of which, relative distances are variable at the time of zooming. Moreover, it is preferable that relative distances between the first lens group, the second lens group, and the rear group are variable at the time of zooming.

Furthermore, it is preferable to use the lens component in the first lens group.

Moreover, it is preferable that the first lens group consists of only the predetermined lens component. When such an arrangement is made, it is extremely effective for slimming of the optical system. Moreover, it is preferable to let a lens nearest to the object side in the lens component to be the first lens. Moreover, it is preferable that in the predetermined lens component, each of a shape of the optical surface B and a shape of the optical surface C is a shape having a convex surface directed toward an image side.

Moreover, in an image forming optical system, when coordinate axes are let to be such that, an optical axial direction is z, and a direction perpendicular to the optical axis is h, R is let to be a radius of curvature on an optical axis, of a spherical surface component, k is let to be a conical constant, and $A_4$, $A_6, A_8, A_{10}, \ldots$ are let to be aspherical coefficients, and when a shape of the aspheric surface is expressed by the following expression (13)

$$z = h^2/R/[1 + \{1-(1+k)h^2/R^2\}^{1/2}] + A_4 h^4 + A_6 h^6 + A_8 h^8 + A_{10} h^{10} + \quad (13), \text{ and}$$

when an amount of deviation is expressed by the following expression (14)

$$\Delta z = z - h^2/R/[1 + \{1-h^2/R^2\}^{1/2}] \quad (14),$$

it is preferable that the image forming optical system satisfies the following conditional expression (15).

$$(\Delta z_A(h) + \Delta z_D(h))/2 \leq \Delta z_C(h) \leq 10 \cdot (\Delta z_A(h) + \Delta z_D(h))/2$$
$$\text{(provided that } h=2.5a) \quad (15)$$

where, $z_A$ is a shape of the optical surface A, which is according to expression (13), $z_D$ is a shape of the optical surface D, which is according to expression (13), and $z_C$ is a shape of the optical surface C, which is according to expression (13), and $\Delta z_A$ denotes an amount of deviation at the optical surface A, which is an amount according to expression (14), $\Delta z_D$ denotes an amount of deviation at the optical surface D, which is an amount according to expression (14), $\Delta z_C$ denotes an amount of deviation at the optical surface C, which is an amount according to expression (14), $R_C$ is a paraxial radius of curvature of the optical surface C, a is an amount according to the following conditional expression (16)

$$a = (y_{10})^2 \cdot \log_{10} \gamma / fw \quad (16)$$

and moreover, in expression (16), $y_{10}$ is the maximum image height, fw is a focal length of the overall image forming optical system at a wide angle end, γ is a zooming ratio in the image forming optical system (a focal length of the overall image forming optical system at a telephoto end/a focal length of the overall image forming optical system at the wide angle end), and moreover, for letting an apex of each surface to be an origin point, $z(0)=0$ all the time.

When any of the limits of conditional expression (15) is surpassed, correction of the chromatic aberration of high order at the telephoto end of the zooming optical system, or in other words, correction of a high-order component (distortion of color) related to an image height of the chromatic aberration of magnification, the chromatic coma, and the spherical aberration of color becomes difficult.

Moreover, it is more preferable that the image forming optical system of the embodiments satisfies conditional expression (15') instead of conditional expression (15).

$$2 \cdot (\Delta z_A(h) + \Delta z_D(h))/2 \leq \Delta z_C(h) \leq 9 \cdot (\Delta z_A(h) + \Delta z_D(h))/2 \quad (15')$$

Furthermore, it is all the more preferable that the image forming optical system of the embodiments satisfies conditional expression (15") instead of conditional expression (15).

$$3 \cdot (\Delta z_A(h) + \Delta z_D(h))/2 \leq \Delta z_C(h) \leq 8 \cdot (\Delta z_A(h) + \Delta z_D(h))/2 \quad (15")$$

Next, a method of manufacturing the predetermined lens component will be described below.

First, a resin is dropped (dripped) on the optical surface B of the lens L1. Next, a surface of the resin is pressed by a mold etc. to form a desired shape. When the surface of the resin has assumed the desired shape, the resin is cured. Accordingly, the lens L1 and the resin make a close contact. The resin becomes the intermediate layer L2. Furthermore, another resin is dropped (dripped) on a surface of the intermediate layer L2. Next, a surface of the another resin is pressed to form a desired shape. When the surface of another resin has assumed the desired shape, the another resin is cured. Accordingly, the lens L1 and another resin make a close contact. Another resin becomes the lens L3. The resins may be dropped (dripped) in the mold, and the two members may be brought in close contact by pressing against an optical surface with which, the resin is to be brought into a close contact, or by pushing up the mold.

In this manner, a lens component which has been obtained by molding by curing the resins, after the resins in liquid form are brought in a close contact with the existing lens surface, in this case, will be called as a composite lens. This method of manufacturing is an extremely effective method for slimming a cemented lens. As a resin, it is preferable to use an energy curable resin. As an example of the energy curable resin, an ultraviolet-curing resin is available.

A surface treatment such as coating may be carried out in advance on the surface of the lens L1, before bringing the resin in a close contact. Moreover, after molding the intermediate layer L2, a surface treatment such as coating may be carried out in advance, also on the surface of the intermediate layer L2. According to a method of manufacturing the composite lens, since only a surface to be brought in close contact is to be made an aspheric surface (surface toward the resin becomes an aspheric surface), making a cemented surface aspheric, which has hitherto been difficult becomes easy.

Moreover, a glass in a liquid form (such as a glass material of a temperature of a transition point or more) may be used instead of the energy curable resin. Glass is advantageous from a point of resistance such as a light resistance and a chemical resistance. In this case, with respect to a melting point (fusing point) and a transition point of the lens material, a material having the highest melting point and the highest transition point has to be selected for the lens L1, and a material having the lowest melting point and the lowest transition point has to be selected for the lens L3.

Moreover, it is preferable that the second lens group, in order from the object side, consists of a negative lens component, and a lens component in which, three lenses are cemented (hereinafter, three cemented-lenses component), and that a lens at a center of the three lenses satisfies conditional expressions (7), (8), and (9). Accordingly, it becomes easy to carry out correction of the secondary spectrum and the achromatism of (for) the C-line and the F-line of the chromatic aberration of magnification at a wide angle side can. Moreover, in the three cemented-lenses component, when any of the cemented surfaces is made to be an aspheric surface, it becomes easy to carry out correction of chromatic aberration of high order at the wide angle side.

The negative lens component of the second lens group may consist of a single lens.

Moreover, regarding the three cemented-lenses component of the second lens group, it is preferable to let a lens nearest to the object side to be a positive lens and a lens nearest to the image side to be a negative lens.

Moreover, regarding the rear group of the optical system, from a view point of slimming, it is preferable that the rear group consists of only two positive lens groups.

Moreover, among the two positive lens groups in the rear group, the lens group on the object side consists of one positive lens component and one negative lens component. Furthermore, the negative lens component consists of three lenses which are cemented. The negative lens component consists of a positive lens nearest to the object side, a lens at the center, and a negative lens nearest to the image side. It is preferable that the lens at the center is a lens which satisfies conditional expressions (7), (8), and (9).

Accordingly, it becomes easy to carry out correction of the secondary spectrum and the achromatism for the C-line and the F-line of the longitudinal chromatic aberration at the wide angle side. Moreover, since the negative lens component is remarkably sensitive with respect to a tolerance of lens thickness, it is preferable to use an energy curable resin for the lens at the center. When such an arrangement is made, at the time of forming the lens at the center, it is possible to control the thickness of the lens highly accurately. Therefore, when cured after forming to a predetermined lens thickness, it is possible to eliminate the lens-thickness tolerance. As a result, this leads to an improved performance of the negative lens component, and eventually, an improved performance of the optical system. Therefore, it is preferable.

Moreover, it is preferable that the positive lens component in the lens group on the object side consists of a single lens. Moreover, it is preferable that both surfaces of the single lens are aspheric surfaces.

Moreover, among the two positive lens groups in the rear group, the lens group on the image side may consist of one positive lens. Moreover, it is preferable that both surfaces of this lens are aspheric surfaces.

It is preferable to dispose an aperture stop between the second lens group and the rear group.

Moreover, it is possible to make an arrangement such that the image forming optical system of the embodiments includes a first lens group having a positive refractive power, a second lens group having a negative refractive power, and an aperture stop. In such an arrangement, it is preferable to dispose the first lens group having a positive refractive power toward the object side of the aperture stop, and it is preferable that the lens L3 having a negative refractive power in the positive lens group satisfies conditional expressions (7), (8), and (9). When such an arrangement is made, it is possible to correct favorably the chromatic aberration of magnification and the longitudinal chromatic aberration, particularly at the telephoto side.

Moreover, it is preferable to introduce three cemented lenses in the lens component on the image side of the second lens group, and it is preferable that the lens at the center satisfies conditional expressions (7), (8), and (9), or to let any of the cemented surfaces to be an aspheric surface. When such an arrangement is made, it is possible to correct favorably the chromatic aberration of magnification on the wide angle side, which has remained somewhat.

Moreover, it is also possible to improve by other means. As an example, a means of improving aberration by image processing is available. It is assumed that the image forming optical system, an electronic image pickup element, and an image processing unit are installed in an electronic image pickup apparatus. Moreover, the image processing unit is capable of processing image data, and outputting as image data which has been subjected to change of form. An image of an object is to be picked up by using such electronic image pickup apparatus. Image data which has been achieved by picking up the image is subjected to color separation, and becomes image data for each color. Next, after the form (size of the image of the object) has been changed for each image data, these image data are combined. Accordingly, it is possible to prevent occurrence of chromatic spreading and deterioration of sharpness in a peripheral portion of the image due to the chromatic aberration of magnification.

The abovementioned method is effective particularly for an electronic image pickup apparatus which includes an electronic image pickup element provided with a mosaic filter for color separation.

Moreover, in a case in which, the electronic image pickup apparatus includes an electronic image pickup element for each of a plurality of colors, it is not necessary to carry out color separation for image data which has been achieved.

Meanwhile, the color separation, in general, is by separation of three colors of B (blue) light (approximately 400 nm to 500 nm), G (green) light (approximately 500 nm to 600 nm), and R (red) light (approximately 600 nm to 700 nm). Therefore, an occurrence of chromatic aberration within a range of each band is not favorable. Particularly, an occurrence of chromatic aberration due to the secondary spectrum in area B (band B) which corresponds to a short-wavelength area (band) is not favorable. Consequently, when an amount remained of the chromatic aberration of magnification due to the secondary spectrum in the area B is large, it is preferable to use aberration correction and image processing in conjunction.

The image forming optical system of the embodiments satisfies each of the abovementioned conditional expressions and has each of the abovementioned structural characteristics. Accordingly, it is possible to achieve both the small-sizing and the slimming of the optical system, and to realize favorable aberration correction. Moreover, the image forming optical system of the embodiments can also satisfy the abovementioned conditional expressions in combination, or can also have the abovementioned structural futures in combination. In this case, it is possible to achieve further small-sizing and slimming of the optical system, or even more favorable aberration correction. Moreover, in the electronic image pickup apparatus having the image forming optical system of the embodiments, by including such image forming optical system, prevention of chromatic spreading and sharpness of image which has been picked up, are facilitated.

Figure 1B:
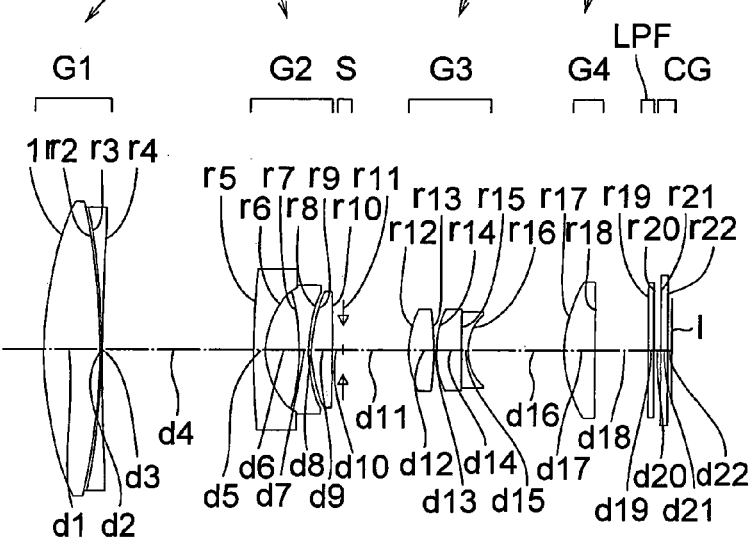
Figure 1C:
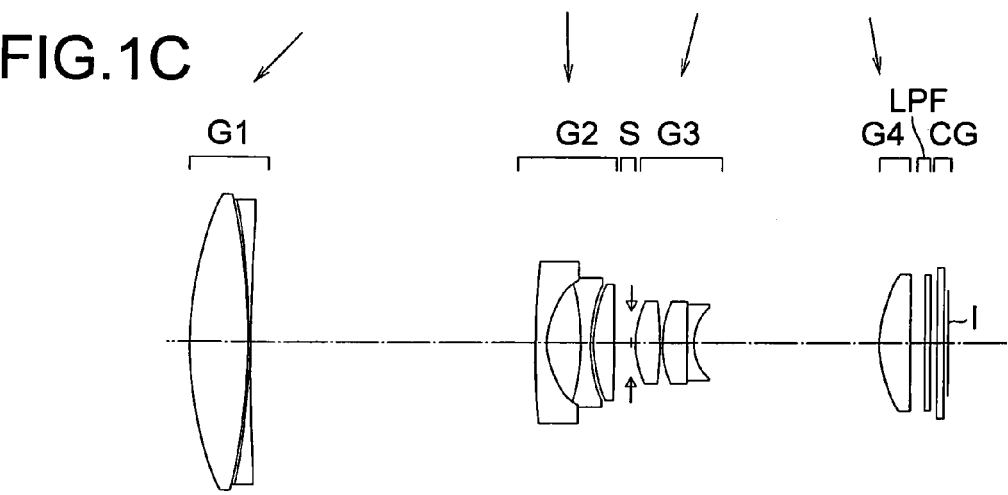

Next, a zoom lens according to a first embodiment of the present invention will be described below. FIG. 1A, FIG. 1B, and FIG. 1C are cross-sectional views along an optical axis showing an optical arrangement at the time of infinite object point focusing of a zoom lens according to the first embodiment of the present invention, where, FIG. 1A shows a state at a wide angle end, FIG. 1B shows an intermediate focal length state, and FIG. 10 shows a state at the telephoto end.

Figure 2A:
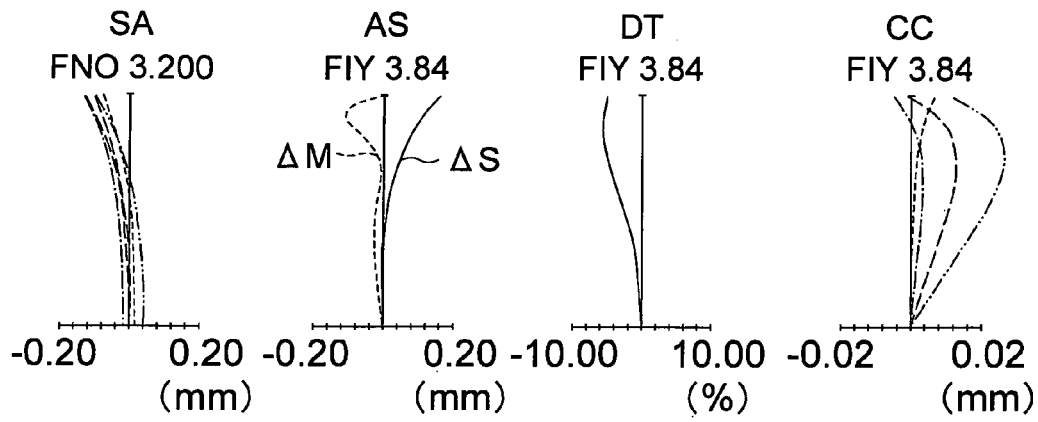
FIG. 2A, FIG. 2B, and FIG. 2C are diagrams showing a spherical aberration, an astigmatism, a distortion, and a chromatic aberration of magnification at the time of infinite object point focusing of the zoom lens according to the first embodiment, where.
Figure 2B:
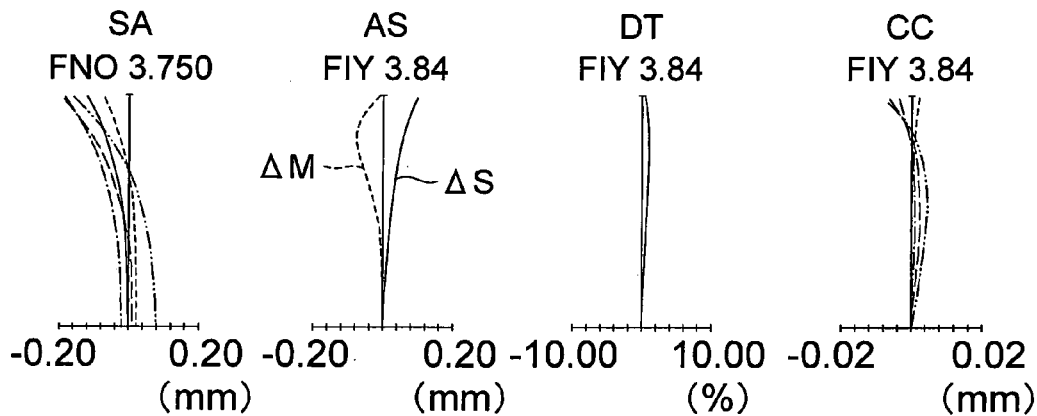
Figure 2C:
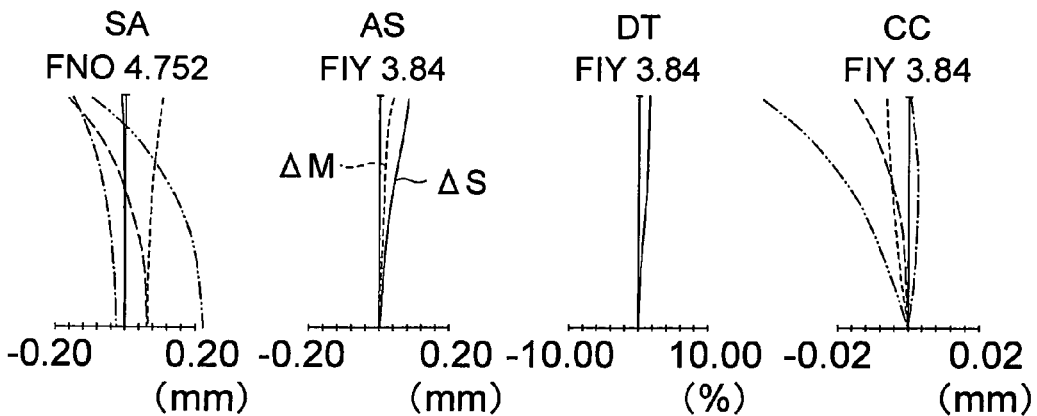
Figure 6A:
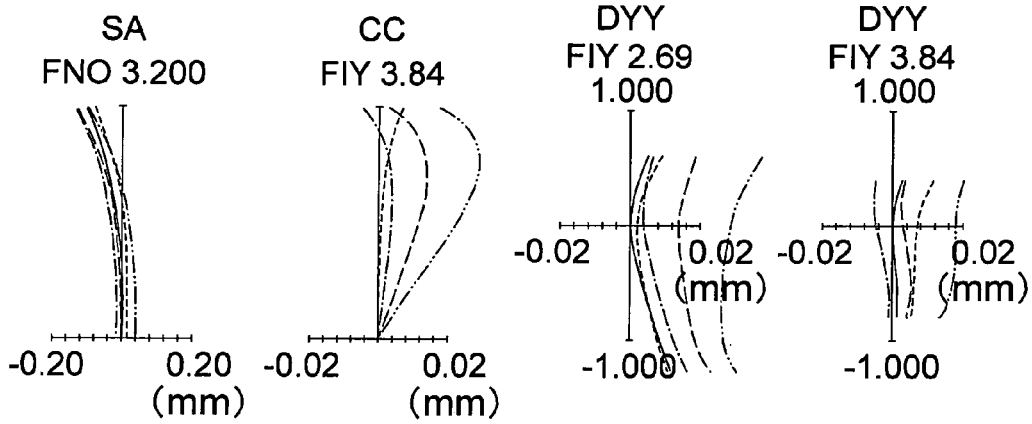
FIG. 6A, FIG. 6B, and FIG. 6C are diagrams showing the spherical aberration (SA), the chromatic aberration of magnification (CC), and the chromatic coma (DYY) (image height ratio 0.7, 1.0) when θgF=0.6203, at the time of infinite object point focusing of the zoom lens according to the first embodiment, where.
Figure 6B:
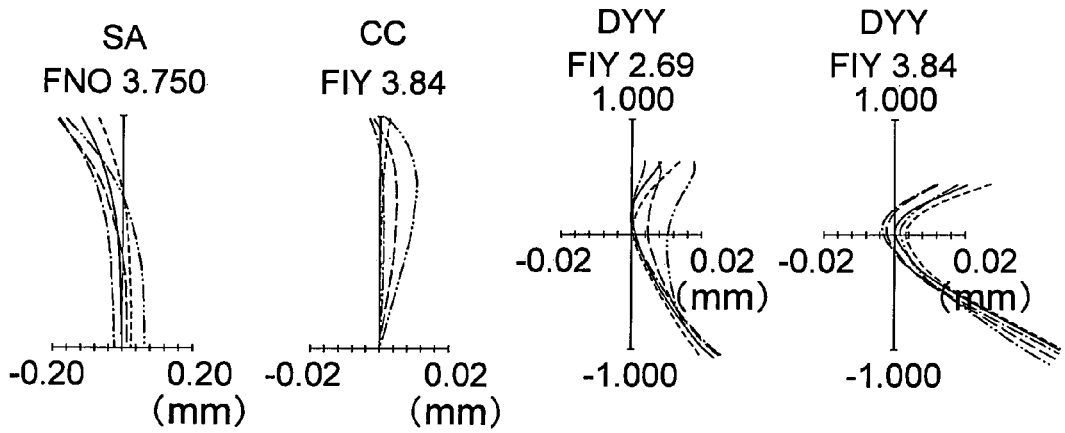
Figure 6C:
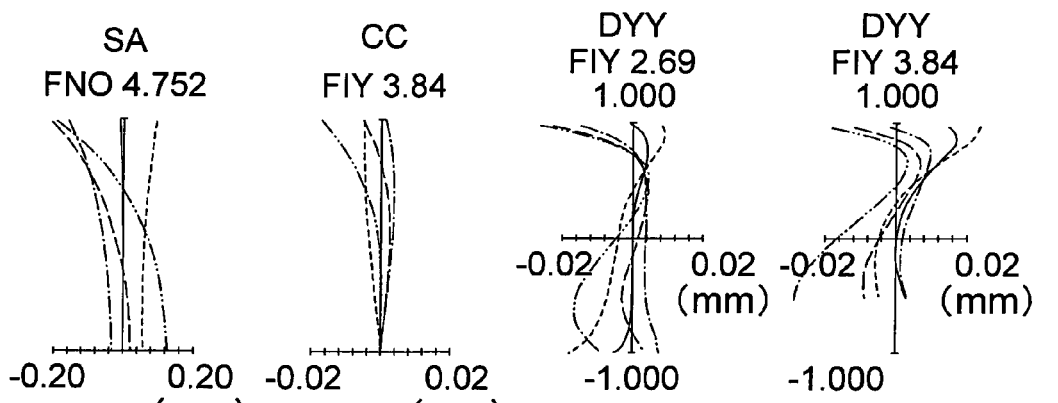
Figure 8A:
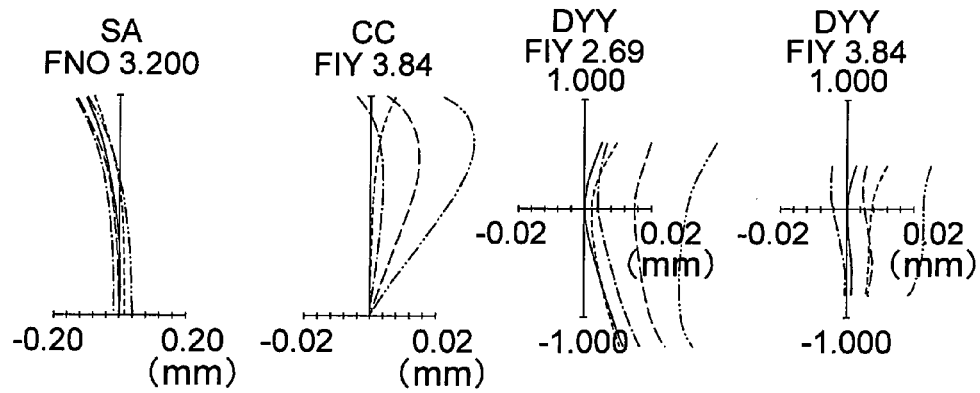
FIG. 8A, FIG. 8B, and FIG. 8C are diagrams showing the spherical aberration (SA), the chromatic aberration of magnification (CC), and the chromatic coma (DYY) (image height ratio 0.7, 1.0) when θgF=0.5840, at the time of infinite object point focusing of the zoom lens according to the first embodiment, where.
Figure 8B:
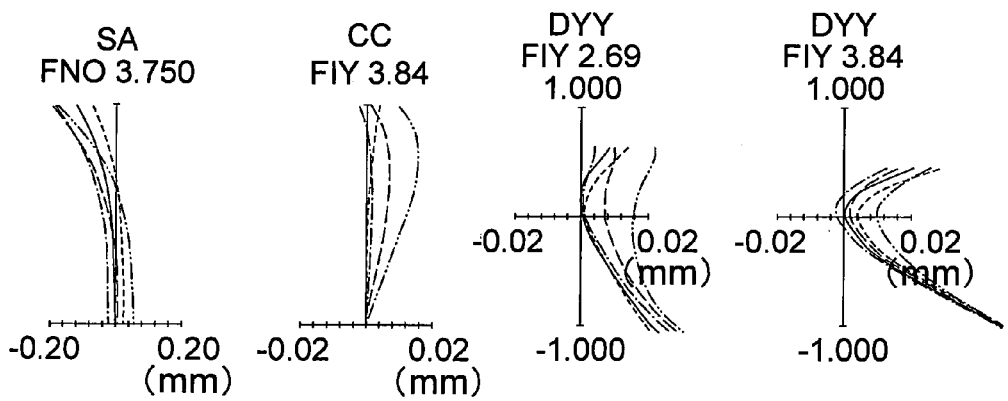
Figure 8C:
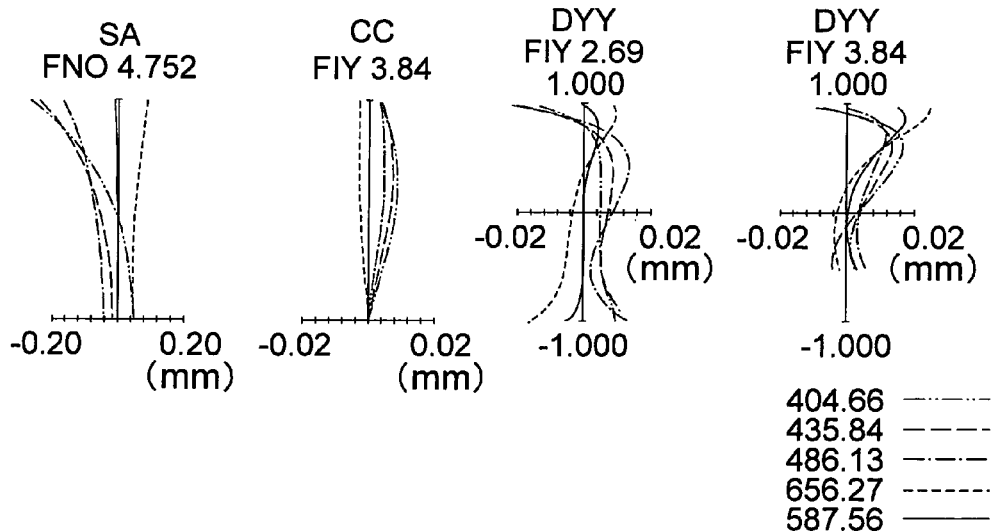

FIG. 2A, FIG. 2B, and FIG. 2C are diagrams showing a spherical aberration (SA), an astigmatism (AS), a distortion (DT), and a chromatic aberration of magnification (CC) at the time of infinite object point focusing of the zoom lens according to the first embodiment, where, FIG. 2A shows a state at the wide angle end, FIG. 2B shows an intermediate focal length state, and FIG. 2C shows a state at the telephoto end. Moreover, FIY denotes an image height. Symbols in aberration diagrams are same for the embodiments which will be described later.

Moreover, FIG. 3A, FIG. 3B, FIG. 3C, FIG. 4A, FIG. 4B, FIG. 4C, FIG. 5A, FIG. 5B, FIG. 5C, FIG. 6A, FIG. 6B, FIG. 6C, FIG. 7A, FIG. 7B, FIG. 7C, FIG. 8A, FIG. 8B, and FIG. 8C are diagrams showing the spherical aberration (SA), the chromatic aberration of magnification (CC), and a chromatic coma (DYY) (image height ratio 0.7, 1.0) when θgF=0.6684, θgF=0.6307, θgF=0.6255, θgF=0.6203, θgF=0.6103, and θgF=0.5840, at the time of infinite object point focusing of the zoom lens according to the first embodiment, where, FIG. 3A, FIG. 4A, FIG. 5A, FIG. 6A, FIG. 7A, and FIG. 8A show states at the wide angle end, FIG. 3B, FIG. 4B, FIG. 5B, FIG. 6B, FIG. 7B, and FIG. 8B show intermediate focal length states, and FIG. 3C, FIG. 4C, FIG. 5C, FIG. 6C, FIG. 7C, and FIG. 8C show states at the telephoto end.

The zoom lens according to the first embodiment, as shown in FIG. 1A, FIG. 1B, and FIG. 1C, includes in order from an object side, a first lens group G1 having a positive refractive power, a second lens group G2 having a negative refractive power, an aperture stop S, a third lens group G3 having a positive refractive power, and a fourth lens group G4 having a positive refractive power. In all the embodiments which will be described below, in the lens cross-sectional views, LPF denotes a low pass filter, CG denotes a cover glass, and I denotes an image pickup surface of an electronic image pickup element.

The first lens group G1 consists of a cemented lens of a biconvex positive lens L1, a positive meniscus lens L2 having a convex surface directed toward an image side, and a biconcave negative lens L3, and has a positive refractive power as a whole. Here, the biconvex positive lens L1 is the lens L1, the positive meniscus lens L2 is the intermediate layer L2, and the biconcave negative lens L3 is the lens L3.

The second lens group G2 consists of a negative meniscus lens L4 having a convex surface directed toward the object side, a biconcave negative lens L5, and a biconvex positive lens L6, and has a negative refractive power as a whole.

The third lens group G3 consists of a biconvex positive lens L7, and a cemented lens of a positive meniscus lens L8 having a convex surface directed toward the object side and a negative meniscus lens L9 having a convex surface directed toward the object side, and has a positive refractive power as a whole.

The fourth lens group G4 consists of a biconvex positive lens L10, and has a positive refractive power as a whole.

At the time of zooming from the wide angle end to the telephoto end, the first lens group G1 moves toward the object side, the second lens group G2 moves toward the image side, the aperture stop S is fixed, the third lens group G3 moves toward the object side, and the fourth lens group G4 moves toward the object side up to an intermediate position, and from the intermediate position, moves toward the image side.

An aspheric surface is provided to a total of nine surfaces namely, both surfaces of the biconcave negative lens L3 in the first lens group G1, both surfaces of the negative meniscus lens L4 having the convex surface directed toward the object side, and both surfaces of the biconcave negative lens L5 in the second lens group G2, both surfaces of the biconvex positive lens L7 in the third lens group G3, and a surface on the object side of the biconvex positive lens L10 in the fourth lens group G4.

Figure 9A:
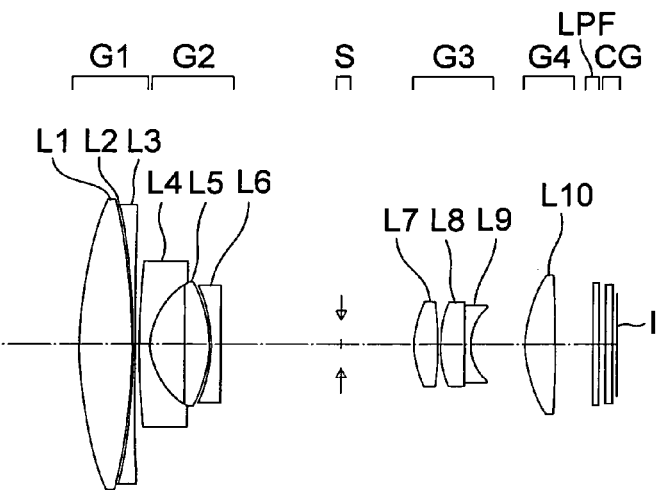
FIG. 9A, FIG. 9B, and FIG. 9C are cross-sectional views along an optical axis showing an optical arrangement at the time of infinite object point focusing of a zoom lens according to a second embodiment of the present invention, where.
Figure 9B:
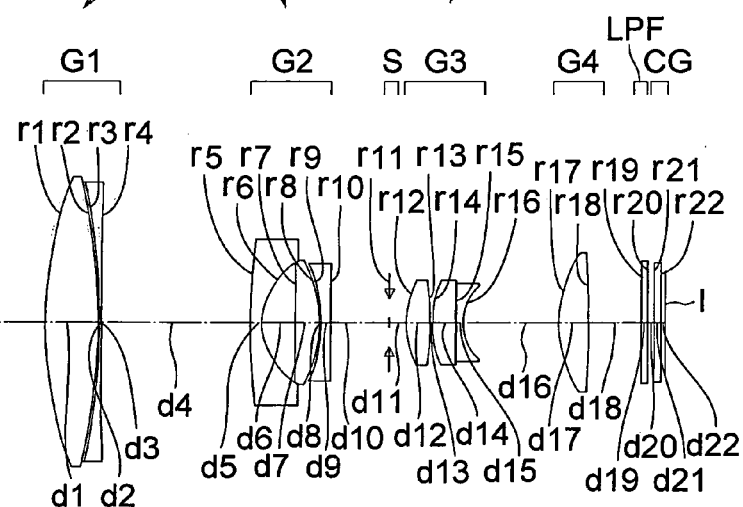
Figure 9C:
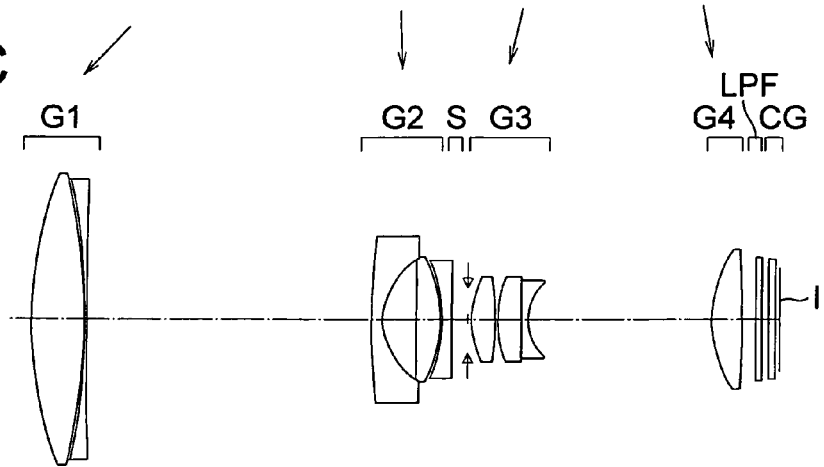

Next, a zoom lens according to a second embodiment of the present invention will be described below. FIG. 9A, FIG. 9B, and FIG. 9C are cross-sectional views along an optical axis showing an optical arrangement at the time of infinite object point focusing of the zoom lens according to the second embodiment of the present invention, where, FIG. 9A shows a state at a wide angle end, FIG. 9B shows an intermediate focal length state, and FIG. 9C shows a state at the telephoto end.

Figure 10A:
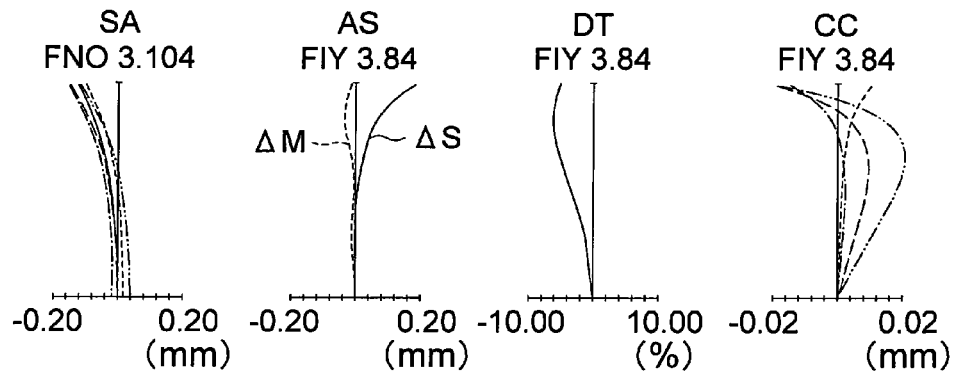
FIG. 10A, FIG. 10B, and FIG. 10C are diagrams showing a spherical aberration, an astigmatism, a distortion, and a chromatic aberration of magnification at the time of infinite object point focusing of the zoom lens according to the second embodiment, where.
Figure 10B:
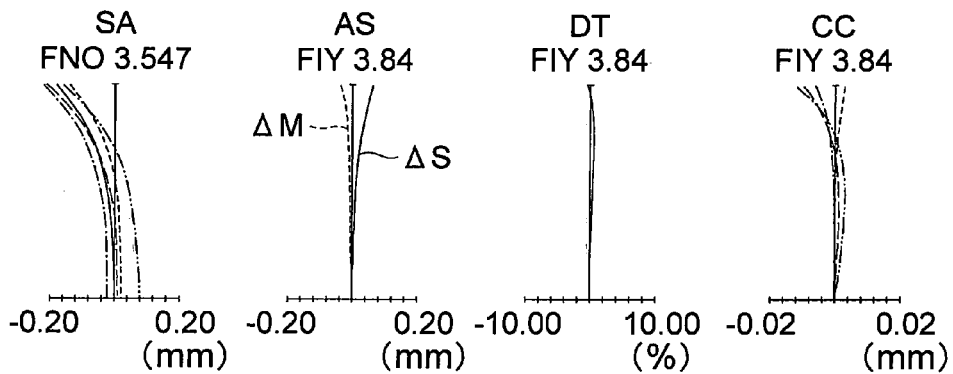
Figure 10C:
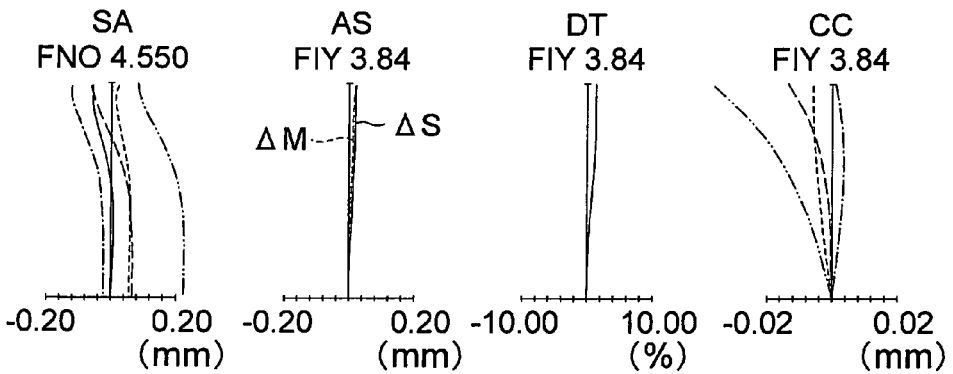
Figure 12A:
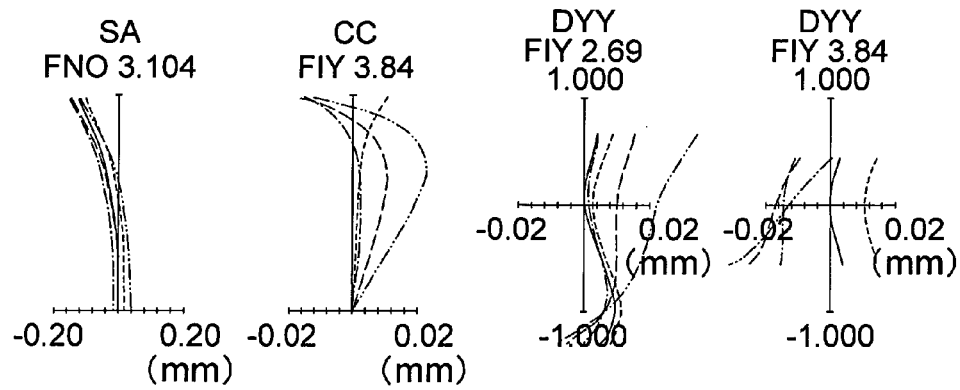
FIG. 12A, FIG. 12B, and FIG. 12C are diagrams showing the spherical aberration (SA), the chromatic aberration of magnification (CC), and the chromatic coma (DYY) (image height ratio 0.7, 1.0) when θgF=0.6307, at the time of infinite object point focusing of the zoom lens according to the second embodiment, where.
Figure 12B:
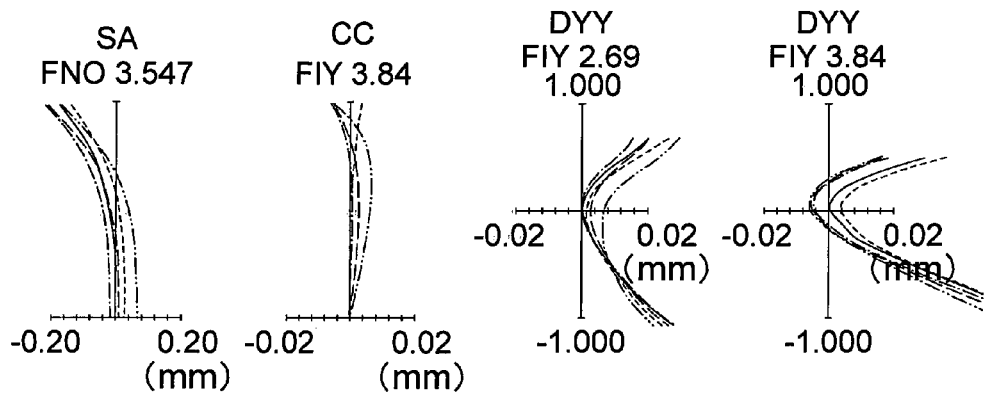
Figure 12C:
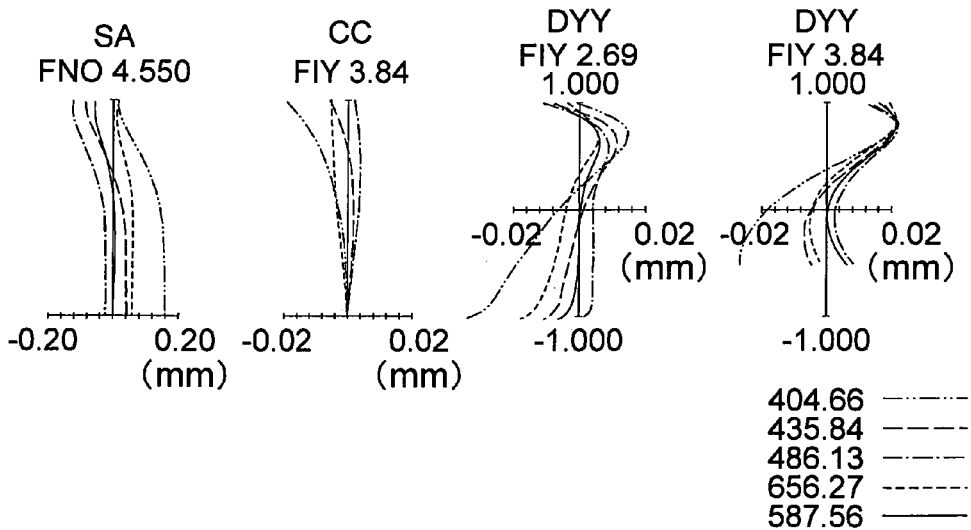
Figure 14A:
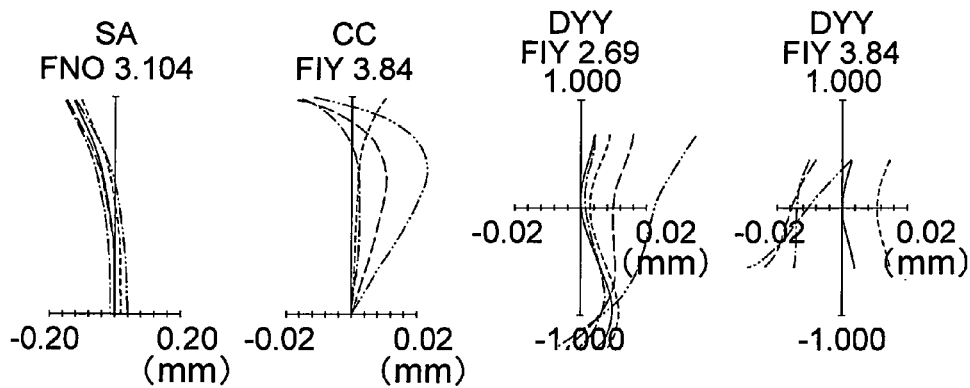
FIG. 14A, FIG. 14B, and FIG. 14C are diagrams showing the spherical aberration (SA), the chromatic aberration of magnification (CC), and the chromatic coma (DYY) (image height ratio 0.7, 1.0) when θgF=0.6203, at the time of infinite object point focusing of the zoom lens according to the second embodiment, where.
Figure 14B:
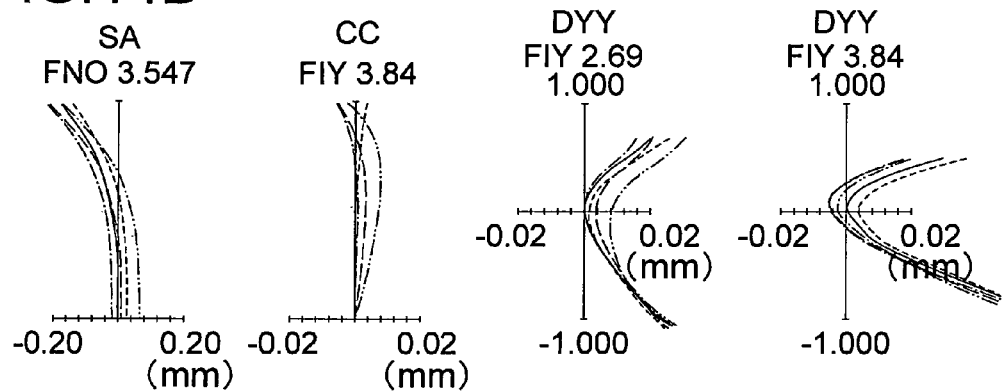
Figure 14C:
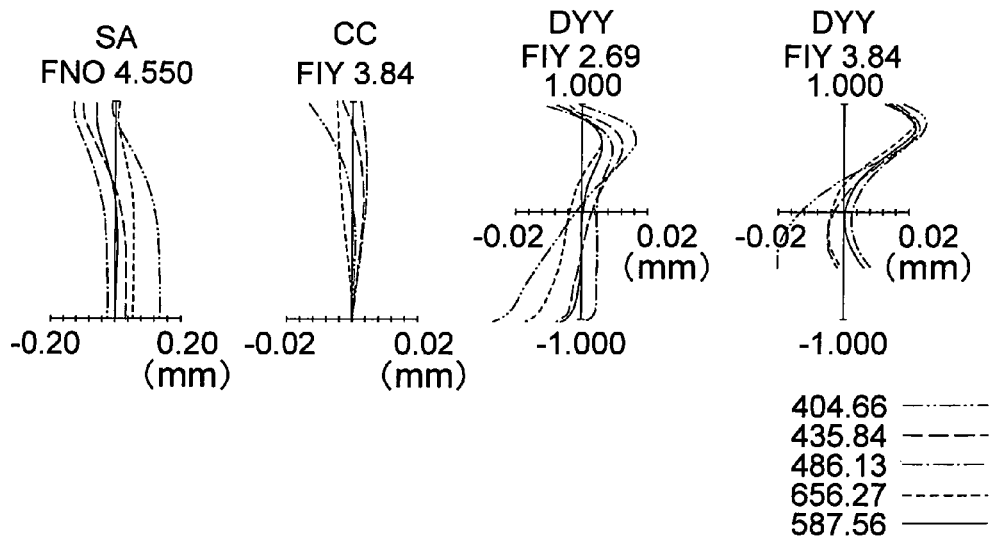
Figure 15A:
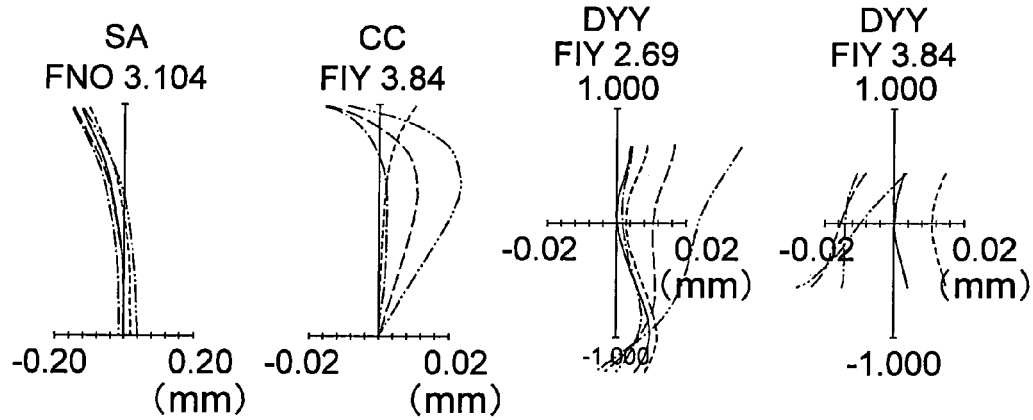
FIG. 15A, FIG. 15B, and FIG. 15C are diagrams showing the spherical aberration (SA), the chromatic aberration of magnification (CC), and the chromatic coma (DYY) (image height ratio 0.7, 1.0) when θgF=0.6103, at the time of infinite object point focusing of the zoom lens according to the second embodiment, where.
Figure 15B:
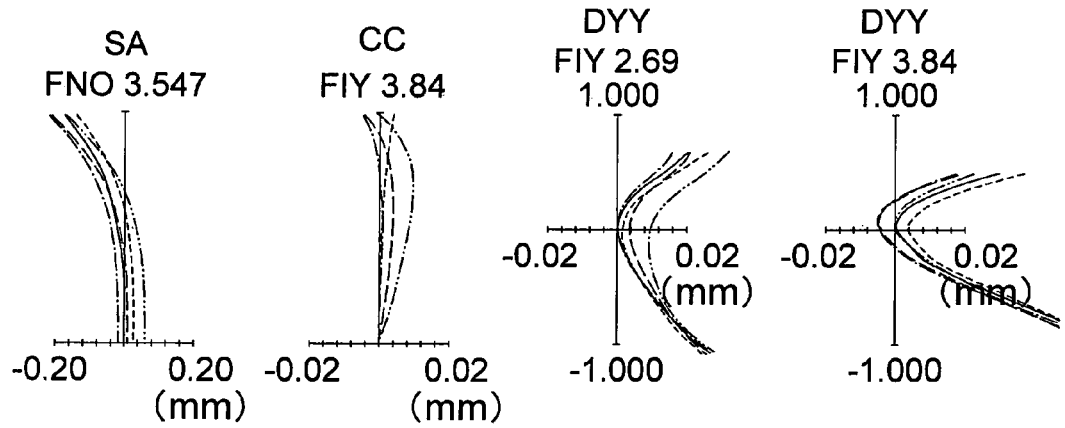
Figure 15C:
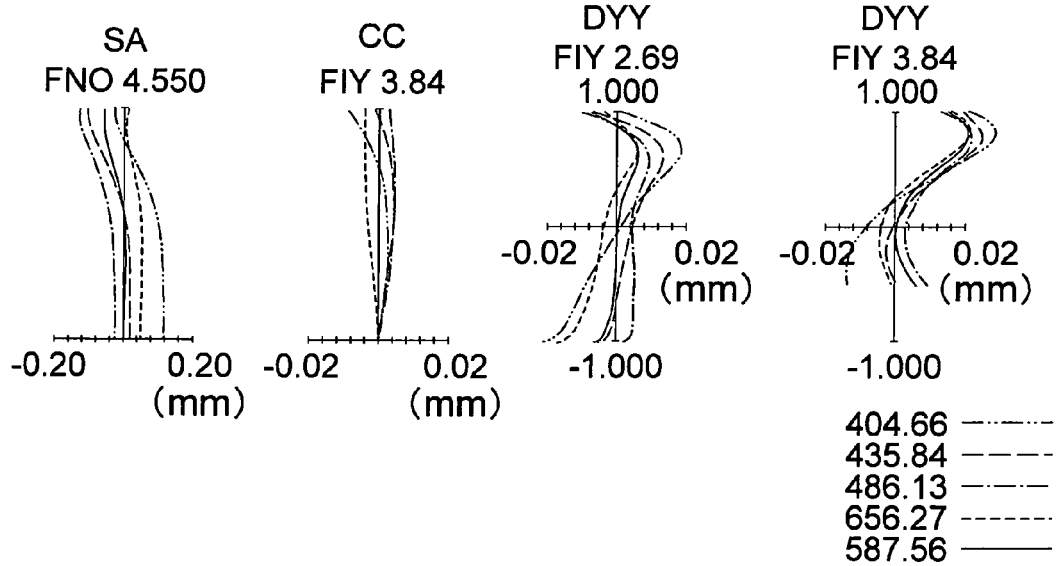

FIG. 10A, FIG. 10B, and FIG. 10C are diagrams showing a spherical aberration (SA), an astigmatism (AS), a distortion (DT), and a chromatic aberration of magnification (CC) at the time of infinite object point focusing of the zoom lens according to the second embodiment, where, FIG. 10A shows a state at the wide angle end, FIG. 10B shows an intermediate focal length state, and FIG. 10C shows a state at the telephoto end.

Moreover, FIG. 11A, FIG. 11B, FIG. 11C, FIG. 12A, FIG. 12B, FIG. 12C, FIG. 13A, FIG. 13B, FIG. 13C, FIG. 14A, FIG. 14B, FIG. 14C, FIG. 15A, FIG. 15B, FIG. 15C, FIG. 16A, FIG. 16B, and FIG. 16C are diagrams showing the spherical aberration (SA), the chromatic aberration of magnification (CC), and a chromatic coma (DYY) (image height ratio 0.7, 1.0) when θgF=0.6684, θgF=0.6307, θgF=0.6255, θgF=0.6203, θgF=0.6103, and θgF=0.5840, at the time of infinite object point focusing of the zoom lens according to the second embodiment, where, FIG. 11A, FIG. 12A, FIG. 13A, FIG. 14A, FIG. 15A, and FIG. 16A show states at the wide angle end, FIG. 11B, FIG. 12B, FIG. 13B, FIG. 14B, FIG. 15B, and FIG. 16B show intermediate focal length states, and FIG. 11C, FIG. 12C, FIG. 13C, FIG. 14C, FIG. 15C, and FIG. 16C show states at the telephoto end.

The zoom lens according to the second embodiment, as shown in FIG. 9A, FIG. 9B, and FIG. 9C, includes in order from an object side, a first lens group G1 having a positive refractive power, a second lens group G2 having a negative refractive power, an aperture stop S, a third lens group G3 having a positive refractive power, and a fourth lens group G4 having a positive refractive power.

The first lens group G1 consists of a cemented lens of a biconvex positive lens L1, a positive meniscus lens L2 having a convex surface directed toward an image side, and a biconcave negative lens L3, and has a positive refractive power as a whole. Here, the biconvex positive lens L1 is the lens L1, the positive meniscus lens L2 is the intermediate layer L2, and the biconcave negative lens L3 is the lens L3.

The second lens group G2 consists of a negative meniscus lens L4 having a convex surface directed toward the object side, a positive meniscus lens L5 having a convex surface directed toward the image side, and a biconcave negative lens L6, and has a negative refractive power as a whole.

The third lens group G3 consists of a biconvex positive lens L7, and a cemented lens of a biconvex positive lens L8 and a biconcave negative lens L9, and has a positive refractive power as a whole.

The fourth lens group G4 consists of a biconvex positive les L10, and has a positive refractive power as a whole.

At the time of zooming from the wide angle end to the telephoto end, the first lens group G1 moves toward the object side, the second lens group G2 moves toward the image side, the aperture stop S is fixed, the third lens group G3 moves toward the object side, and the fourth lens group G4 moves toward the object side up to an intermediate position, and from the intermediate position, moves toward the image side.

An aspheric surface is provided to a total of nine surfaces namely, both surfaces of the biconcave negative lens L3 in the first lens group G1, both surfaces of the negative meniscus lens L4 having the convex surface directed toward the object side and both surfaces of the biconcave negative lens L6 in the second lens group G2, both surfaces of the biconvex positive lens L7 in the third lens group G3, and a surface on the object side of the biconvex positive lens L10 in the fourth lens group G4.

Figure 17A:
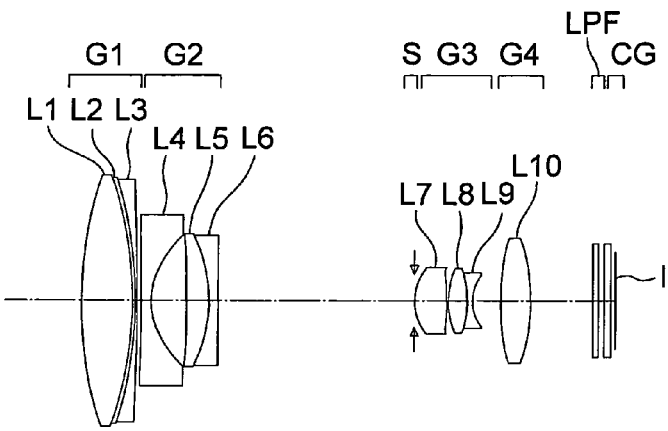
FIG. 17A, FIG. 17B, and FIG. 17C are cross-sectional views along an optical axis showing an optical arrangement at the time of infinite object point focusing of a zoom lens according to a third embodiment of the present invention, where.
Figure 17B:
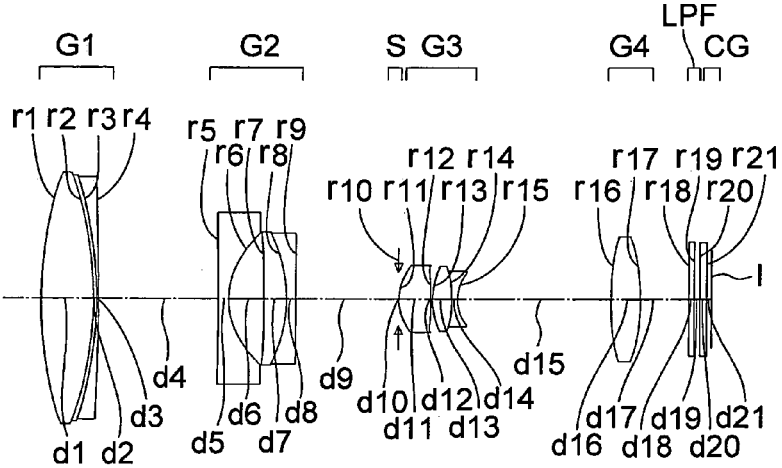
Figure 17C:
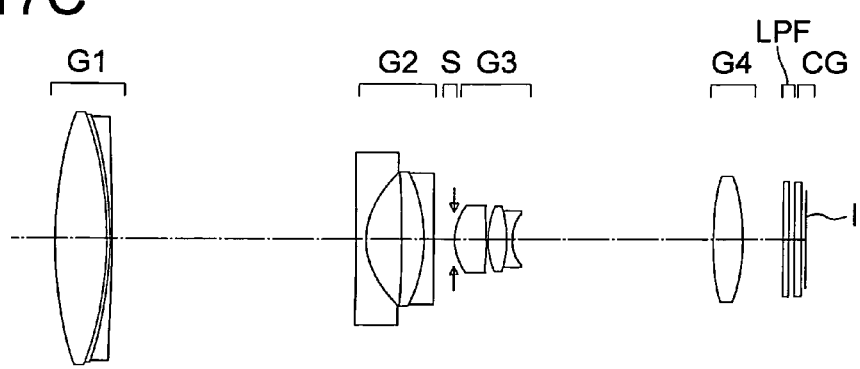

Next, a zoom lens according to a third embodiment of the present invention will be described below. FIG. 17A, FIG. 17B, and FIG. 17C are cross-sectional views along an optical axis showing an optical arrangement at the time of infinite object point focusing of the zoom lens according to the third embodiment of the present invention, where, FIG. 17A shows a state at a wide angle end, FIG. 17B shows an intermediate focal length state, and FIG. 17C shows a state at the telephoto end.

Figure 18A:
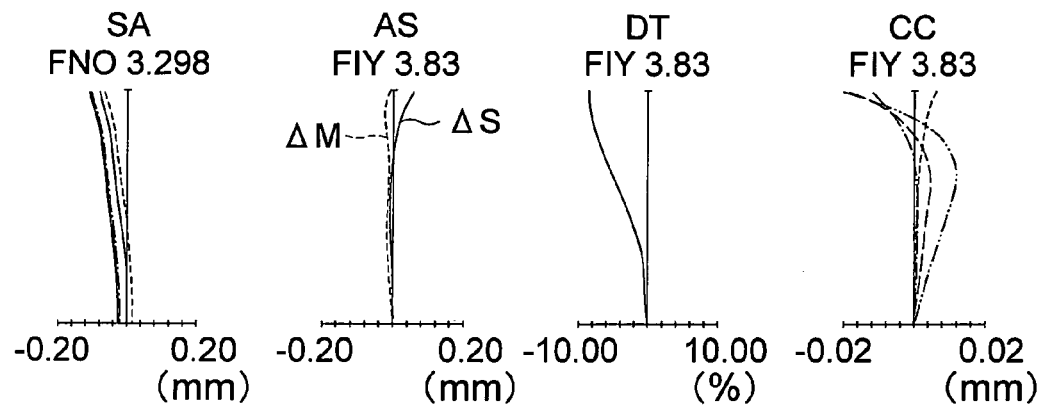
FIG. 18A, FIG. 18B, and FIG. 18C are diagrams showing a spherical aberration, an astigmatism, a distortion, and a chromatic aberration of magnification at the time of infinite object point focusing of the zoom lens according to the third embodiment, where.
Figure 18B:
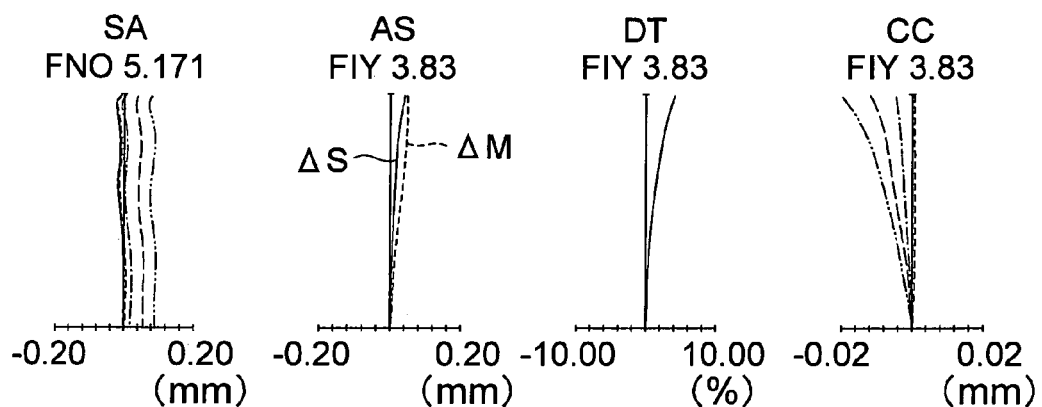
Figure 18C:
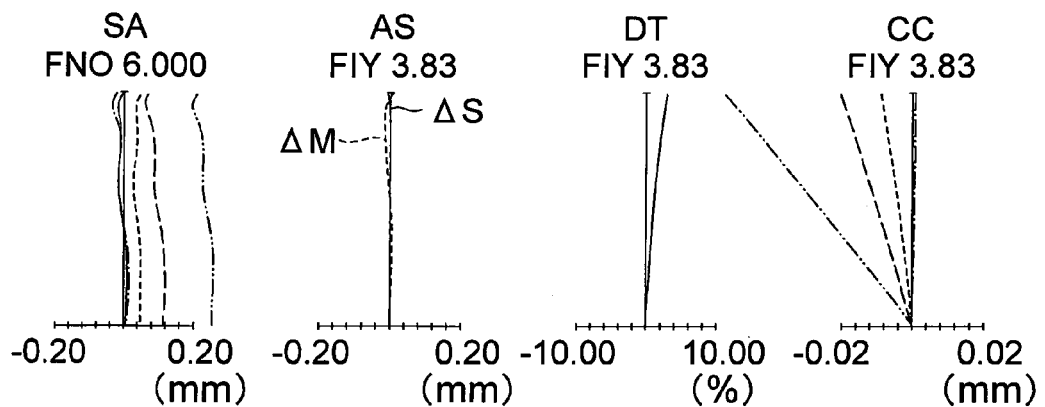
Figure 20A:
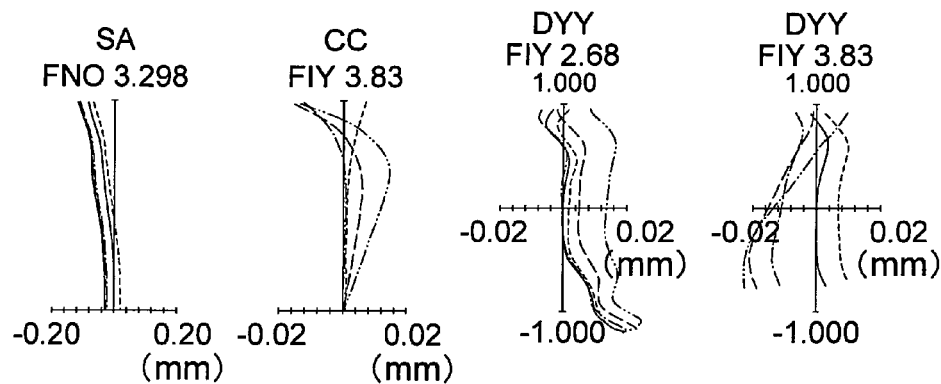
FIG. 20A, FIG. 20B, and FIG. 20C are diagrams showing the spherical aberration (SA), the chromatic aberration of magnification (CC), and the chromatic coma (DYY) (image height ratio 0.7, 1.0) when θgF=0.6307, at the time of infinite object point focusing of the zoom lens according to the third embodiment, where.
Figure 20B:
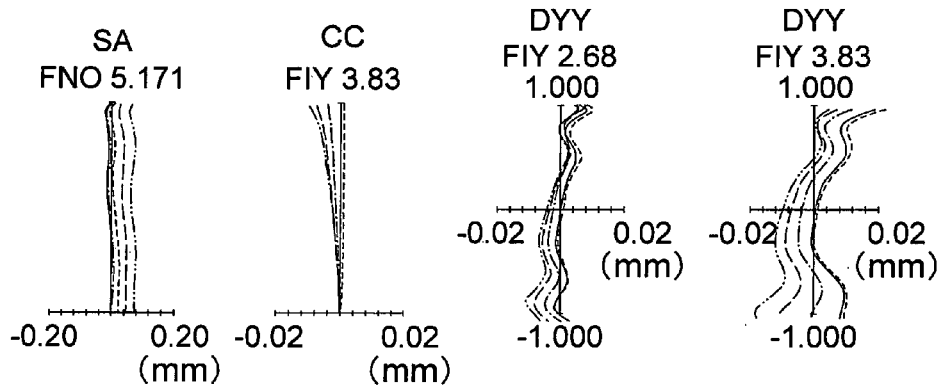
Figure 20C:
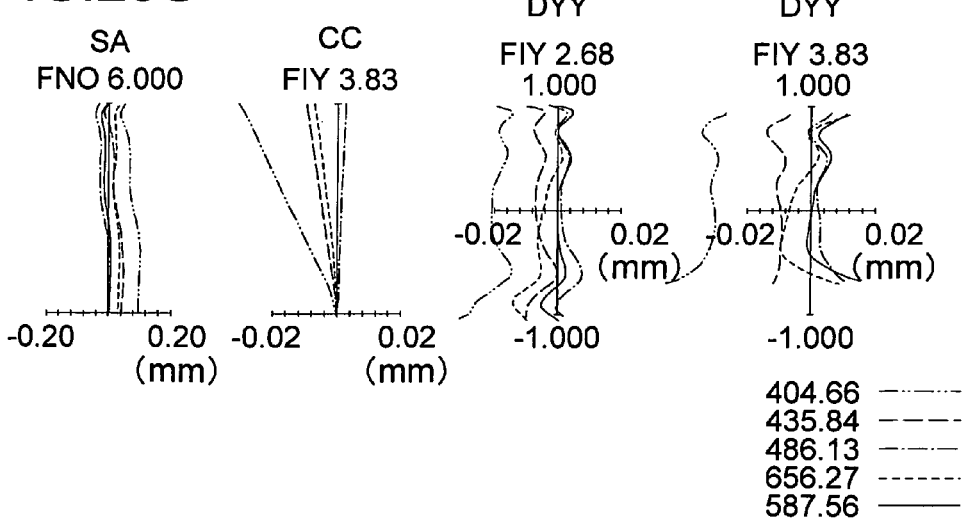
Figure 22A:
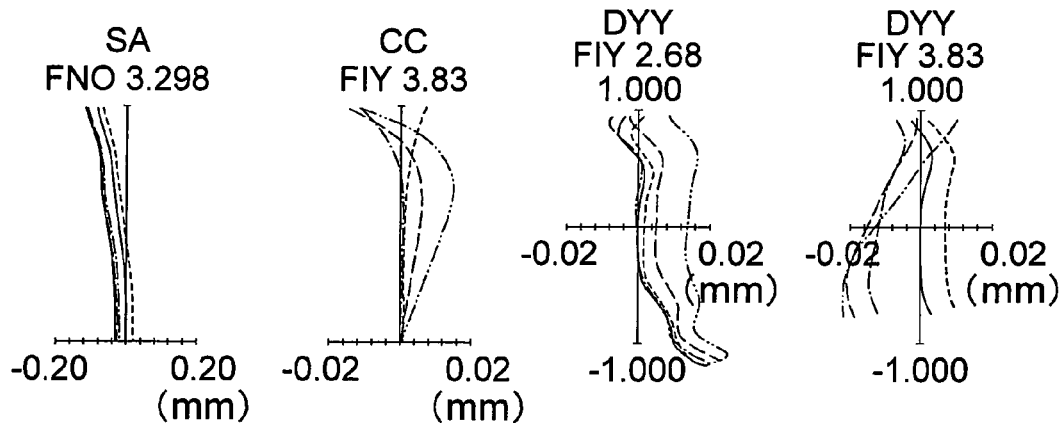
FIG. 22A, FIG. 22B, and FIG. 22C are diagrams showing the spherical aberration (SA), the chromatic aberration of magnification (CC), and the chromatic coma (DYY) (image height ratio 0.7, 1.0) when θgF=0.6203, at the time of infinite object point focusing of the zoom lens according to the third embodiment, where.
Figure 22B:
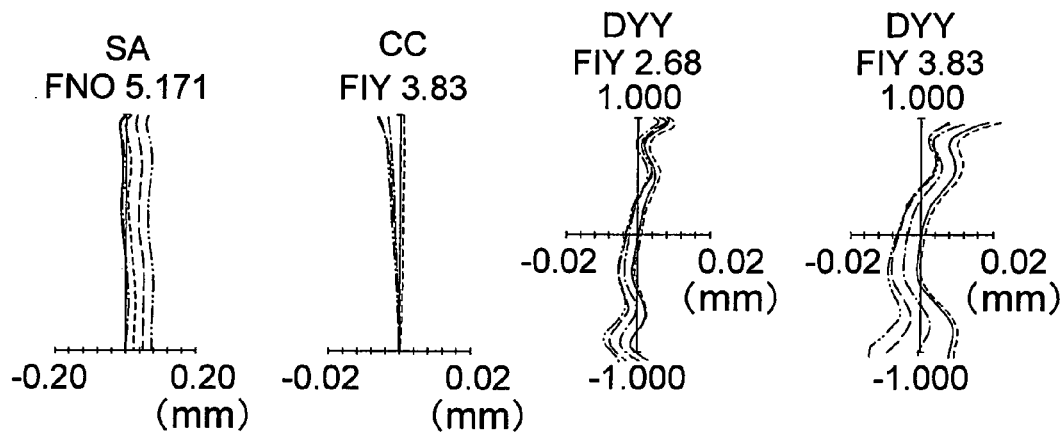
Figure 22C:
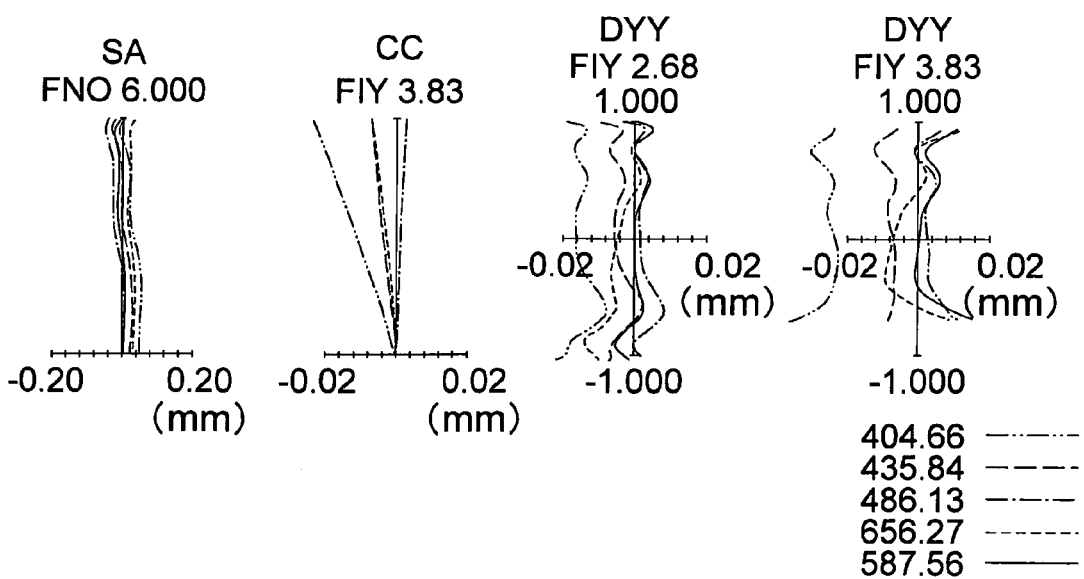

FIG. 18A, FIG. 18B, and FIG. 18C are diagrams showing a spherical aberration (SA), an astigmatism (AS), a distortion (DT), and a chromatic aberration of magnification (CC) at the time of infinite object point focusing of the zoom lens according to the third embodiment, where, FIG. 18A shows a state at the wide angle end, FIG. 18B shows an intermediate focal length state, and FIG. 18C shows a state at the telephoto end.

Moreover, FIG. 19A, FIG. 19B, FIG. 19C, FIG. 20A, FIG. 20B, FIG. 20C, FIG. 21A, FIG. 21B, FIG. 21C, FIG. 22A, FIG. 22B, FIG. 22C, FIG. 23A, FIG. 23B, FIG. 23C, FIG. 24A, FIG. 24B, and FIG. 24C are diagrams showing the spherical aberration (SA), the chromatic aberration of magnification (CC), and a chromatic coma (DYY) (image height ratio 0.7, 1.0) when θgF=0.6684, θgF=0.6307, θgF=0.6255, θgF=0.6203, θgF=0.6103, and θgF=0.5840, at the time of infinite object point focusing of the zoom lens according to the third embodiment, where, FIG. 19A, FIG. 20A, FIG. 21A, FIG. 22A, FIG. 23A, and FIG. 24A show states at the wide angle end, FIG. 19B, FIG. 20B, FIG. 21B, FIG. 22B, FIG. 23B, and FIG. 24B show intermediate focal length states, and FIG. 19C, FIG. 20C, FIG. 21C, FIG. 22C, FIG. 23C, and FIG. 24C shows states at the telephoto end.

The zoom lens according to the third embodiment, as shown in FIG. 17A, FIG. 17B, and FIG. 17C, includes in order from an object side, a first lens group G1 having a positive refractive power, a second lens group G2 having a negative refractive power, an aperture stop S, a third lens group G3 having a positive refractive power, and a fourth lens group G4 having a positive refractive power.

The first lens group G1 consists of a cemented lens of a biconvex positive lens L1, a positive meniscus lens L2 having a convex side directed toward an image side, and a negative meniscus lens L3 having a convex surface directed toward the object side, and has a positive refractive power as a whole. Here, the biconvex positive lens L1 is the lens L1, the positive meniscus lens L2 is the intermediate layer L2, and the negative meniscus lens L3 is the lens L3.

The second lens group G2 consists of a negative meniscus lens L4 having a convex surface directed toward the object side, and a cemented lens of a positive meniscus lens L5 having a convex surface directed toward the image side and a biconcave negative lens L6, and has a negative refractive power as a whole.

The third lens group G3 consists of a biconvex positive lens L7, and a cemented lens of a biconvex positive lens L8 and a biconcave negative lens L9, and has a positive refractive power as a whole.

The fourth lens group G4 consists of a biconvex positive lens L10, and has a positive refractive power as a whole.

At the time of zooming from the wide angle end to the telephoto end, the first lens group G1 moves toward the object side, the second lens group G2 moves toward the object side up to an intermediate position, and from the intermediate position, moves toward the image side, the aperture stop S is fixed, the third lens group G3 moves toward the object side, and the fourth lens group G4 moves toward the image side.

An aspheric surface is provided to a total of nine surfaces namely, both surfaces of the negative meniscus lens L3 having the convex surface directed toward the image side in the first lens group G1, both surfaces of the negative meniscus lens L4 having the convex surface directed toward the object side and a surface on the image side of the biconcave negative lens L6 in the second lens group G2, both surfaces of the biconvex positive lens in the third lens group G3, and both surfaces of the biconvex positive lens L10 in the fourth lens group G4.

Figure 25A:
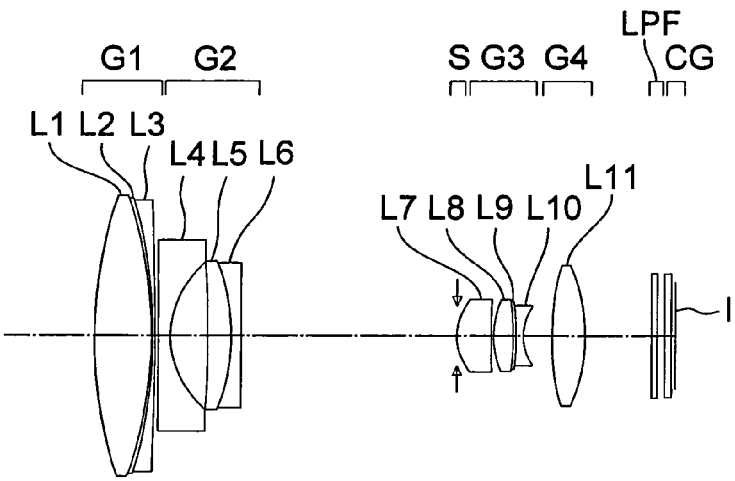
FIG. 25A, FIG. 25B, and FIG. 25C are cross-sectional views along an optical axis showing an optical arrangement at the time of infinite object point focusing of a zoom lens according to a fourth embodiment of the present invention, where.
Figure 25B:
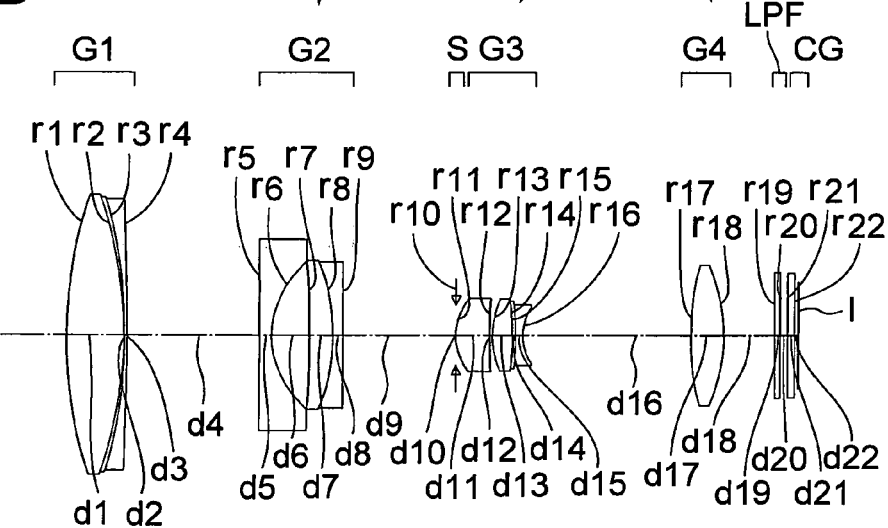
Figure 25C:
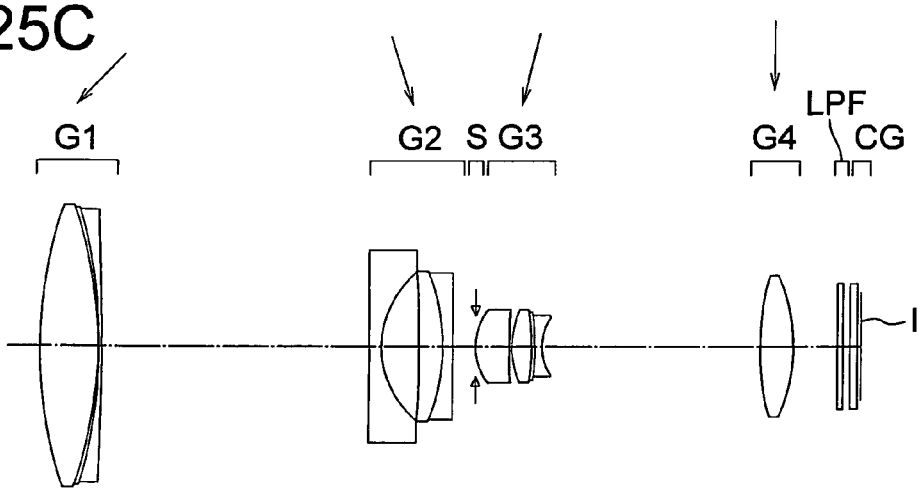

Next, a zoom lens according to a fourth embodiment of the present invention will be described below. FIG. 25A, FIG. 25B, and FIG. 25C are cross-sectional views along an optical axis showing an optical arrangement at the time of infinite object point focusing of the zoom lens according to the fourth embodiment of the present invention, where, FIG. 25A shows a state at a wide angle end, FIG. 25B shows an intermediate focal length state, and FIG. 25C shows a state at a telephoto end.

Figure 26A:
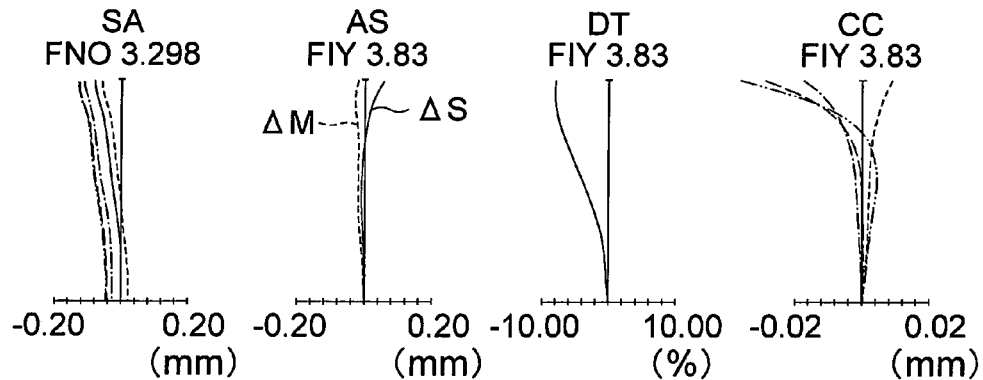
FIG. 26A, FIG. 26B, and FIG. 26C are diagrams showing a spherical aberration, an astigmatism, a distortion, and a chromatic aberration of magnification at the time of infinite object point focusing of the zoom lens according to the fourth embodiment, where.
Figure 26B:
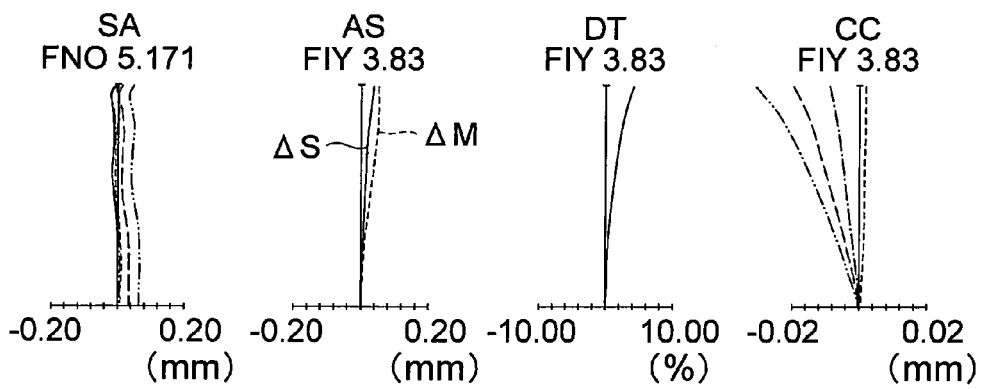
Figure 26C:
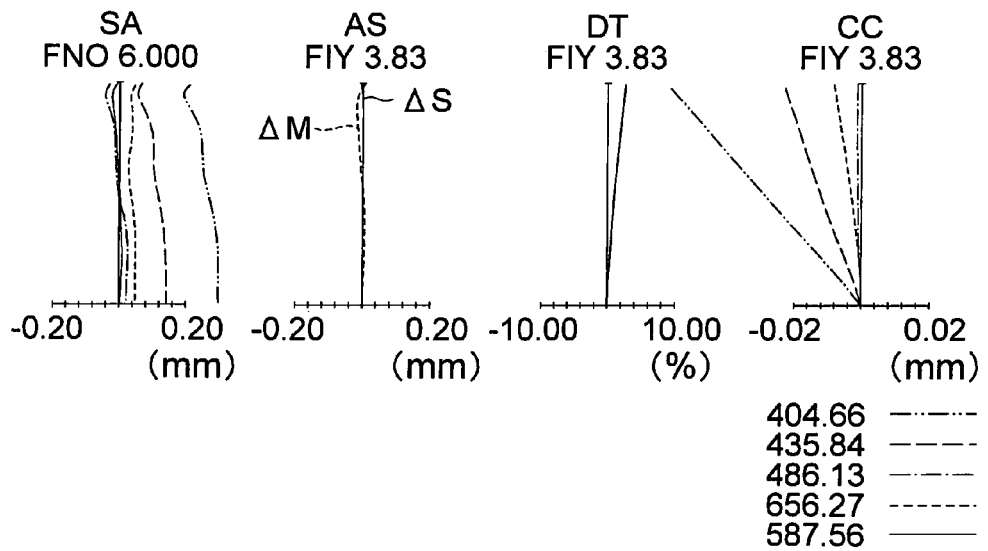
Figure 27A:
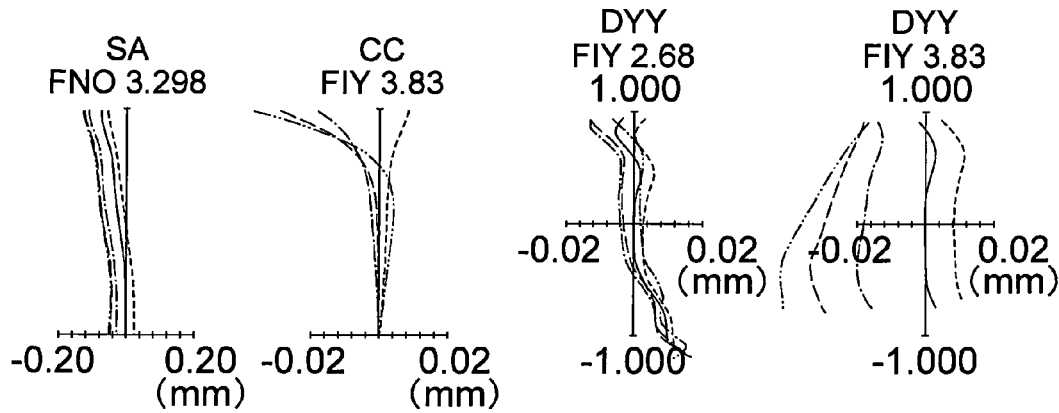
FIG. 27A, FIG. 27B, and FIG. 27C are diagrams showing the spherical aberration (SA), the chromatic aberration of magnification (CC), and a chromatic coma (DYY) (image height ratio 7.0, 1.0) when θgF=0.6684, at the time of infinite object point focusing of the zoom lens according to the fourth embodiment, where.
Figure 27B:
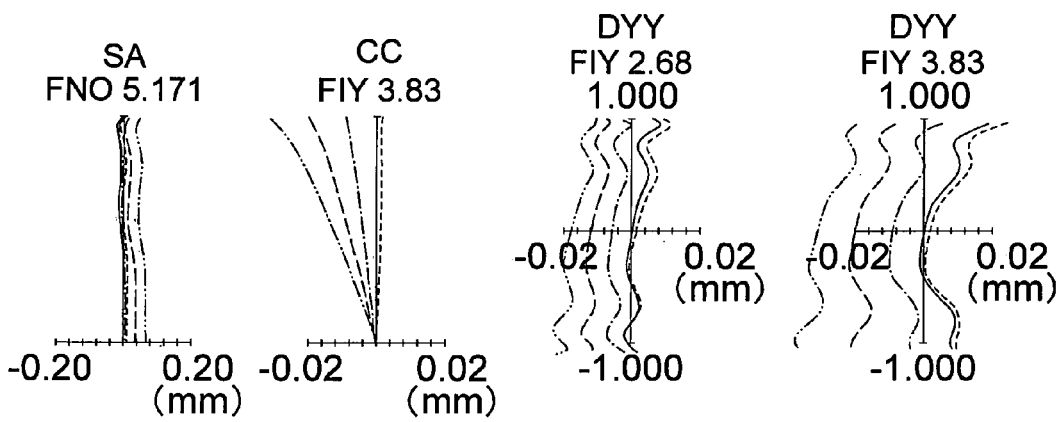
Figure 27C:
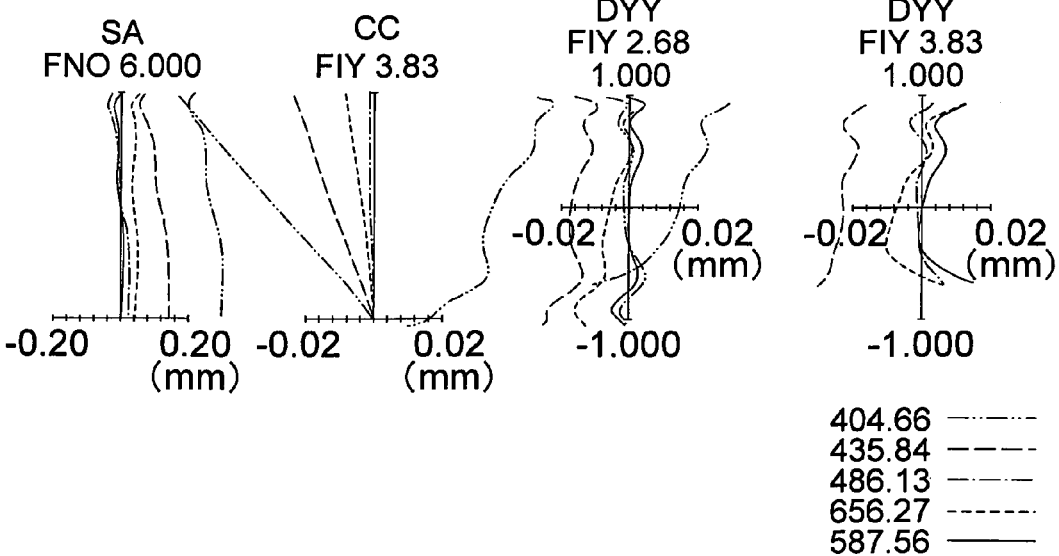
Figure 31A:
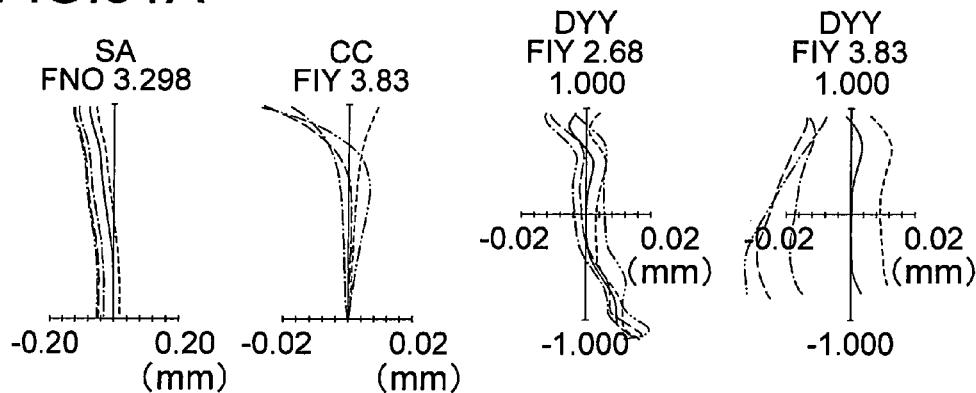
FIG. 31A, FIG. 31B, and FIG. 31C are diagrams showing the spherical aberration (SA), the chromatic aberration of magnification (CC), and the chromatic coma (DYY) (image height ratio 0.7, 1.0) when θgF=0.6103, at the time of infinite object point focusing of the zoom lens according to the fourth embodiment, where.
Figure 31B:
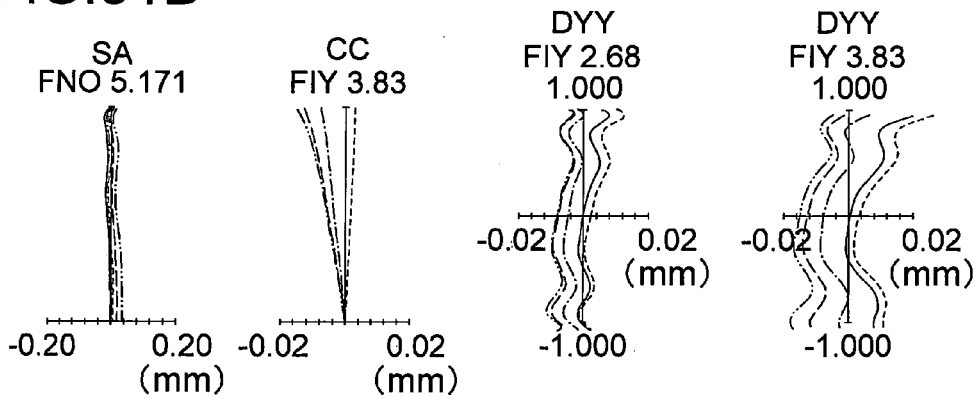
Figure 31C:
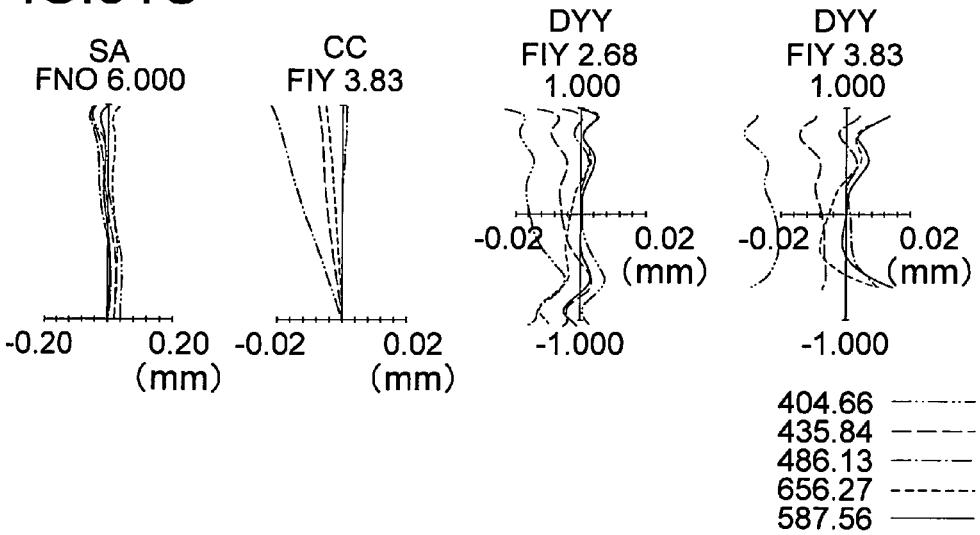

FIG. 26A, FIG. 26B, and FIG. 26C are diagrams showing a spherical aberration (SA), an astigmatism (AS), a distortion (DT), and a chromatic aberration of magnification (CC) at the time of infinite object point focusing of the zoom lens according to the fourth embodiment, where, FIG. 26A shows a state at the wide angle end, FIG. 26B shows an intermediate focal length state, and FIG. 26C shows a state at the telephoto end.

Moreover, FIG. 27A, FIG. 27B, FIG. 27C, FIG. 28A, FIG. 28B, FIG. 28C, FIG. 29A, FIG. 29B, FIG. 29C, FIG. 30A, FIG. 30B, FIG. 30C, FIG. 31A, FIG. 31B, FIG. 31C, FIG. 32A, FIG. 32B, and FIG. 32C are diagrams showing the spherical aberration (SA), the chromatic aberration of magnification (CC), and a chromatic coma (DYY) (image height ratio 0.7, 1.0) when $\theta gF=0.6684$, $\theta gF=0.6307$, $\theta gF=0.6255$, $\theta gF=0.6203$, $\theta gF=0.6103$, and $\theta gF=0.5840$, at the time of infinite object point focusing of the zoom lens according to the fourth embodiment, where, FIG. 27A, FIG. 28A, FIG. 29A, FIG. 30A, FIG. 31A, and FIG. 32A show states at the wide angle end, FIG. 27B, FIG. 28B, FIG. 29B, FIG. 30B, FIG. 31B, and FIG. 32B show intermediate focal length states, and FIG. 27C, FIG. 28C, FIG. 29C, FIG. 30C, FIG. 31C, and FIG. 32C show states at the telephoto end.

The zoom lens according to the fourth embodiment, as shown in FIG. 25A, FIG. 25B, and FIG. 25c, includes in order from an object side, a first lens group G1 having a positive refractive power, a second lens group G2 having a negative refractive power, an aperture stop S, a third lens group G3 having a positive refractive power, and a fourth lens group G4 having a positive refractive power.

The first lens group G1 consists of a cemented lens of a biconvex positive lens L1, a positive meniscus lens L2 having a convex surface directed toward an image side, and a negative meniscus lens L3 having a convex surface directed toward the image side, and has a positive refractive power as a whole. Here, the biconvex positive lens L1 is the lens L1, the positive meniscus lens L2 is the intermediate layer L2, and the negative meniscus lens L3 is the lens L3.

The second lens group G2 consists of a negative meniscus lens L4 having a convex surface directed toward the object side, and a cemented lens of a positive meniscus lens L5 having a convex surface directed toward the image side and a biconcave negative lens L6, and has a negative refractive power as a whole.

The third lens group G3 consists of a biconvex positive lens L7, and a cemented lens of a biconvex positive lens L8, a negative meniscus lens L9 having a convex surface directed toward the image side, and a biconcave negative lens L10, and has a positive refractive power as a whole.

The fourth lens group G4 consists of a biconvex positive lens L11, and has a positive refractive power as a whole.

At the time of zooming from the wide angle end to the telephoto end, the first lens group G1 moves toward the object side, the second lens group G2 moves toward the object side up to an intermediate position, and from the intermediate position, moves toward the image side, the aperture stop S is fixed, the third lens group G3 moves toward the object side, and the fourth lens group G4 moves toward the image side.

An aspheric surface is provided to a total of nine surfaces namely, both surfaces of the negative meniscus lens L3 having the convex surface directed toward the image side in the first lens group G1, both surfaces of the negative meniscus lens L4 having the convex surface directed toward the object side, and a surface on the image side of the biconcave negative lens L6 in the second lens group G2, both surfaces of the biconvex positive lens L7 in the third lens group G3, and both surfaces of the biconvex positive lens L10 in the fourth lens group G4.

Figure 33A:
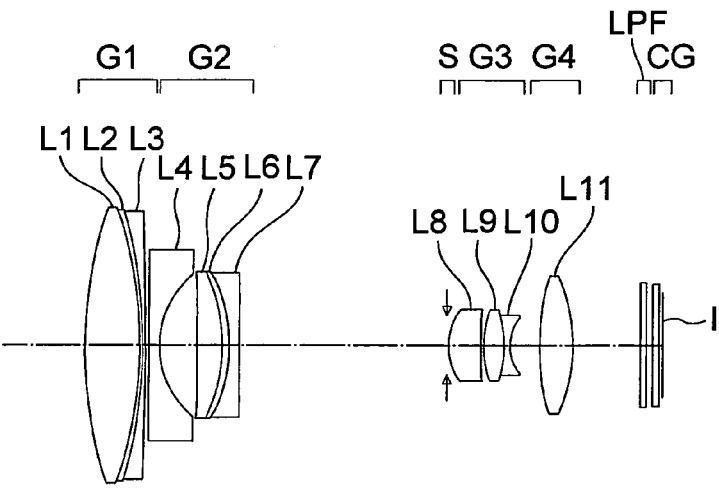
FIG. 33A, FIG. 33B, and FIG. 33C are cross-sectional views along an optical axis showing an optical arrangement at the time of infinite object point focusing of a zoom lens according to a fifth embodiment of the present invention, where.
Figure 33B:
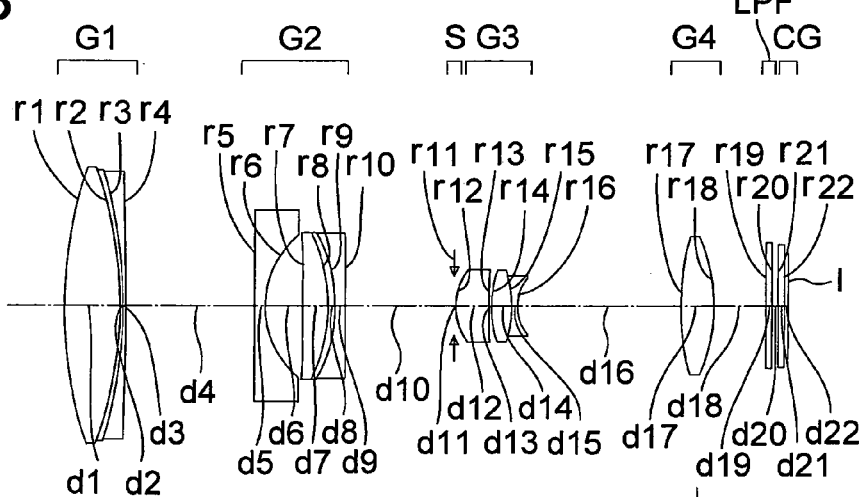
Figure 33C:
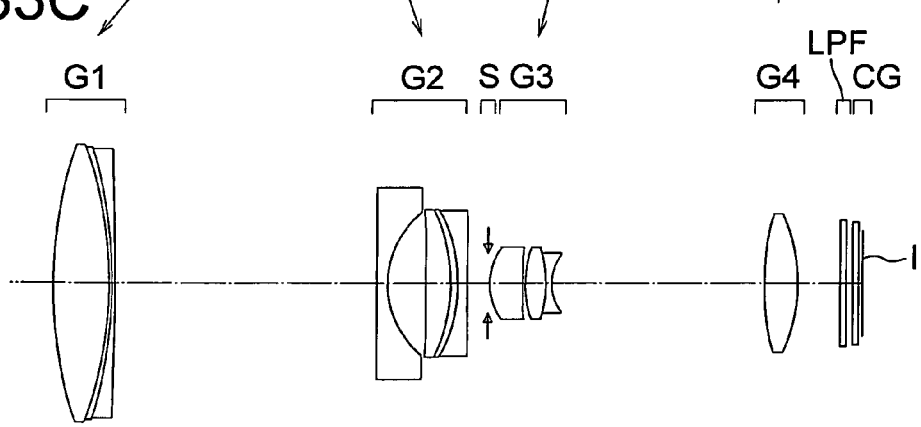

Next, a zoom lens according to a fifth embodiment of the present invention will be described below. FIG. 33A, FIG. 33B, and FIG. 33C are cross-sectional views along an optical axis showing an optical arrangement at the time of infinite object point focusing of the zoom lens according to the fifth embodiment of the present invention, where, FIG. 33A shows a state at a wide angle end, FIG. 33B shows an intermediate focal length state, and FIG. 33C shows a state at a telephoto end.

Figure 34A:
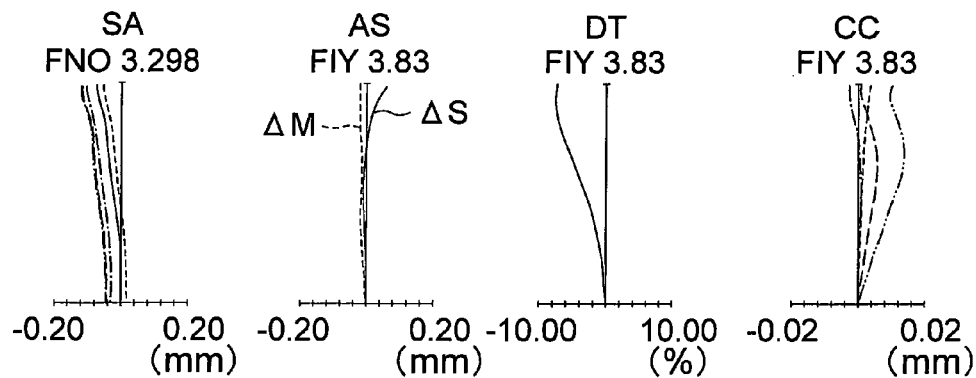
FIG. 34A, FIG. 34B, and FIG. 34C are diagrams showing a spherical aberration, an astigmatism, a distortion, and a chromatic aberration of magnification at the time of infinite object point focusing of the zoom lens according to the fifth embodiment, where.
Figure 34B:
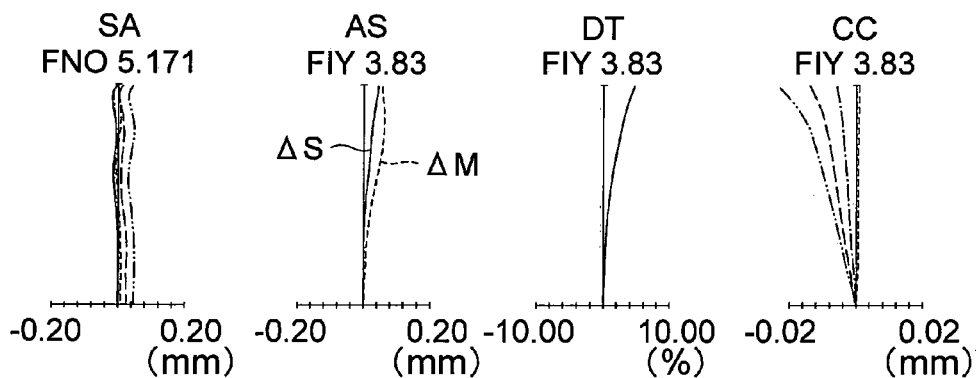
Figure 34C:
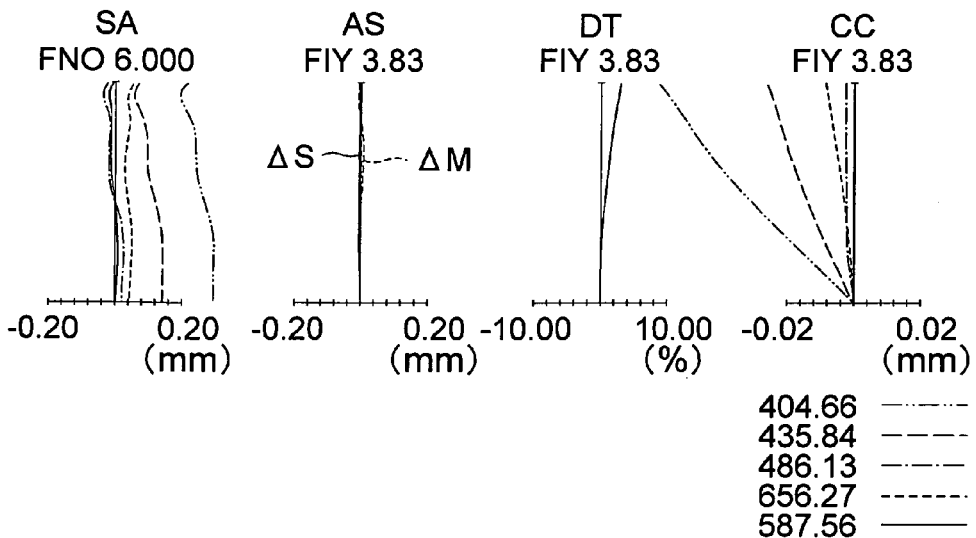
Figure 36A:
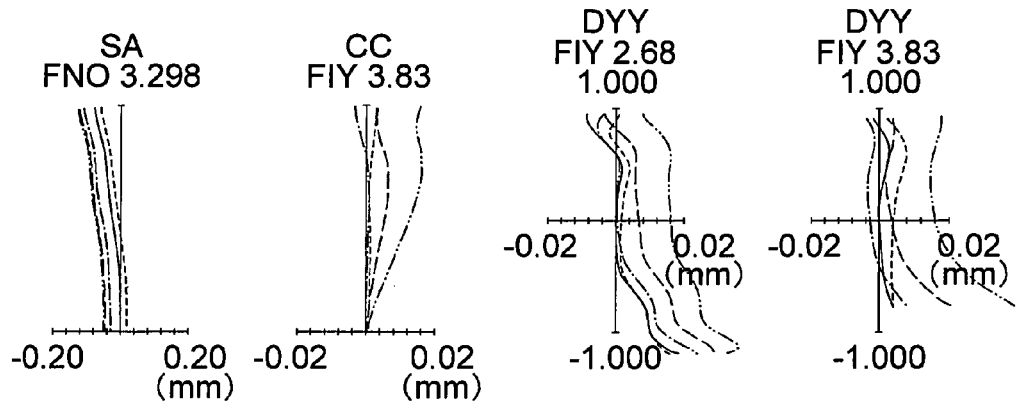
FIG. 36A, FIG. 36B, and FIG. 36C are diagrams showing the spherical aberration (SA), the chromatic aberration of magnification (CC), and the chromatic coma (DYY) (image height ratio 7.0, 1.0) when θgF=0.6307, at the time of infinite object point focusing of the zoom lens according to the fifth embodiment, where.
Figure 36B:
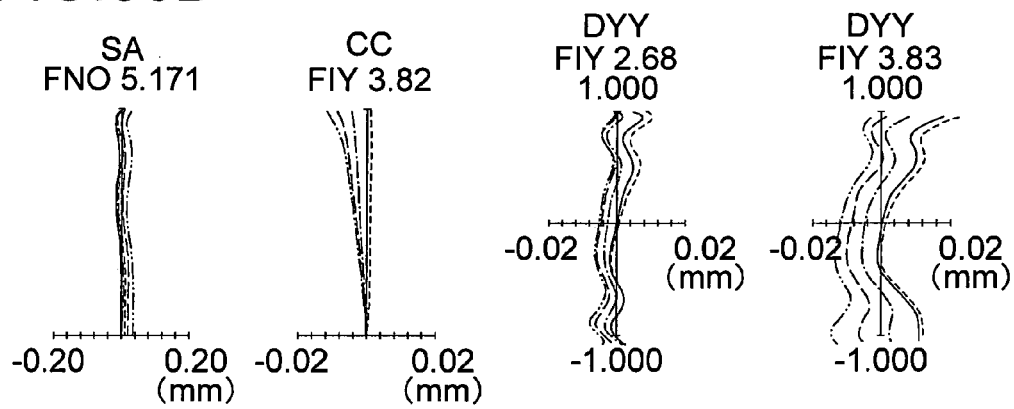
Figure 36C:
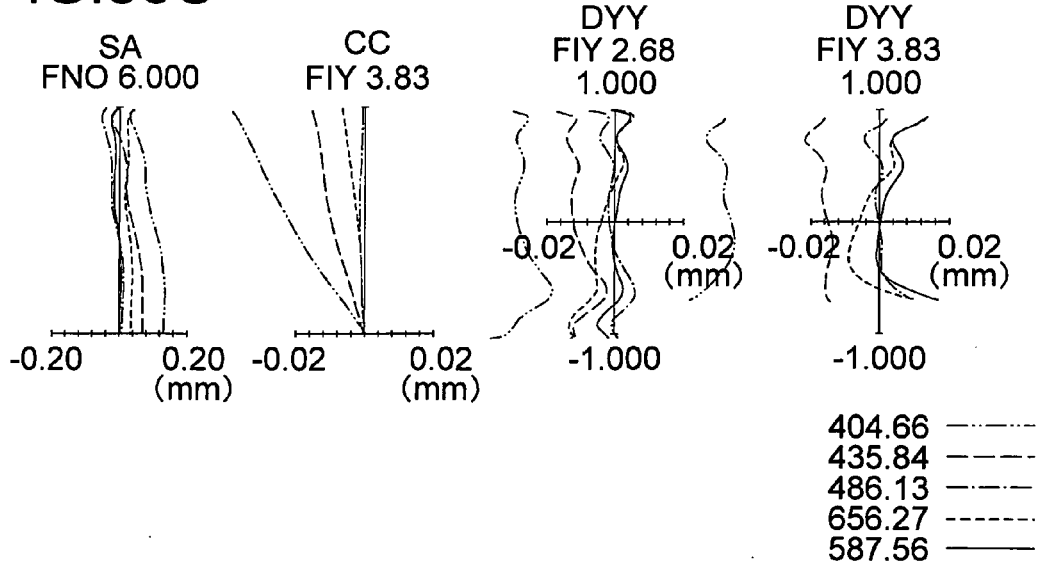

FIG. 34A, FIG. 34B, and FIG. 34C are diagrams showing a spherical aberration (SA), an astigmatism (AS), a distortion (DT), and a chromatic aberration of magnification (CC) at the time of infinite object point focusing of the zoom lens according to the fifth embodiment, where, FIG. 34A shows a state at the wide angle end, FIG. 34B shows an intermediate focal lengths state, and FIG. 34C shows a state at the telephoto end.

Moreover, FIG. 35A, FIG. 35B, FIG. 35C, FIG. 36A, FIG. 36B, FIG. 36C, FIG. 37A, FIG. 37B, FIG. 37C, FIG. 38A, FIG. 38B, FIG. 38C, FIG. 39A, FIG. 39B, FIG. 39C, FIG. 40A, FIG. 40B, and FIG. 40C are diagrams showing the spherical aberration (SA), the chromatic aberration of magnification (CC), and a chromatic coma (DYY) (image height ratio 0.7, 1.0) when $\theta gF=0.6684$, $\theta gF=0.6307$, $\theta gF=0.6255$, $\theta gF=0.6203$, $\theta gF=0.6103$, and $\theta gF=0.5840$, at the time of infinite object point focusing of the zoom lens according to the fifth embodiment, where, FIG. 35A, FIG. 36A, FIG. 37A, FIG. 38A, FIG. 39A, and FIG. 40A show states at the wide angle end, FIG. 35B, FIG. 36B, FIG. 37B, FIG. 38B, FIG. 39B, and FIG. 40B show intermediate focal length states, and FIG. 35C, FIG. 36C, FIG. 37C, FIG. 38C, FIG. 39C, and FIG. 40C show states at the telephoto end.

The zoom lens according to the fifth embodiment, as shown in FIG. 33A, FIG. 33B, and FIG. 33C, includes in order from an object side, a first lens group G1 having a positive refractive power, a second lens group G2 having a negative refractive power, an aperture stop S, a third lens group G3 having a positive refractive power, and a fourth lens group G4 having a positive refractive power.

The first lens group G1 consists of a cemented lens of a biconvex positive lens L1, a positive meniscus lens L2 having a convex surface directed toward an image side, and a negative meniscus lens L3 having a convex surface directed toward the image side, and has a positive refractive power as a whole. Here, the biconvex positive lens L1 is the lens L1, the positive meniscus lens L2 is the intermediate layer L2, and the negative meniscus lens L3 is the lens L3.

The second lens group G2 consists of a negative meniscus lens L4 having a convex surface directed toward the object side, and a cemented lens of a positive meniscus lens L5 having a convex surface directed toward the image side, a positive meniscus lens L6 having a convex surface directed toward the image side, and a biconcave negative lens L7, and has a negative refractive power as a whole.

The third lens group G3 consists of a biconvex positive lens L8, and a cemented lens of a biconvex positive lens L9 and a biconcave negative lens L10, and has a positive refractive power as a whole.

The fourth lens group G4 consists of a biconvex positive lens L11, and has a positive refractive power as a whole.

At the time of zooming from the wide angle end to the telephoto end, the first lens group G1 moves toward the object side, the second lens group G2 moves toward the object side up to an intermediate position, and from the intermediate position, moves toward the image side, the aperture stop S is fixed, the third lens group G3 moves toward the object side, and the fourth lens group G4 moves toward the image side.

An aspheric surface is provided to a total of 10 surfaces namely, both surfaces of the negative meniscus lens L3 having a convex surface directed toward the image side in the first lens group G1, both surfaces of the negative meniscus lens L4 having the convex surface directed toward the object side and both surfaces of the biconcave negative lens L7 in the second lens group G2, both surfaces of the biconvex positive lens L8 in the third lens group G3, and both surfaces of the biconvex positive lens L11 in the fourth lens group G4.

Figure 41A:
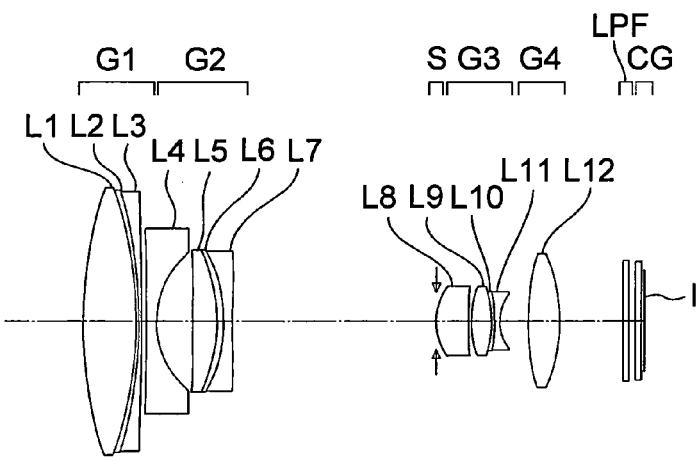
FIG. 41A, FIG. 41B, and FIG. 41C are cross-sectional views along an optical axis showing an optical arrangement at the time of infinite object point focusing of a zoom lens according to a sixth embodiment of the present invention, where.
Figure 41B:
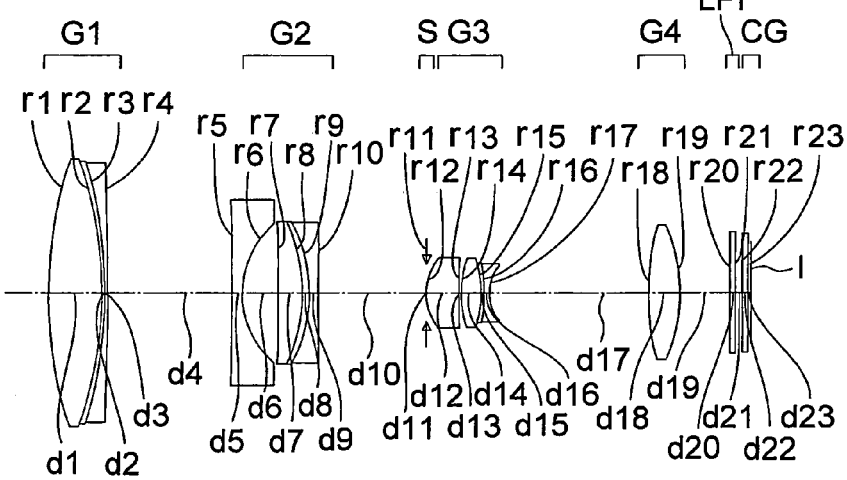
Figure 41C:
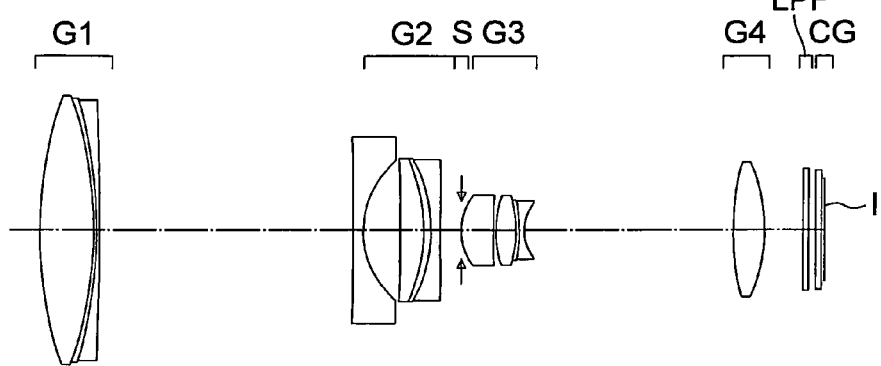

Next, a zoom lens according to a sixth embodiment of the present invention will be described below. FIG. 41A, FIG. 41B, and FIG. 41C are cross-sectional views along an optical axis showing an optical arrangement at the time of infinite object point focusing of the zoom lens according to the sixth embodiment of the present invention, where, FIG. 41A shows a state at a wide angle end, FIG. 41B shows an intermediate focal length state, and FIG. 41C shows a state at a telephoto end.

Figure 42A:
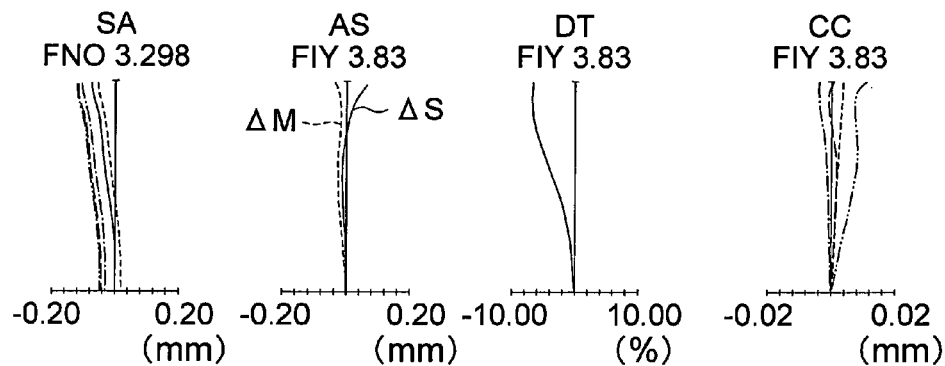
FIG. 42A, FIG. 42B, and FIG. 42C are diagrams showing a spherical aberration, an astigmatism, a distortion, and a chromatic aberration of magnification at the time of infinite object point focusing of the zoom lens according to the sixth embodiment, where.
Figure 42B:
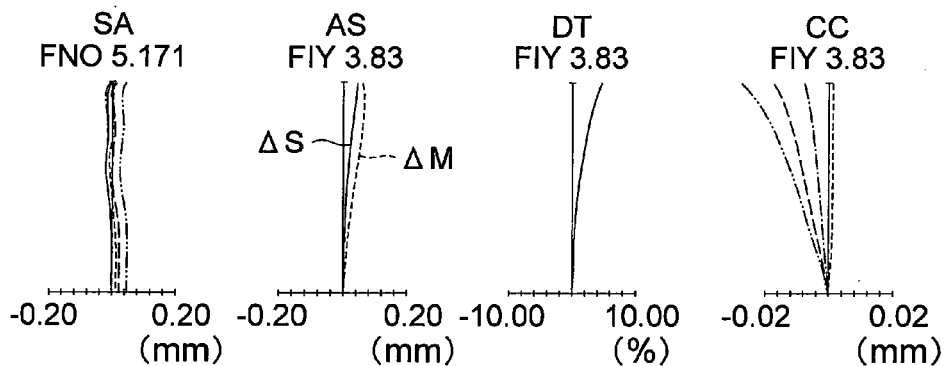
Figure 42C:
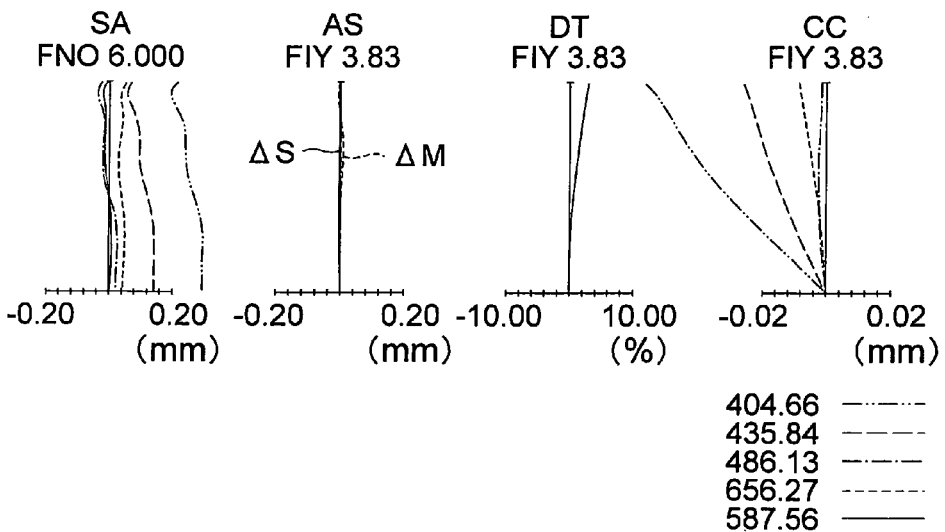
Figure 45A:
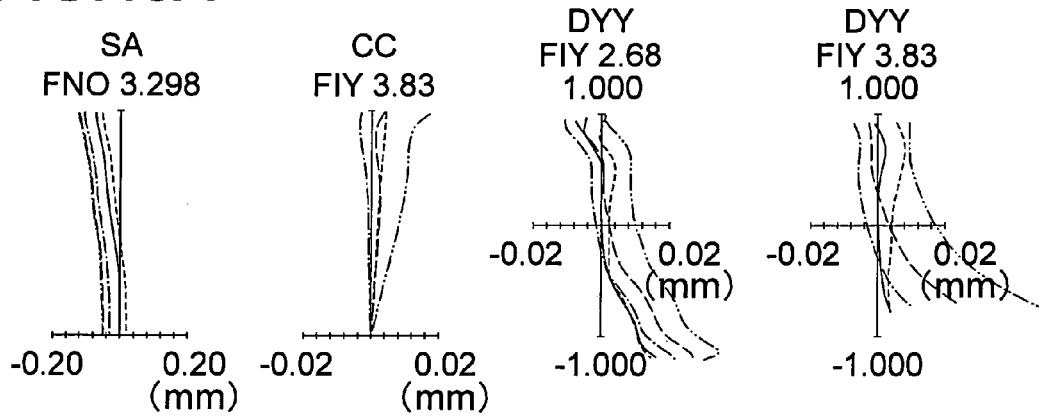
FIG. 45A, FIG. 45B, and FIG. 45C are diagrams showing the spherical aberration (SA), the chromatic aberration of magnification (CC), and the chromatic coma (DYY) (image height ratio 0.7, 1.0) when θgF=0.6255, at the time of infinite object point focusing of the zoom lens according to the sixth embodiment, where.
Figure 45B:
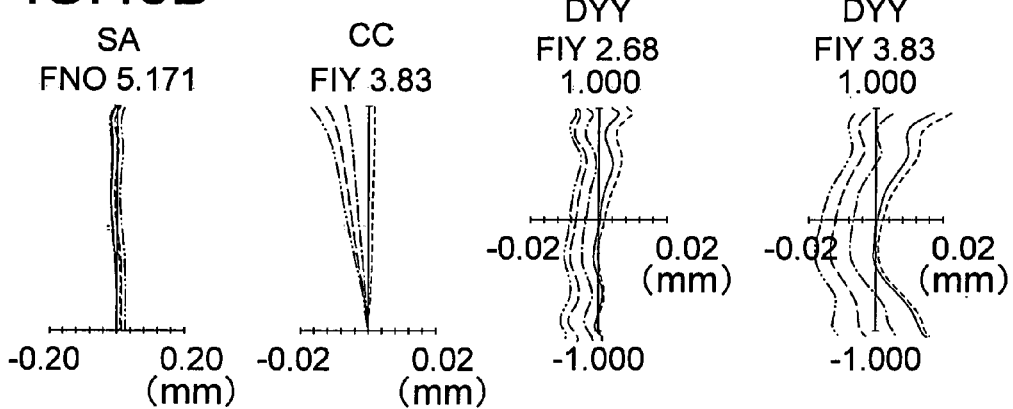
Figure 45C:
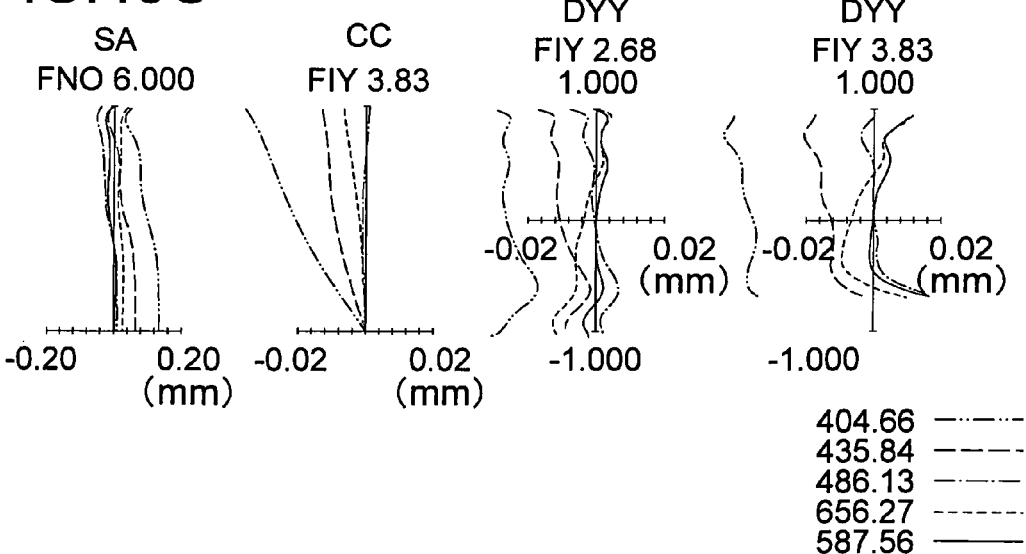
Figure 46A:
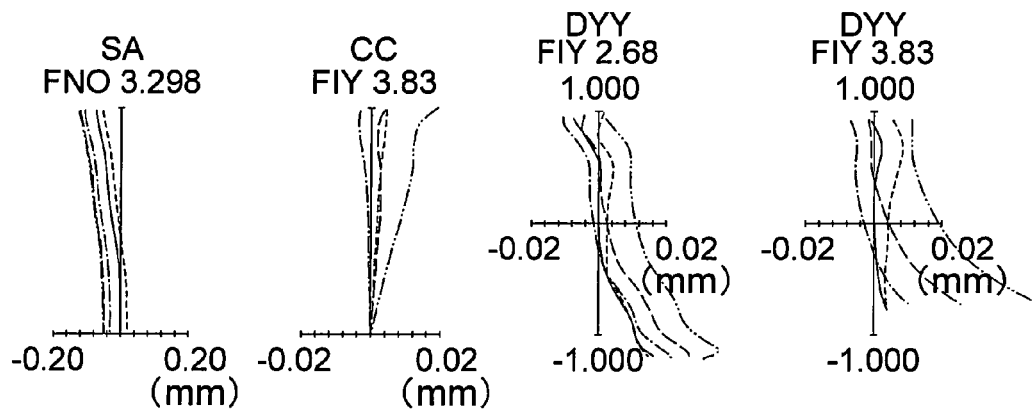
FIG. 46A, FIG. 46B, and FIG. 46C are diagrams showing the spherical aberration (SA), the chromatic aberration of magnification (CC), and the chromatic coma (DYY) (image height ratio 0.7, 1.0) when θgF=0.6203, at the time of infinite object point focusing of the zoom lens according to the sixth embodiment, where.
Figure 46B:
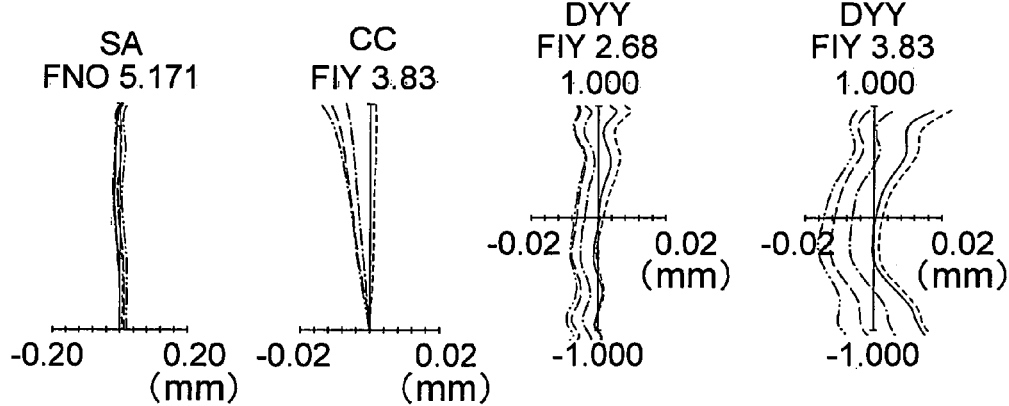
Figure 46C:
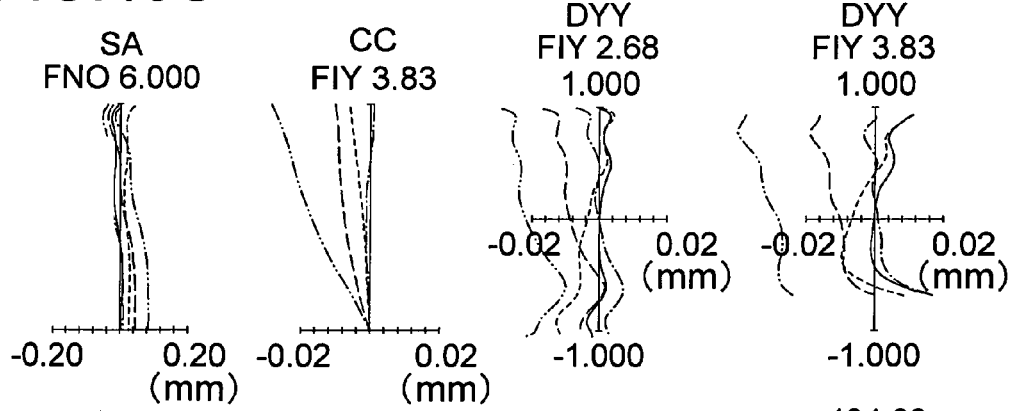
Figure 48A:
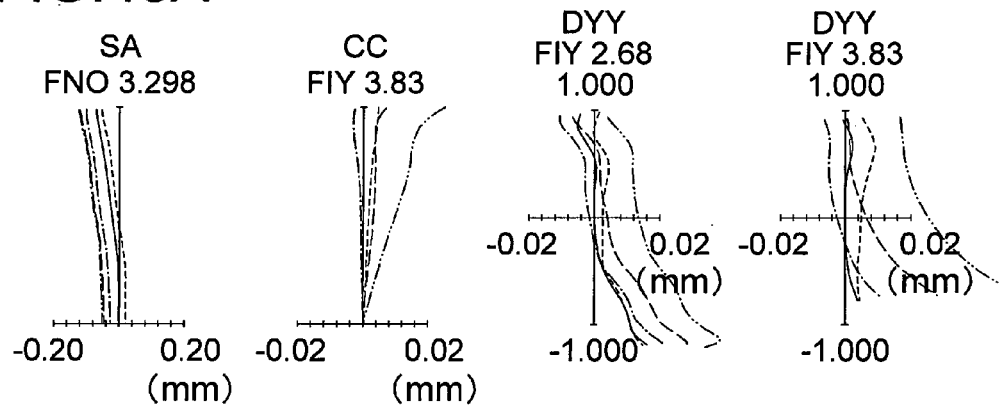
FIG. 48A, FIG. 48B, and FIG. 48C are diagrams sowing the spherical aberration (SA), the chromatic aberration of magnification (CC), and the chromatic coma (DYY) (image height ratio 0.7, 1.0) when θgF=0.5840, at the time of infinite object point focusing of the zoom lens according to the sixth embodiment, where.
Figure 48B:
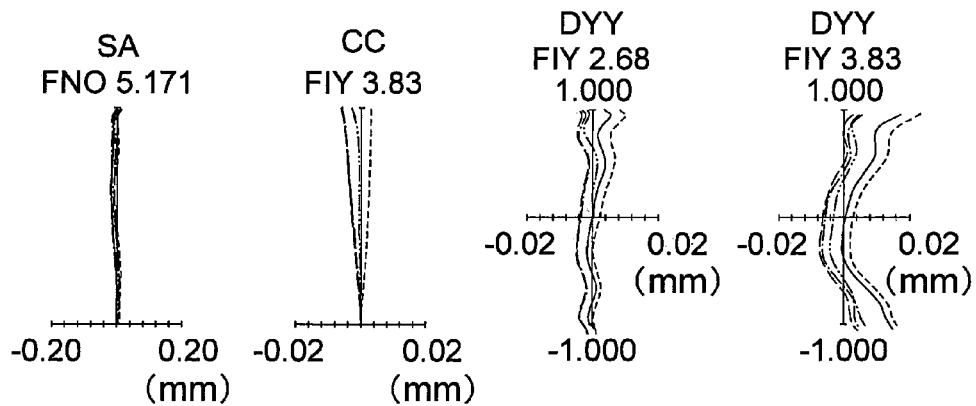
Figure 48C:
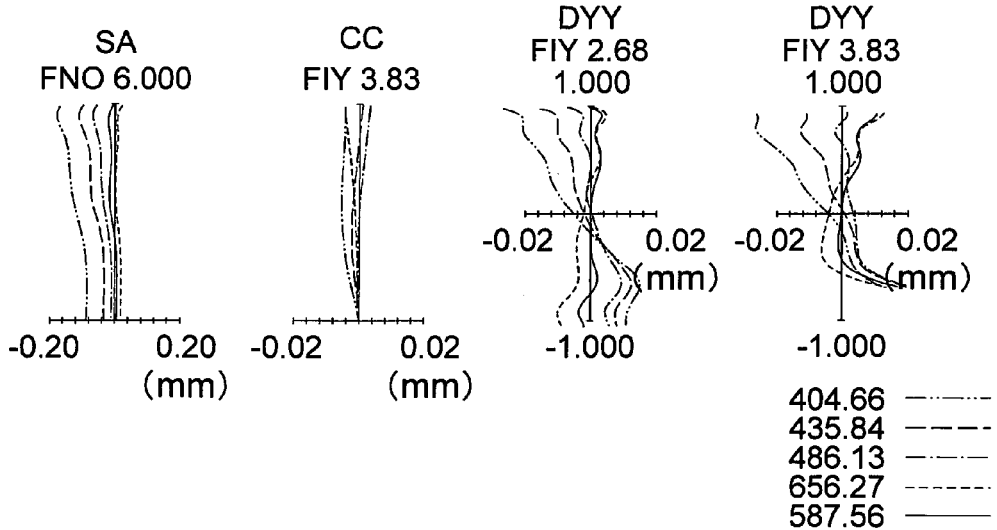

FIG. 42A, FIG. 42B, and FIG. 42C are diagrams showing a spherical aberration (SA), an astigmatism (AS), a distortion (DT), and a chromatic aberration of magnification (CC) at the time of infinite object point focusing of the zoom lens according to the sixth embodiment, where, FIG. 42A shows a state at the wide angle end, FIG. 42B shows an intermediate focal length state, and FIG. 42C shows a state at the telephoto end.

Moreover, FIG. 43A, FIG. 43B, FIG. 43C, FIG. 44A, FIG. 44B, FIG. 44C, FIG. 45A, FIG. 45B, FIG. 45C, FIG. 46A, FIG. 46B, FIG. 46C, FIG. 47A, FIG. 47B, FIG. 47C, FIG. 48A, FIG. 48B, and FIG. 48C are diagrams showing the spherical aberration (SA), the chromatic aberration of magnification (CC), and a chromatic coma (DYY) (image height ratio 0.7, 1.0) when θgF=0.6684, θgF=0.6307, θgF=0.6255, θgF=0.6203, θgF=0.6103, and θgF=0.5840, at the time of infinite object point focusing of the zoom lens according to the sixth embodiment, where, FIG. 43A, FIG. 44A, FIG. 45A, FIG. 46A, FIG. 47A, and FIG. 48A show states at the wide angle end, FIG. 43B, FIG. 44B, FIG. 45B, FIG. 46B, FIG. 47B, and FIG. 48B show intermediate focal length states, and FIG. 43C, FIG. 44C, FIG. 45C, FIG. 46C, FIG. 47C, and FIG. 48C show states at the telephoto end.

The zoom lens according to the sixth embodiment, as shown in FIG. 41A, FIG. 41B, and FIG. 41C, includes in order from an object side, a first lens group G1 having a positive refractive power, a second lens group G2 having a negative refractive power, an aperture stop S, a third lens group G3 having a positive refractive power, and a fourth lens group G4 having a positive refractive power. In all the embodiments which will be described below, in the lens cross-sectional views, LPF denotes a low pass filter, CG denotes a cover glass, and I denotes an image pickup surface of an electronic image pickup element.

The first lens group G1 consists of a cemented lens of a biconvex positive lens L1, a positive meniscus lens L2 having a convex surface directed toward an image side, and a negative meniscus lens L3 having a convex surface directed toward the image side, and has a positive refractive power as a whole. Here, the biconvex positive lens L1 is the lens L1, the positive meniscus lens L2 is the intermediate layer L2, and the negative meniscus lens L3 is the lens L3.

The second lens group G2 consists of a negative meniscus lens L4 having a convex surface directed toward the object side, and a cemented lens of a positive meniscus lens L5 having a convex surface directed toward the image side, a negative meniscus lens L6 having a convex surface directed toward the image side, and a biconcave negative lens L7, and has a negative refractive power as a whole.

The third lens group G3 consists of a biconvex positive lens L8, and a cemented lens of a biconvex positive lens L9, a negative meniscus lens L10 having a convex surface directed toward the image side, and a biconcave negative lens L11, and has a positive refractive power as a whole.

The fourth lens group G4 consists of a biconvex positive lens L12, and has a positive refractive power as a whole.

At the time of zooming from the wide angle end to the telephoto end, the first lens group G1 moves toward the object side, the second lens group G2 moves toward the object side up to an intermediate position, and from the intermediate position, moves toward the image side, the aperture stop S is fixed, the third lens group G3 moves toward the object side, and the fourth lens group G4 moves toward the image side.

An aspheric surface is provided to a total of 10 surfaces namely, both surfaces of the negative meniscus lens L3 having the convex surface directed toward the image side in the first lens group G1, both surfaces of the negative meniscus lens L4 having the convex surface directed toward the object side and both surfaces of the biconcave negative lens L7 in the second lens group G2, both surfaces of the biconvex positive lens L8 in the third lens group G3, and both surfaces of the biconvex positive lens L11 (L12) in the fourth lens group G4.

Numerical data of each embodiment described above is shown below. In numerical data of each of examples, each of r1, r2, . . . denotes radius of curvature of each lens surface, each of d1, d2, . . . denotes a distance between two lenses, each of nd1, nd2, . . . denotes a refractive index of each lens for a d-line, and each of vd1, vd2, . . . denotes an Abbe constant for each lens. Further, $F_{NO}$ denotes an F number, f denotes a focal length of the entire zoom lens system, D0 denotes a distance from an objec to first surface. Further, * denotes an aspheric data, S denotes a stop.

Further, WE denotes a wide angle end, ST denotes an intermediate state, TE denotes a telephoto end When x is let to be an optical axis with a direction of traveling of light as a positive (direction), and y is let to be in a direction orthogonal to the optical axis, a shape of the aspheric surface is described by the following expression.

$$x=(y^2/r)/[1+\{1-(K+1)(y/r)^2\}^{1/2}]+A_4y^4+A_6y^6+A_8y^8+A_{10}y^{10}$$

where, r denotes a paraxial radius of curvature, K denotes a conical coefficient, A4, A6, A8 and A10 denote aspherical surface coefficients of a fourth order, a sixth order, an eight order, a tenth order, and a twelfth order respectively. Moreover, in the aspherical surface coefficients, 'e-n' (where, n is an integral number) indicates '$10^{-n}$'.

Theses symbols are common in following exampls.

EXAMPLE 1

| Unit mm | | | | |
|---|---|---|---|---|
| Surface data | | | | |
| Surface no. | r | d | nd | vd |
| Object plane | ∞ | ∞ | | |
| 1 | 27.5263 | 4.1000 | 1.69680 | 55.53 |
| 2 | −48.8322 | 0.1000 | 1.52540 | 51.81 |
| 3* | −44.3924 | 0.1000 | 1.63387 | 23.38 |

-continued

| | | Unit mm | | |
|---|---|---|---|---|
| 4* | 313.8039 | Variable | | |
| 5* | 74.1893 | 0.8000 | 1.88300 | 40.76 |
| 6* | 5.4229 | 2.5000 | | |
| 7* | −13.6848 | 0.7000 | 1.53071 | 55.69 |
| 8* | 14.1178 | 0.2000 | | |
| 9 | 10.0798 | 1.5000 | 1.84666 | 23.78 |
| 10 | −167.9691 | Variable | | |
| 11(S) | ∞ | Variable | | |
| 12* | 6.5038 | 1.8000 | 1.74320 | 49.34 |
| 13* | −17.6436 | 0.1500 | | |
| 14 | 8.0578 | 1.8000 | 1.69680 | 55.53 |
| 15 | 379.8834 | 0.5000 | 1.84666 | 23.78 |
| 16 | 3.7517 | Variable | | |
| 17* | 10.3461 | 2.2078 | 1.53071 | 55.69 |
| 18 | −430.2283 | Variable | | |
| 19 | ∞ | 0.4000 | 1.54771 | 62.84 |
| 20 | ∞ | 0.5000 | | |
| 21 | ∞ | 0.5000 | 1.51633 | 64.14 |
| 22 | ∞ | 0.3138 | | |
| Image plane (Light receiving surface) | ∞ | | | |

| Aspherical surface data |
|---|

3rd surface $\kappa = 0.$
A2 = 0.0000E+00, A4 = 1.5000E−05, A6 = 0.0000E+00, A8 = 0.0000E+00,
A10 = 0.0000E+00

4th surface $\kappa = 0.$
A2 = 0.0000E+00, A4 = 7.8729E−06, A6 = 8.1109E−09, A8 = −6.8715E−11,
A10 = 2.8931E−13

5th surface $\kappa = 0.$
A2 = 0.0000E+00, A4 = −1.6276E−04, A6 = 1.1606E−05, A8 = −1.3614E−07,
A10 = 0.0000E+00

6th surface $\kappa = −0.0048$
A2 = 0.0000E+00, A4 = −5.7553E−04, A6 = 1.0546E−05, A8 = −1.8873E−08,
A10 = 0.0000E+00

7th surface $\kappa = 0.$
A2 = 0.0000E+00, A4 = 4.6520E−04, A6 = −1.3486E−05, A8 = 0.0000E+00,
A10 = 0.0000E+00

8th surface $\kappa = 0.$
A2 = 0.0000E+00, A4 = 6.7577E−04, A6 = −5.1037E−06, A8 = 0.0000E+00,
A10 = 0.0000E+00

12th surface $\kappa = 0.$
A2 = 0.0000E+00, A4 = −6.4005E−04, A6 = 2.6231E−06, A8 = 0.0000E+00,
A10 = 0.0000E+00

13th surface $\kappa = 0.$
A2 = 0.0000E+00, A4 = 1.0342E−04, A6 = 8.6225E−06, A8 = 0.0000E+00,
A10 = 0.0000E+00

17th surface $\kappa = 0.2205$
A2 = 0.0000E+00, A4 = −1.5525E−04, A6 = 2.0896E−05, A8 = −5.5829E−07,
A10 = 7.6555E−09

-continued

| Unit mm |
| --- |

| Numerical data |
| --- |

| Zoom ratio | | | |
| --- | --- | --- | --- |
| | Wide angle end | Intermediate state | Telephoto end |
| Focal length | 4.97131 | 13.20654 | 35.04520 |
| Fno. | 3.2000 | 3.7503 | 4.7519 |
| Angle of field | 39.1° | 16.1° | 6.2° |
| Image height | 3.840 | 3.840 | 3.840 |
| Total lens length | 39.4196 | 45.6616 | 54.9555 |
| BF | 0.31384 | 0.28904 | 0.53139 |
| d4 | 0.30000 | 10.97348 | 20.68937 |
| d10 | 8.84077 | 0.82192 | 1.27164 |
| d11 | 5.32512 | 4.74986 | 0.30000 |
| d16 | 4.01701 | 7.00148 | 13.47168 |
| d18 | 2.76509 | 3.96799 | 0.83358 |

| Zoom lens group data | | |
| --- | --- | --- |
| Group | Initial surface | Focal length |
| 1 | 1 | 40.93264 |
| 2 | 5 | −8.14099 |
| 3 | 12 | 10.00943 |
| 4 | 17 | 19.07020 |

| Any one of following 6 (six) materials may be used for lens L3 | | | | | |
| --- | --- | --- | --- | --- | --- |
| GLA | | 587.56 | 656.27 | 486.13 | 435.84 | 404.66 |
| L3 | $\theta gF = 0.6684$ | 1.633870 | 1.626381 | 1.653490 | 1.671610 | 1.688826 |
| L3 | $\theta gF = 0.6307$ | 1.634076 | 1.626381 | 1.653490 | 1.670588 | 1.686380 |
| L3 | $\theta gF = 0.6255$ | 1.634098 | 1.626381 | 1.653490 | 1.670447 | 1.685995 |
| L3 | $\theta gF = 0.6203$ | 1.634112 | 1.626381 | 1.653490 | 1.670306 | 1.685607 |
| L3 | $\theta gF = 0.6103$ | 1.634188 | 1.626381 | 1.653490 | 1.670035 | 1.684907 |
| L3 | $\theta gF = 0.5840$ | 1.634361 | 1.626381 | 1.653490 | 1.669322 | 1.683094 |

| Medium of lenses other than lens L3 are shown below | | | | | |
| --- | --- | --- | --- | --- | --- |
| GLA | 587.56 | 656.27 | 486.13 | 435.84 | 404.66 |
| L11 | 1.547710 | 1.545046 | 1.553762 | 1.558427 | 1.562262 |
| L5, L10 | 1.530710 | 1.527870 | 1.537400 | 1.542740 | 1.547272 |
| L2 | 1.525400 | 1.522390 | 1.532540 | 1.538280 | 1.543120 |
| L12 | 1.516330 | 1.513855 | 1.521905 | 1.526213 | 1.529768 |
| L4 | 1.882997 | 1.876560 | 1.898221 | 1.910495 | 1.920919 |
| L1, L8 | 1.696797 | 1.692974 | 1.705522 | 1.712339 | 1.718005 |
| L7 | 1.743198 | 1.738653 | 1.753716 | 1.762046 | 1.769040 |
| L6, L9 | 1.846660 | 1.836488 | 1.872096 | 1.894186 | 1.914294 |

| Aspheric amount of each surface |
| --- |

| 2nd surface | | | |
| --- | --- | --- | --- |
| Y | ASP | SPH | $\Delta zA(h)$ |
| 6.289 | −0.40667 | −0.40667 | −0.00000 |

| 3rd surface | | | |
| --- | --- | --- | --- |
| Y | ASP | SPH | $\Delta zC(h)$ |
| 6.289 | −0.42427 | −0.44773 | 0.02346 |

| 4th surface | | | |
| --- | --- | --- | --- |
| Y | ASP | SPH | $\Delta zD(h)$ |
| 6.289 | 0.07570 | 0.06303 | 0.01268 |

EXAMPLE 2

| | | Unit mm | | |
|---|---|---|---|---|
| | | Surface data | | |
| Surface no. | r | d | nd | νd |
| Object plane | ∞ | ∞ | | |
| 1 | 29.6977 | 4.0000 | 1.69680 | 55.53 |
| 2 | −45.9888 | 0.1000 | 1.52540 | 51.81 |
| 3* | −41.8075 | 0.1000 | 1.63387 | 23.38 |
| 4* | 1374.4475 | Variable | | |
| 5* | 53.3825 | 0.8000 | 1.83481 | 42.71 |
| 6* | 5.2515 | 2.5000 | | |
| 7 | −197.1570 | 1.8000 | 1.84666 | 23.78 |
| 8 | −9.6987 | 0.1200 | | |
| 9* | −11.2501 | 0.7000 | 1.53071 | 55.69 |
| 10* | 25.7016 | Variable | | |
| 11(S) | ∞ | Variable | | |
| 12* | 6.8450 | 1.8000 | 1.74320 | 49.34 |
| 13* | −17.0520 | 0.1000 | | |
| 14 | 8.0078 | 1.8000 | 1.72000 | 46.02 |
| 15 | −88.2831 | 0.5000 | 1.84666 | 23.78 |
| 16 | 3.8940 | Variable | | |
| 17* | 10.3370 | 2.2078 | 1.53071 | 55.69 |
| 18 | −98.7099 | Variable | | |
| 19 | ∞ | 0.4000 | 1.54771 | 62.84 |
| 20 | ∞ | 0.5000 | | |
| 21 | ∞ | 0.5000 | 1.51633 | 64.14 |
| 22 | ∞ | 0.3340 | | |
| Image plane (Light receiving surface) | ∞ | | | |
| | | Aspheric surface data | | |

3rd surface

κ = 0.
A2 = 0.0000E+00, A4 = 1.5000E−05, A6 = 0.0000E+00, A8 = 0.0000E+00,
A10 = 0.0000E+00

4th surface

κ = 0.
A2 = 0.0000E+00, A4 = 7.5246E−06, A6 = 3.0579E−09, A8 = 9.1717E−12,
A10 = −9.1698E−14

5th surface

κ = 0.0318
A2 = 0.0000E+00, A4 = −6.3770E−05, A6 = −4.7272E−07, A8 = 3.1249E−08,
A10 = 0.0000E+00

6th surface

κ = −0.0058
A2 = 0.0000E+00, A4 = 1.0537E−04, A6 = 3.7041E−06, A8 = −1.5329E−06,
A10 = 0.0000E+00

9th surface

κ = 0.
A2 = 0.0000E+00, A4 = −1.2224E−03, A6 = 4.6104E−06, A8 = 8.6277E−07,
A10 = 0.0000E+00

10th surface

κ = 0.
A2 = 0.0000E+00, A4 = −1.8459E−03, A6 = 5.9675E−06, A8 = 1.9641E−06,
A10 = 0.0000E+00

12th surface

κ = 0.
A2 = 0.0000E+00, A4 = −6.2179E−04, A6 = 3.8221E−06, A8 = 0.0000E+00,
A10 = 0.0000E+00

13th surface

κ = 0.
A2 = 0.0000E+00, A4 = 4.1895E−05, A6 = 8.4419E−06, A8 = 0.0000E+00,
A10 = 0.0000E+00

-continued

| Unit mm |
|---|

17th surface

κ = 0.2233
A2 = 0.0000E+00, A4 = −3.1282E−05, A6 = 9.1886E−06, A8 = 4.6632E−09,
A10 = −1.6451E−09

| Numerical data |
|---|

| Zoom ratio | | | |
|---|---|---|---|
| | Wide angle end | Intermediate state | Telephoto end |
| Focal length | 4.97067 | 13.20393 | 35.01903 |
| Fno. | 3.1039 | 3.5465 | 4.5498 |
| Angle of field | 39.1° | 16.2° | 6.2° |
| Image height | 3.840 | 3.840 | 3.840 |
| Total lens length | 39.6412 | 45.7224 | 55.1556 |
| BF | 0.33404 | 0.33996 | 0.54862 |
| d4 | 0.30000 | 10.98231 | 20.71623 |
| d10 | 8.87653 | 0.80304 | 1.22888 |
| d11 | 5.44307 | 4.74614 | 0.30000 |
| d16 | 3.98507 | 7.00914 | 13.52559 |
| d18 | 2.77471 | 3.91401 | 0.90847 |

| Zoom lens group data | | |
|---|---|---|
| Group | Initial surface | Focal length |
| 1 | 1 | 41.48825 |
| 2 | 5 | −8.33773 |
| 3 | 12 | 10.03711 |
| 4 | 17 | 17.75600 |

| Any one of following 6 (six) materials may be used for lens L3 | | | | | | |
|---|---|---|---|---|---|---|
| GLA | | 587.56 | 656.27 | 486.13 | 435.84 | 404.66 |
| L3 | θgF = 0.6684 | 1.633870 | 1.626381 | 1.653490 | 1.671610 | 1.688826 |
| L3 | θgF = 0.6307 | 1.634076 | 1.626381 | 1.653490 | 1.670588 | 1.686380 |
| L3 | θgF = 0.6255 | 1.634098 | 1.626381 | 1.653490 | 1.670447 | 1.685995 |
| L3 | θgF = 0.6203 | 1.634112 | 1.626381 | 1.653490 | 1.670306 | 1.685607 |
| L3 | θgF = 0.6103 | 1.634188 | 1.626381 | 1.653490 | 1.670035 | 1.684907 |
| L3 | θgF = 0.5840 | 1.634361 | 1.626381 | 1.653490 | 1.669322 | 1.683094 |

| Medium of lenses other than lens L3 are shown below | | | | | |
|---|---|---|---|---|---|
| GLA | 587.56 | 656.27 | 486.13 | 435.84 | 404.66 |
| L11 | 1.547710 | 1.545046 | 1.553762 | 1.558427 | 1.562262 |
| L6, L10 | 1.530710 | 1.527870 | 1.537400 | 1.542740 | 1.547272 |
| L2 | 1.525400 | 1.522390 | 1.532540 | 1.538280 | 1.543120 |
| L12 | 1.516330 | 1.513855 | 1.521905 | 1.526213 | 1.529768 |
| L4 | 1.834807 | 1.828975 | 1.848520 | 1.859547 | 1.868911 |
| L1 | 1.696797 | 1.692974 | 1.705522 | 1.712339 | 1.718005 |
| L7 | 1.743198 | 1.738653 | 1.753716 | 1.762046 | 1.769040 |
| L8 | 1.720002 | 1.715330 | 1.730974 | 1.739788 | 1.747274 |
| L5, L9 | 1.846660 | 1.836488 | 1.872096 | 1.894186 | 1.914294 |

| Aspheric amount of each surface |
|---|

| 2nd surface | | | |
|---|---|---|---|
| Y | ASP | SPH | ΔzA(h) |
| 6.288 | −0.43190 | −0.43190 | −0.00000 |

| 3rd surface | | | |
|---|---|---|---|
| Y | ASP | SPH | ΔzC(h) |
| 6.288 | −0.45212 | −0.47557 | 0.02345 |

| 4th surface | | | |
|---|---|---|---|
| Y | ASP | SPH | ΔzD(h) |
| 6.288 | 0.02635 | 0.01438 | 0.01197 |

EXAMPLE 3

| | | Unit mm | | |
|---|---|---|---|---|
| | | Surface data | | |
| Surface no. | r | d | nd | νd |
| Object plane | ∞ | ∞ | | |
| 1 | 32.5925 | 4.0000 | 1.72916 | 54.68 |
| 2 | −30.6010 | 0.2000 | 1.52540 | 51.81 |
| 3* | −28.7172 | 0.1000 | 1.63387 | 23.38 |
| 4* | −177.0432 | Variable | | |
| 5* | 124.9393 | 0.8000 | 1.85135 | 40.10 |
| 6* | 6.5898 | 2.7747 | | |
| 7 | −83.1520 | 1.7176 | 1.94595 | 17.98 |
| 8 | −12.7647 | 0.7000 | 1.74320 | 49.34 |
| 9* | 54.0262 | Variable | | |
| 10(S) | ∞ | 0 | | |
| 11* | 4.4837 | 2.5441 | 1.59201 | 67.02 |
| 12* | −30.7701 | 0.1010 | | |
| 13 | 7.8610 | 1.4280 | 1.49700 | 81.54 |
| 14 | −9.2372 | 0.4200 | 1.62004 | 36.26 |
| 15 | 3.4521 | Variable | | |
| 16* | 22.7893 | 2.3677 | 1.53071 | 55.69 |
| 17* | −13.6916 | Variable | | |
| 18 | ∞ | 0.4000 | 1.51633 | 64.14 |
| 19 | ∞ | 0.5000 | | |
| 20 | ∞ | 0.5000 | 1.51633 | 64.14 |
| 21 | ∞ | 0.3127 | | |
| Image plane (Light receiving surface) | ∞ | | | |

Aspheric surface data

3rd surface $\kappa = -0.0016$
$A2 = 0.0000E+00, A4 = 4.2901E-05, A6 = 1.2508E-07, A8 = -1.9714E-09,$
$A10 = 0.0000E+00$ 4th surface $\kappa = 0.$
$A2 = 0.0000E+00, A4 = 1.6095E-05, A6 = 3.2060E-08, A8 = -3.4634E-10,$
$A10 = 9.7277E-13, A12 = -1.4590E-14, A14 = 0.0000E+00,$
$A16 = 0.0000E+00, A18 = 0.0000E+00, A20 = 0.0000E+00$ 5th surface $\kappa = 0.$
$A2 = 0.0000E+00, A4 = -1.3849E-04, A6 = -1.3476E-07, A8 = 1.5487E-08,$
$A10 = -1.4110E-10$ 6th surface $\kappa = 0.$
$A2 = 0.0000E+00, A4 = 7.6298E-05, A6 = 2.9686E-06, A8 = 1.1996E-07,$
$A10 = -1.8781E-08$ 9th surface $\kappa = 0.$
$A2 = 0.0000E+00, A4 = -3.8339E-04, A6 = -6.5852E-06, A8 = 4.9468E-07,$
$A10 = -1.1383E-08, A12 = 1.8720E-10, A14 = 0.0000E+00,$
$A16 = 0.0000E+00, A18 = 0.0000E+00, A20 = 0.0000E+00$ 11th surface $\kappa = 0.$
$A2 = 0.0000E+00, A4 = -4.2168E-04, A6 = 2.8782E-04, A8 = -1.0758E-04,$
$A10 = 2.0092E-05, A12 = -1.2693E-06, A14 = 0.0000E+00,$
$A16 = 0.0000E+00, A18 = 0.0000E+00 A20 = 0.0000E+00$ 12th surface $\kappa = 0.$
$A2 = 0.0000E+00, A4 = 1.4382E-03, A6 = 5.7157E-04, A8 = -2.5981E-04,$
$A10 = 6.2688E-05, A12 = -5.0861E-06, A14 = 0.0000E+00,$
$A16 = 0.0000E+00, A18 = 0.0000E+00, A20 = 0.0000E+00$ -continued

| Unit mm |
|---|

16th surface

κ = 0.
A2 = 0.0000E+00, A4 = −5.1496E−05, A6 = 2.3163E−06, A8 = 0.0000E+00,
A10 = 0.0000E+00, A12 = 2.6933E−10, A14 = 0.0000E+00,
A16 = 0.0000E+00, A18 = 0.0000E+00, A20 = 0.0000E+00

17th surface

κ = 0.
A2 = 0.0000E+00, A4 = 0.0000E+00, A6 = 0.0000E+00, A8 = 0.0000E+00,
A10 = 5.8498E−09, A12 = 0.0000E+00, A14 = 0.0000E+00,
A16 = 2.0160E−13, A18 = 0.0000E+00, A20 = 0.0000E+00

Numerical data

Zoom ratio

| | Wide angle end | Intermediate state | Telephoto end |
|---|---|---|---|
| Focal length | 5.04097 | 15.58821 | 48.54712 |
| Fno. | 3.2977 | 5.1712 | 6.0000 |
| Angle of field | 39.7° | 13.3° | 4.4° |
| Image height | 3.830 | 3.830 | 3.830 |
| Total lens length | 41.2731 | 51.7877 | 57.8726 |
| BF | 0.31272 | 0.33156 | 0.24992 |
| d4 | 0.30000 | 9.30126 | 18.91884 |
| d9 | 15.15013 | 8.09116 | 1.62894 |
| d15 | 2.13292 | 11.82711 | 15.42319 |
| d17 | 4.82418 | 3.68351 | 3.09856 |

Zoom lens group data

| Group | Initial surface | Focal length |
|---|---|---|
| 1 | 1 | 35.09462 |
| 2 | 5 | −7.42267 |
| 3 | 10 | 10.90779 |
| 4 | 16 | 16.48718 |

Any one of following 6 (six) materials may be used for lens L3

| GLA | | 587.56 | 656.27 | 486.13 | 435.84 | 404.66 |
|---|---|---|---|---|---|---|
| L3 | θgF = 0.6684 | 1.633870 | 1.626381 | 1.653490 | 1.671610 | 1.688826 |
| L3 | θgF = 0.6307 | 1.634076 | 1.626381 | 1.653490 | 1.670588 | 1.686380 |
| L3 | θgF = 0.6255 | 1.634098 | 1.626381 | 1.653490 | 1.670447 | 1.685995 |
| L3 | θgF = 0.6203 | 1.634112 | 1.626381 | 1.653490 | 1.670306 | 1.685607 |
| L3 | θgF = 0.6103 | 1.634188 | 1.626381 | 1.653490 | 1.670035 | 1.684907 |
| L3 | θgF = 0.5840 | 1.634361 | 1.626381 | 1.653490 | 1.669322 | 1.683094 |

Medium of lenses other than lens L3 are shown below

| GLA | 587.56 | 656.27 | 486.13 | 435.84 | 404.66 |
|---|---|---|---|---|---|
| L10 | 1.530710 | 1.527870 | 1.537400 | 1.542740 | 1.547272 |
| L5 | 1.945945 | 1.931232 | 1.983832 | 2.018254 | 2.051063 |
| L7 | 1.592010 | 1.589310 | 1.598140 | 1.602875 | 1.606771 |
| L2 | 1.525400 | 1.522390 | 1.532540 | 1.538280 | 1.543120 |
| L11, L12 | 1.516330 | 1.513855 | 1.521905 | 1.526213 | 1.529768 |
| L8 | 1.496999 | 1.495136 | 1.501231 | 1.504506 | 1.507205 |
| L1 | 1.729157 | 1.725101 | 1.738436 | 1.745696 | 1.751731 |
| L6 | 1.743198 | 1.738653 | 1.753716 | 1.762046 | 1.769040 |
| L9 | 1.620041 | 1.615024 | 1.632123 | 1.642174 | 1.650998 |
| L4 | 1.851348 | 1.845052 | 1.866280 | 1.878368 | 1.888684 |

Aspheric amount of each surface

2nd surface

| Y | ASP | SPH | ΔzA(h) |
|---|---|---|---|
| 7.156 | −0.84847 | −0.84847 | 0.00000 |

3rd surface

| Y | ASP | SPH | ΔzC(h) |
|---|---|---|---|
| 7.156 | −0.79010 | −0.90586 | 0.11576 |

-continued

| Unit mm | | | |
|---|---|---|---|
| 4th surface | | | |
| Y | ASP | SPH | ΔzD(h) |
| 7.156 | −0.10047 | −0.14468 | 0.04421 |

EXAMPLE 4

| Unit mm | | | | |
|---|---|---|---|---|
| Surface data | | | | |
| Surface no. | r | d | nd | νd |
| Object plane | ∞ | ∞ | | |
| 1 | 32.4953 | 4.0000 | 1.72916 | 54.68 |
| 2 | −31.4546 | 0.1500 | 1.52540 | 51.81 |
| 3* | −28.3832 | 0.1000 | 1.63387 | 23.38 |
| 4* | −168.2376 | Variable | | |
| 5* | 125.8195 | 0.8000 | 1.85135 | 40.10 |
| 6* | 6.5968 | 2.7747 | | |
| 7 | −82.5733 | 1.7176 | 1.94595 | 17.98 |
| 8 | −13.4813 | 0.7000 | 1.74320 | 49.34 |
| 9* | 58.9657 | Variable | | |
| 10(S) | ∞ | 0 | | |
| 11* | 4.6143 | 2.4971 | 1.59201 | 67.02 |
| 12* | −33.5712 | 0.1010 | | |
| 13 | 7.9668 | 1.4475 | 1.49700 | 81.54 |
| 14 | −16.1300 | 0.2000 | 1.63419 | 23.39 |
| 15 | −20.6364 | 0.4200 | 1.62004 | 36.26 |
| 16 | 3.4484 | Variable | | |
| 17* | 22.6755 | 2.3694 | 1.53071 | 55.69 |
| 18* | −13.1210 | Variable | | |
| 19 | ∞ | 0.4000 | 1.51633 | 64.14 |
| 20 | ∞ | 0.5000 | | |
| 21 | ∞ | 0.5000 | 1.51633 | 64.14 |
| 22 | ∞ | 0.2682 | | |
| Image plane (Light receiving surface) | ∞ | | | |

Aspheric surface data

3rd surface

κ = −0.0016
A2 = 0.0000E+00, A4 = 4.8016E−05, A6 = 6.5643E−08, A8 = −1.6999E−09,
A10 = 0.0000E+00

4th surface

κ = 0.
A2 = 0.0000E+00, A4 = 1.6697E−05, A6 = 1.9105E−08, A8 = −2.5483E−10,
A10 = 3.2548E−13, A12 = −1.1168E−14, A14 = 0.0000E+00,
A16 = 0.0000E+00, A18 = 0.0000E+00, A20 = 0.0000E+00

5th surface

κ = 0.
A2 = 0.0000E+00, A4 = −1.3274E−04, A6 = −1.9954E−07, A8 = 2.8731E−08,
A10 = −3.0004E−10

6th surface

κ = 0.
A2 = 0.0000E+00, A4 = 7.5628E−05, A6 = 2.3148E−06, A8 = 1.8601E−07,
A10 = −1.3846E−08

9th surface

κ = 0.
A2 = 0.0000E+00, A4 = −3.7062E−04, A6 = −7.3787E−06, A8 = 3.2905E−07,
A10 = −9.5936E−10, A12 = −9.8133E−11, A14 = 0.0000E+00,
A16 = 0.0000E+00, A18 = 0.0000E+00, A20 = 0.0000E+00

-continued

Unit mm

11th surface

κ = 0.
A2 = 0.0000E+00, A4 = −3.9074E−04, A6 = 2.9145E−04, A8 = −1.1143E−04,
A10 = 2.0918E−05, A12 = −1.3487E−06, A14 = 0.0000E+00,
A16 = 0.0000E+00, A18 = 0.0000E+00, A20 = 0.0000E+00

12th surface

κ = 0.
A2 = 0.0000E+00, A4 = 1.3415E−03, A6 = 5.5785E−04, A8 = −2.5443E−04,
A10 = 6.0102E−05, A12 = −4.8454E−06, A14 = 0.0000E+00,
A16 = 0.0000E+00, A18 = 0.0000E+00, A20 = 0.0000E+00

17th surface

κ = 0.
A2 = 0.0000E+00, A4 = −4.8233E−05, A6 = 1.2011E−06, A8 = 0.0000E+00,
A10 = 0.0000E+00, A12 = 1.7920E−11, A14 = 0.0000E+00,
A16 = 0.0000E+00, A18 = 0.0000E+00, A20 = 0.0000E+00

18th surface

κ = 0.
A2 = 0.0000E+00, A4 = 0.0000E+00, A6 = 0.0000E+00, A8 = 0.0000E+00,
A10 = 7.3081E−10, A12 = 0.0000E+00, A14 = 0.0000E+00,
A16 = 2.0550E−14, A18 = 0.0000E+00, A20 = 0.0000E+00

Numerical data

Zoom ratio

| | Wide angle end | Intermediate state | Telephoto end |
|---|---|---|---|
| Focal length | 5.03419 | 15.58899 | 48.55042 |
| Fno. | 3.2977 | 5.1712 | 6.0000 |
| Angle of field | 39.6° | 13.3° | 4.4° |
| Image height | 3.830 | 3.830 | 3.830 |
| Total lens length | 41.2904 | 51.8537 | 57.8770 |
| BF | 0.26822 | 0.27707 | 0.16274 |
| d4 | 0.30000 | 9.29602 | 18.91361 |
| d9 | 15.14557 | 8.09879 | 1.64084 |
| d16 | 2.11642 | 11.81963 | 15.40884 |
| d18 | 4.78275 | 3.68484 | 3.07360 |

Zoom lens group data

| Group | Initial surface | Focal length |
|---|---|---|
| 1 | 1 | 35.05855 |
| 2 | 5 | −7.44906 |
| 3 | 10 | 10.91239 |
| 4 | 17 | 16.02908 |

Any one of following 6 (six) materials may be used for lens L3

| GLA | | 587.56 | 656.27 | 486.13 | 435.84 | 404.66 |
|---|---|---|---|---|---|---|
| L3 | θgF = 0.6684 | 1.633870 | 1.626381 | 1.653490 | 1.671610 | 1.688826 |
| L3 | θgF = 0.6307 | 1.634076 | 1.626381 | 1.653490 | 1.670588 | 1.686380 |
| L3 | θgF = 0.6255 | 1.634098 | 1.626381 | 1.653490 | 1.670447 | 1.685995 |
| L3 | θgF = 0.6203 | 1.634112 | 1.626381 | 1.653490 | 1.670306 | 1.685607 |
| L3 | θgF = 0.6103 | 1.634188 | 1.626381 | 1.653490 | 1.670035 | 1.684907 |
| L3 | θgF = 0.5840 | 1.634361 | 1.626381 | 1.653490 | 1.669322 | 1.683094 |

Medium of lenses other than lens L3 are shown below

| GLA | 587.56 | 656.27 | 486.13 | 435.84 | 404.66 |
|---|---|---|---|---|---|
| L9 | 1.634188 | 1.626381 | 1.653490 | 1.670035 | 1.684907 |
| L11 | 1.530710 | 1.527870 | 1.537400 | 1.542740 | 1.547272 |
| L5 | 1.945945 | 1.931232 | 1.983832 | 2.018254 | 2.051063 |
| L7 | 1.592010 | 1.589310 | 1.598140 | 1.602875 | 1.606771 |
| L2 | 1.525400 | 1.522390 | 1.532540 | 1.538280 | 1.543120 |
| L12, L13 | 1.516330 | 1.513855 | 1.521905 | 1.526213 | 1.529768 |
| L8 | 1.496999 | 1.495136 | 1.501231 | 1.504506 | 1.507205 |
| L1 | 1.729157 | 1.725101 | 1.738436 | 1.745696 | 1.751731 |
| L6 | 1.743198 | 1.738653 | 1.753716 | 1.762046 | 1.769040 |
| L10 | 1.620041 | 1.615024 | 1.632123 | 1.642174 | 1.650998 |
| L4 | 1.851348 | 1.845052 | 1.866280 | 1.878368 | 1.888684 |

-continued

| | Unit mm | | |
|---|---|---|---|
| | Aspheric amount of each surface | | |
| | 2nd surface | | |
| Y | ASP | SPH | ΔzA(h) |
| 7.170 | −0.82809 | −0.82809 | 0.00000V |
| | 3rd surface | | |
| Y | ASP | SPH | ΔzC(h) |
| 7.170 | −0.79658 | −0.92055 | 0.12397 |
| | 4th surface | | |
| Y | ASP | SPH | ΔzD(h) |
| 7.170 | −0.10800 | −0.15286 | 0.04486 |

EXAMPLE 5

| | Unit mm Surface data | | | |
|---|---|---|---|---|
| Surface no. | r | d | nd | νd |
| Object plane | ∞ | ∞ | | |
| 1 | 32.1823 | 4.0000 | 1.72916 | 54.68 |
| 2 | −30.0672 | 0.2000 | 1.52540 | 51.81 |
| 3* | −27.1910 | 0.1000 | 1.63387 | 23.38 |
| 4* | −189.2244 | Variable | | |
| 5* | 106.0775 | 0.8000 | 1.85135 | 40.10 |
| 6* | 6.6325 | 2.7747 | | |
| 7 | −85.5588 | 1.7176 | 1.94595 | 17.98 |
| 8 | −12.7080 | 0.5000 | 1.63419 | 23.39 |
| 9* | −12.3880 | 0.7000 | 1.74320 | 49.34 |
| 10* | 52.0855 | Variable | | |
| 11(S) | ∞ | 0 | | |
| 12* | 4.4523 | 2.4809 | 1.59201 | 67.02 |
| 13* | −32.3767 | 0.1010 | | |
| 14 | 7.9790 | 1.4730 | 1.49700 | 81.54 |
| 15 | −9.9862 | 0.4200 | 1.62004 | 36.26 |
| 16 | 3.4130 | Variable | | |
| 17* | 22.1548 | 2.3260 | 1.53071 | 55.69 |
| 18* | −13.4393 | Variable | | |
| 19 | ∞ | 0.4000 | 1.51633 | 64.14 |
| 20 | ∞ | 0.5000 | | |
| 21 | ∞ | 0.5000 | 1.51633 | 64.14 |
| 22 | ∞ | 0.2099 | | |
| Image plane (Light receiving surface) ∞ | | | | |

Aspheric surface data

3rd surface $K = -0.0019$
$A2 = 0.0000E+00, A4 = 6.6587E-05, A6 = -1.4631E-07,$
$A8 = -7.0727E-10, A10 = 0.0000E+00$ 4th surface $K = 0.$
$A2 = 0.0000E+00, A4 = 1.9735E-05, A6 = 7.2638E-09,$
$A8 = -6.1037E-10, A10 = 5.8071E-12, A12 = -3.1435E-14,$
$A14 = 0.0000E+00, A16 = 0.0000E+00, A18 = 0.0000E+00,$
$A20 = 0.0000E+00$ 5th surface $K = 0.$
$A2 = 0.0000E+00, A4 = -1.3722E-04, A6 = -6.9646E-07,$
$A8 = 2.6011E-08, A10 = -1.7846E-10$ -continued

| 6th surface |
| --- |

K = 0.
A2 = 0.0000E+00, A4 = 3.4420E−05, A6 = 5.1962E−07,
A8 = 1.0150E−07, A10 = −1.7486E−08
9th surface K = 0.
A2 = 0.0000E+00, A4 = 3.8937E−05, A6 = 4.5643E−06,
A8 = −6.1898E−07, A10 = 0.0000E+00
10th surface K = 0.
A2 = 0.0000E+00, A4 = −3.3805E−04, A6 = −6.0043E−06,
A8 = 3.7220E−07, A10 = −8.3222E−09, A12 = 1.7372E−10,
A14 = 0.0000E+00, A16 = 0.0000E−00, A18 = 0.0000E+00,
A20 = 0.0000E+00
12th surface K = 0.
A2 = 0.0000E+00, A4 = −4.0524E−04, A6 = 2.8173E−04,
A8 = −1.0638E−04, A10 = 2.0319E−05, A12 = −1.3076E−06,
A14 = 0.0000E+00, A16 = 0.0000E+00, A18 = 0.0000E+00,
A20 = 0.0000E+00
13th surface K = 0.
A2 = 0.0000E+00, A4 = 1.4922E−03, A6 = 5.4981E−04,
A8 = −2.4848E−04, A10 = 6.0864E−05, A12 = −4.9867E−06,
A14 = 0.0000E+00, A16 = 0.0000E+00, A18 = 0.0000E+00,
A20 = 0.0000E+00
17th surface K = 0.
A2 = 0.0000E+00, A4 = −5.4259E−05, A6 = 1.4335E−06,
A8 = 0.0000E+00, A10 = 0.0000E+00, A12 = 1.5648E−10,
A14 = 0.0000E+00, A16 = 0.0000E+00, A18 = 0.0000E+00,
A20 = 0.0000E+00
18th surface K = 0.
A2 = 0.0000E+00, A4 = 0.0000E+00, A6 = 0.0000E+00,
A8 = 0.0000E+00, A10 = 3.1630E−09, A12 = 0.0000E+00,
A14 = 0.0000E+00, A16 = 1.2162E−13, A18 = 0.0000E+00,
A20 = 0.0000E+00

Numerical data
Zoom ratio

| | Wide angle end | Intermediate state | Telephoto end |
| --- | --- | --- | --- |
| Focal length | 5.03145 | 15.58693 | 48.55455 |
| Fno. | 3.2977 | 5.1712 | 6.0000 |
| Angle of field | 39.5° | 13.2° | 4.4° |
| Image height | 3.830 | 3.830 | 3.830 |
| Total lens length | 41.6740 | 52.1301 | 57.8896 |
| BF | 0.20986 | 0.24795 | 0.03852 |
| d4 | 0.30000 | 9.31116 | 18.89949 |
| d10 | 15.15265 | 8.06604 | 1.60189 |
| d16 | 2.14592 | 11.83200 | 15.37393 |
| d18 | 4.87239 | 3.67980 | 2.98258 |

Zoom lens group data

| Group | Initial surface | Focal length |
| --- | --- | --- |
| 1 | 1 | 35.12468 |
| 2 | 5 | −7.47350 |
| 3 | 11 | 10.95318 |
| 4 | 17 | 16.12732 |

| GLA | | 587.56 | 656.27 | 486.13 | 435.84 | 404.66 |
| --- | --- | --- | --- | --- | --- | --- |

| Any one of following 6 (six) materials may be used for lens L3 | | | | | | |
| --- | --- | --- | --- | --- | --- | --- |
| L3 | θgF = 0.6684 | 1.633870 | 1.626381 | 1.653490 | 1.671610 | 1.688826 |
| L3 | θgF = 0.6307 | 1.634076 | 1.626381 | 1.653490 | 1.670588 | 1.686380 |
| L3 | θgF = 0.6255 | 1.634098 | 1.626381 | 1.653490 | 1.670447 | 1.685995 |

-continued

| | | | | | | |
|---|---|---|---|---|---|---|
| L3 | θgF = 0.6203 | 1.634112 | 1.626381 | 1.653490 | 1.670306 | 1.685607 |
| L3 | θgF = 0.6103 | 1.634188 | 1.626381 | 1.653490 | 1.670035 | 1.684907 |
| L3 | θgF = 0.5840 | 1.634361 | 1.626381 | 1.653490 | 1.669322 | 1.683094 |
| Medium of lenses other than lens L3 are shown below | | | | | | |
| L6 | | 1.634188 | 1.626381 | 1.653490 | 1.670035 | 1.684907 |
| L11 | | 1.530710 | 1.527870 | 1.537400 | 1.542740 | 1.547272 |
| L5 | | 1.945945 | 1.931232 | 1.983832 | 2.018254 | 2.051063 |
| L8 | | 1.592010 | 1.589310 | 1.598140 | 1.602875 | 1.606771 |
| L2 | | 1.525400 | 1.522390 | 1.532540 | 1.538280 | 1.543120 |
| L12, L13 | | 1.516330 | 1.513855 | 1.521905 | 1.526213 | 1.529768 |
| L9 | | 1.496999 | 1.495136 | 1.501231 | 1.504506 | 1.507205 |
| L1 | | 1.729157 | 1.725101 | 1.738436 | 1.745696 | 1.751731 |
| L7 | | 1.743198 | 1.738653 | 1.753716 | 1.762046 | 1.769040 |
| L10 | | 1.620041 | 1.615024 | 1.632123 | 1.642174 | 1.650998 |
| L4 | | 1.851348 | 1.845052 | 1.866280 | 1.878368 | 1.888684 |

Aspheric amount of each surface
2nd surface

| Y | ASP | SPH | Δ z A (h) |
|---|---|---|---|
| 7.176 | −0.86889 | −0.86889 | −0.00000 |

3rd surface

| Y | ASP | SPH | Δ z C (h) |
|---|---|---|---|
| 7.176 | −0.81235 | −0.96400 | 0.15165 |

4th surface

| Y | ASP | SPH | Δ z D (h) |
|---|---|---|---|
| 7.176 | −0.08557 | −0.13612 | 0.05055 |

EXAMPLE 6

Unit mm
Surface data

| Surface no. | r | d | nd | νd |
|---|---|---|---|---|
| Object plane | ∞ | ∞ | | |
| 1 | 31.9706 | 4.0000 | 1.72916 | 54.68 |
| 2 | −30.3870 | 0.2000 | 1.52540 | 51.81 |
| 3* | −27.9298 | 0.1000 | 1.63387 | 23.38 |
| 4* | −202.4159 | Variable | | |
| 5* | 109.3838 | 0.8000 | 1.85135 | 40.10 |
| 6* | 6.6170 | 2.7747 | | |
| 7 | −83.1273 | 1.7176 | 1.94595 | 17.98 |
| 8 | −12.8051 | 0.5000 | 1.63419 | 23.39 |
| 9* | −13.2960 | 0.7000 | 1.74320 | 49.34 |
| 10* | 55.9230 | Variable | | |
| 11(S) | ∞ | 0 | | |
| 12* | 4.5726 | 2.4175 | 1.59201 | 67.02 |
| 13* | −34.9432 | 0.1010 | | |
| 14 | 8.0854 | 1.4746 | 1.49700 | 81.54 |
| 15 | −15.6925 | 0.2000 | 1.63419 | 23.39 |
| 16 | −21.1249 | 0.4200 | 1.62004 | 36.26 |
| 17 | 3.4226 | Variable | | |
| 18* | 21.8659 | 2.3087 | 1.53071 | 55.69 |
| 19* | −12.8969 | Variable | | |
| 20 | ∞ | 0.4000 | 1.51633 | 64.14 |
| 21 | ∞ | 0.5000 | | |
| 22 | ∞ | 0.5000 | 1.51633 | 64.14 |
| 23 | ∞ | 0.1875 | | |
| Image plane (Light receiving surface) ∞ | | | | |

-continued

| Aspheric surface data |
|---|

3rd surface

K = −0.0013
A2 = 0.0000E+00, A4 = 7.3160E−05, A6 = −3.1268E−07,
A8 = 4.3765E−10, A10 = 0.0000E+00

4th surface

K = 0.
A2 = 0.0000E+00, A4 = 2.0900E−05, A6 = −1.7863E−08,
A8 = −5.6099E−10, A10 = 7.6797E−12, A12 = −3.7611E−14,
A14 = 0.0000E+00, A16 = 0.0000E+00, A18 = 0.0000E+00,
A20 = 0.0000E+00

5th surface

K = 0.
A2 = 0.0000E+00, A4 = −1.3615E−04, A6 = −6.3938E−07,
A8 = 3.2295E−08, A10 = −2.3838E−10

6th surface

K = 0.
A2 = 0.0000E−00, A4 = 3.1420E−05, A6 = −1.2555E−06,
A8 = 2.1634E−07, A10 = −1.6669E−08

9th surface

K = 0.
A2 = 0.0000E+00, A4 = 1.6099E−04, A6 = 6.6511E−07,
A8 = −8.3282E−07, A10 = 0.0000E+00

10th surface

K = 0.
A2 = 0.0000E−00, A4 = −3.1397E−04, A6 = −5.8089E−06,
A8 = 9.2290E−08, A10 = 4.2491E−09, A12 = −8.0611E−11,
A14 = 0.0000E+00, A16 = 0.0000E+00, A18 = 0.0000E+00,
A20 = 0.0000E+00

12th surface

K = 0.
A2 = 0.0000E+00, A4 = −3.5442E−04, A6 = 2.3445E−04,
A8 = −8.4573E−05, A10 = 1.6226E−05, A12 = −1.0479E−06,
A14 = 0.0000E+00, A16 = 0.0000E+00, A18 = 0.0000E+00
A20 = 0.0000E+00

13th surface

K = 0.
A2 = 0.0000E+00, A4 = 1.4020E−03, A6 = 4.4211E−04,
A8 = −1.8311E−04, A10 = 4.3797E−05, A12 = −3.5031E−06,
A14 = 0.0000E+00, A16 = 0.0000E+00, A18 = 0.0000E+00,
A20 = 0.0000E+00

18th surface

K = 0.
A2 = 0.0000E+00, A4 = −7.7606E−05, A6 = 1.4857E−06,
A8 = 0.0000E+00, A10 = 0.0000E+00, A12 = 2.8270E−10,
A14 = 0.0000E+00, A16 = 0.0000E+00, A18 = 0.0000E+00,
A20 = 0.0000E+00

19th surface

K = 0.
A2 = 0.0000E+00, A4 = 0.0000E+00, A6 = 0.0000E+00,
A8 = 0.0000E+00, A10 = 5.4079E−09, A12 = 0.0000E+00,
A14 = 0.0000E+00, A16 = 2.1592E−13, A18 = 0.0000E+00,
A20 = 0.0000E+00

| Numerical data Zoom ratio | | | |
|---|---|---|---|
| | Wide angle end | Intermediate state | Telephoto end |
| Focal length | 5.03259 | 15.58675 | 48.55784 |
| Fno. | 3.2977 | 5.1712 | 6.0000 |
| Angle of field | 39.2° | 13.2° | 4.4° |
| Image height | 3.830 | 3.830 | 3.830 |
| Total lens length | 41.7224 | 52.2325 | 57.8909 |
| BF | 0.18751 | 0.22739 | −3.19280E−04 |
| d4 | 0.30000 | 9.31988 | 18.90484 |

-continued

| | | | |
|---|---|---|---|
| d10 | 15.14897 | 8.05782 | 1.55825 |
| d17 | 2.13488 | 11.83358 | 15.38651 |
| d19 | 4.83700 | 3.67982 | 2.92755 |

Zoom lens group data

| Group | Initial surface | Focal length |
|---|---|---|
| 1 | 1 | 35.15643 |
| 2 | 5 | −7.53561 |
| 3 | 11 | 11.00402 |
| 4 | 18 | 15.64579 |

| GLA | 587.56 | 656.27 | 486.13 | 435.84 | 404.66 |
|---|---|---|---|---|---|

Any one of following 6 (six) materials may be used for lens L3

| | | | | | | |
|---|---|---|---|---|---|---|
| L3 | θgF = 0.6684 | 1.633870 | 1.626381 | 1.653490 | 1.671610 | 1.688826 |
| L3 | θgF = 0.6307 | 1.634076 | 1.626381 | 1.653490 | 1.670588 | 1.686380 |
| L3 | θgF = 0.6255 | 1.634098 | 1.626381 | 1.653490 | 1.670447 | 1.685995 |
| L3 | θgF = 0.6203 | 1.634112 | 1.626381 | 1.653490 | 1.670306 | 1.685607 |
| L3 | θgF = 0.6103 | 1.634188 | 1.626381 | 1.653490 | 1.670035 | 1.684907 |
| L3 | θgF = 0.5840 | 1.634361 | 1.626381 | 1.653490 | 1.669322 | 1.683094 |

Medium of lenses other than lens L3 are shown below

| | | | | | |
|---|---|---|---|---|---|
| L6, L10 | 1.634188 | 1.626381 | 1.653490 | 1.670035 | 1.684907 |
| L12 | 1.530710 | 1.527870 | 1.537400 | 1.542740 | 1.547272 |
| L5 | 1.945945 | 1.931232 | 1.983832 | 2.018254 | 2.051063 |
| L8 | 1.592010 | 1.589310 | 1.598140 | 1.602875 | 1.606771 |
| L2 | 1.525400 | 1.522390 | 1.532540 | 1.538280 | 1.543120 |
| L13, L14 | 1.516330 | 1.513855 | 1.521905 | 1.526213 | 1.529768 |
| L9 | 1.496999 | 1.495136 | 1.501231 | 1.504506 | 1.507205 |
| L1 | 1.729157 | 1.725101 | 1.738436 | 1.745696 | 1.751731 |
| L7 | 1.743198 | 1.738653 | 1.753716 | 1.762046 | 1.769040 |
| L11 | 1.620041 | 1.615024 | 1.632123 | 1.642174 | 1.650998 |
| L4 | 1.851348 | 1.845052 | 1.866280 | 1.878368 | 1.888684 |

Aspheric amount of each surface
2nd surface

| Y | ASP | SPH | Δ z A (h) |
|---|---|---|---|
| 7.174 | −0.85899 | −0.85899 | −0.00000 |

3rd surface

| Y | ASP | SPH | Δ z C (h) |
|---|---|---|---|
| 7.174 | −0.78282 | −0.93707 | 0.15425 |

4th surface

| Y | ASP | SPH | Δ z D (h) |
|---|---|---|---|
| 7.174 | −0.07611 | −0.12717 | 0.05106 |

Further, values of each example are shown in Table 1 as below.

Here, values are calculated in case that UV material 1 is used for lensL3. In practice, any one of UV material 1 to US material 6 could be used.

TABLE 1

| | Example 1 | Example 2 | Example 3 |
|---|---|---|---|
| fw (WE) | 4.971 | 4.971 | 5.041 |
| fs (ST) | 13.207 | 13.204 | 15.588 |
| ft (TE) | 35.045 | 35.019 | 48.547 |
| Half angle of field (WE) | 39.1° | 39.1° | 39.7° |
| Half angle of field (ST) | 16.1° | 16.2° | 13.3° |
| Half angle of field (TE) | 6.2° | 6.2° | 4.4° |
| Y | 7.050 | 7.045 | 9.630 |
| y10 | 3.84 | 3.84 | 3.83 |
| Φ1 | 0.0387 | 0.0378 | 0.0450 |
| Φ2 | 0.0011 | 0.0012 | 0.0012 |
| Φ3 | −0.0163 | −0.0156 | −0.0185 |
| Φ3/Φ1 | −0.421 | −0.403 | −0.411 |
| vd1 | 55.53 | 55.53 | 54.68 |
| nd1 | 1.69680 | 1.69680 | 1.72916 |
| θgF1 | 0.5434 | 0.5434 | 0.5442 |
| θhg1 | 0.4510 | 0.4510 | 0.4520 |
| vd2 | 51.81 | 51.81 | 51.81 |
| nd2 | 1.52540 | 1.52540 | 1.52540 |
| vd3 | 23.38 | 23.38 | 23.38 |
| nd3 | 1.63387 | 1.63387 | 1.63387 |
| b3 | 2.25812 | 2.25812 | 2.25812 |
| θgF3 | 0.6784 | 0.6784 | 0.6784 |
| βgF3 | 0.8107 | 0.8107 | 0.8107 |
| θhg3 | 0.6351 | 0.6351 | 0.6351 |
| βhg3 | 0.8301 | 0.8301 | 0.8301 |
| nd2 − nd3 | −0.10847 | −0.10847 | −0.10847 |
| $(vd3)^{-1} - (vd1)^{-1}$ | 0.02476 | 0.02476 | 0.02448 |
| $(vd3)^{-1} - (vd2)^{-1}$ | 0.02347 | 0.02347 | 0.02347 |
| θgF3 − θgF1 | 0.1350 | 0.1350 | 0.1342 |

TABLE 1-continued

| | | | |
|---|---|---|---|
| θhg3 − θhg1 | 0.1841 | 0.1841 | 0.1831 |
| RC | −44.3924 | −41.8075 | −28.7172 |
| ΔzA (h) | 0 | 0 | 0 |
| ΔzD (h) | 0.01268 | 0.01197 | 0.04421 |
| (ΔzA (h) + ΔzD (h))/2 | 0.00634 | 0.00599 | 0.02211 |
| ΔzC (h) | 0.02346 | 0.02345 | 0.11576 |
| h | 6.289 | 6.288 | 7.156 |
| a | 2.516 | 2.515 | 2.862 |

| | Example 4 | Example 5 | Example 6 |
|---|---|---|---|
| fw (WE) | 5.034 | 5.031 | 5.033 |
| fs (ST) | 15.589 | 15.587 | 15.587 |
| ft (TE) | 48.550 | 48.555 | 48.558 |
| Half angle of field (WE) | 39.6° | 39.5° | 39.2° |
| Half angle of field (ST) | 13.3° | 13.2° | 13.2° |
| Half angle of field (TE) | 4.4° | 4.4° | 4.4° |
| Y | 9.644 | 9.651 | 9.648 |
| y10 | 3.83 | 3.83 | 3.83 |
| Φ1 | 0.0444 | 0.0456 | 0.0455 |
| Φ2 | 0.0018 | 0.0019 | 0.0016 |
| Φ3 | −0.0186 | −0.0200 | −0.0196 |
| Φ3/Φ1 | −0.419 | −0.439 | −0.431 |
| νd1 | 54.68 | 54.68 | 54.68 |
| nd1 | 1.72916 | 1.72916 | 1.72916 |
| θgF1 | 0.5442 | 0.5442 | 0.5442 |
| θhg1 | 0.4520 | 0.4520 | 0.4520 |
| νd2 | 51.81 | 51.81 | 51.81 |
| nd2 | 1.52540 | 1.52540 | 1.52540 |
| νd3 | 23.38 | 23.38 | 23.38 |
| nd3 | 1.63387 | 1.63387 | 1.63387 |
| b3 | 2.25812 | 2.25812 | 2.25812 |
| θgF3 | 0.6784 | 0.6784 | 0.6784 |
| βgF3 | 0.8107 | 0.8107 | 0.8107 |
| θhg3 | 0.6351 | 0.6351 | 0.6351 |
| βhg3 | 0.8301 | 0.8301 | 0.8301 |
| nd2 − nd3 | −0.10847 | −0.10847 | −0.10847 |
| (νd3)$^{-1}$ − (νd1)$^{-1}$ | 0.02448 | 0.02448 | 0.02448 |
| (νd3)$^{-1}$ − (νd2)$^{-1}$ | 0.02347 | 0.02347 | 0.02347 |
| θgF3 − θgF1 | 0.1342 | 0.1342 | 0.1342 |
| θhg3 − θhg1 | 0.1831 | 0.1831 | 0.1831 |
| RC | −28.3832 | −27.1910 | −27.9298 |
| ΔzA (h) | 0 | 0 | 0 |
| ΔzD (h) | 0.04486 | 0.05055 | 0.05106 |
| (ΔzA (h) + ΔzD (h))/2 | 0.02243 | 0.02528 | 0.02553 |
| ΔzC (h) | 0.12397 | 0.15165 | 0.15425 |
| h | 7.170 | 7.176 | 7.174 |
| a | 2.868 | 2.870 | 2.870 |

UV materials which could be used for the lens L3 is described in Table 2 as below.

Further, any one of material as below could be used for the lens located in center among the three cemented lens component

TABLE 2

| | UV material 1 | UV material 2 | UV material 3 |
|---|---|---|---|
| θgF3 | 0.6784 | 0.6307 | 0.6255 |
| βgF3 | 0.8107 | 0.7631 | 0.7579 |
| θhg3 | 0.6351 | 0.5825 | 0.5735 |
| βhg3 | 0.8301 | 0.7776 | 0.7686 |
| νd3 | 23.38 | 23.39 | 23.39 |
| nd3 | 1.63387 | 1.63408 | 1.63410 |
| b3 | 2.25812 | 2.25859 | 2.25861 |

| | UV material 4 | UV material 5 | UV material 6 |
|---|---|---|---|
| θgF3 | 0.6203 | 0.6103 | 0.5840 |
| βgF3 | 0.7527 | 0.7427 | 0.7164 |
| θhg3 | 0.5644 | 0.5486 | 0.5080 |
| βhg3 | 0.7595 | 0.7437 | 0.7032 |
| νd3 | 23.39 | 23.39 | 23.40 |
| nd3 | 1.63411 | 1.63419 | 1.63436 |
| b3 | 2.25862 | 2.25870 | 2.25914 |

θgF3-θgF1 of each example is shown in Table 3 as below when material of the lens L3 is changed as shown in table 2.

TABLE 3

| θgF3 − θgF1 | Example 1 | Example 2 | Example 3 |
|---|---|---|---|
| UV material 1 | 0.1350 | 0.1350 | 0.1342 |
| UV material 2 | 0.0873 | 0.0873 | 0.0865 |
| UV material 3 | 0.0821 | 0.0821 | 0.0813 |
| UV material 4 | 0.0769 | 0.0769 | 0.0761 |
| UV material 5 | 0.0669 | 0.0669 | 0.0661 |
| UV material 6 | 0.0406 | 0.0406 | 0.0398 |

θgF3-θgF1 of each example is shown in Table 4 as below when material of the lens L3 is changed as shown in table 2.

TABLE 4

| θgF3 − θgF1 | Example 4 | Example 5 | Example 6 |
|---|---|---|---|
| UV material 1 | 0.1342 | 0.1342 | 0.1342 |
| UV material 2 | 0.0865 | 0.0865 | 0.0865 |
| UV material 3 | 0.0813 | 0.0813 | 0.0813 |
| UV material 4 | 0.0761 | 0.0761 | 0.0761 |
| UV material 5 | 0.0661 | 0.0661 | 0.0661 |
| UV material 6 | 0.0398 | 0.0398 | 0.0398 |

Thus, it is possible to use such image forming optical system of the present invention in a photographic apparatus in which an image of an object is photographed by an electronic image pickup element such as a CCD and a CMOS, particularly a digital camera and a video camera, a personal computer, a telephone, and a portable terminal which are examples of an information processing unit, particularly a portable telephone which is easy to carry. Embodiments thereof will be exemplified below.

Figure 49:
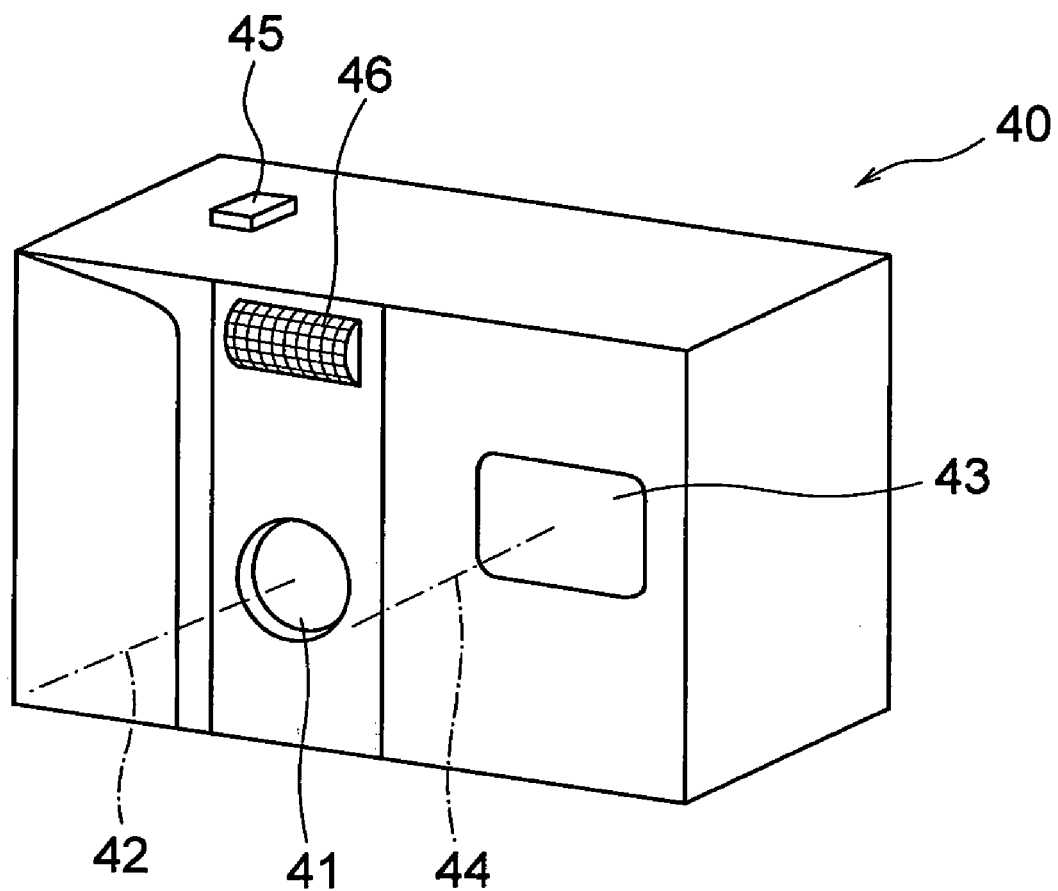
FIG. 49 is a front perspective view showing an appearance of a digital camera 40 in which, a zooming optical system according to the present invention is incorporated.
Figure 50:
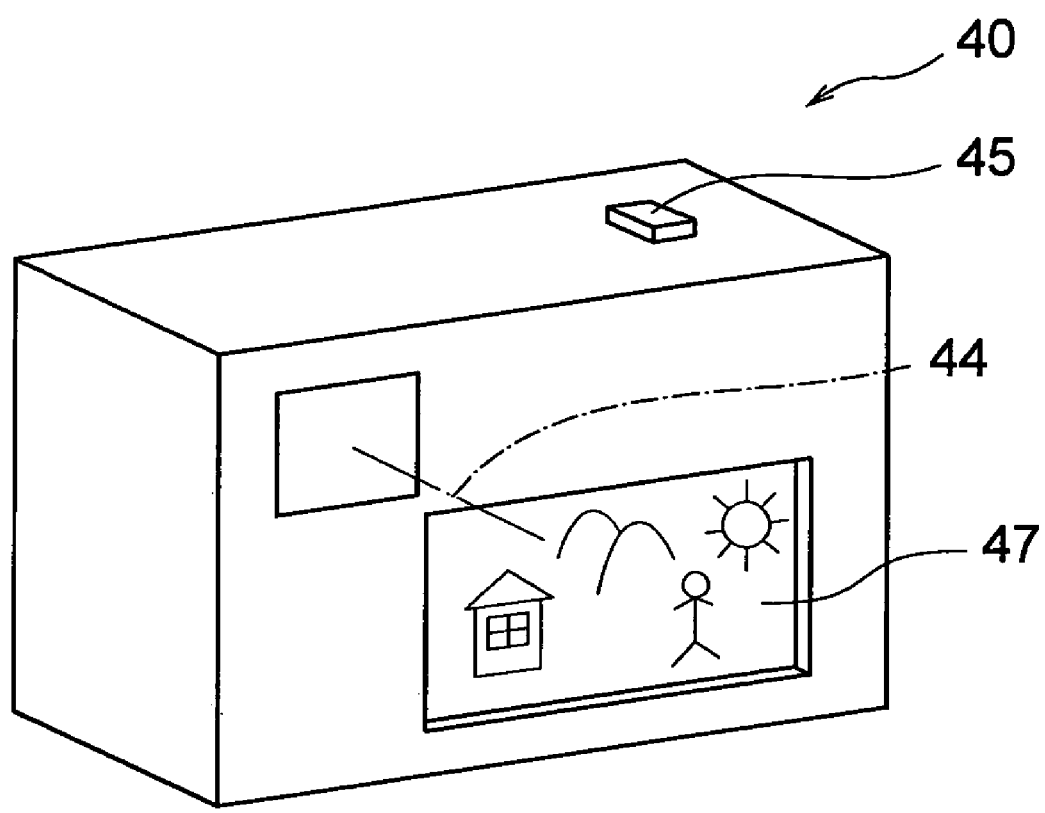
FIG. 50 is a rear perspective view of the digital camera 40.
Figure 51:
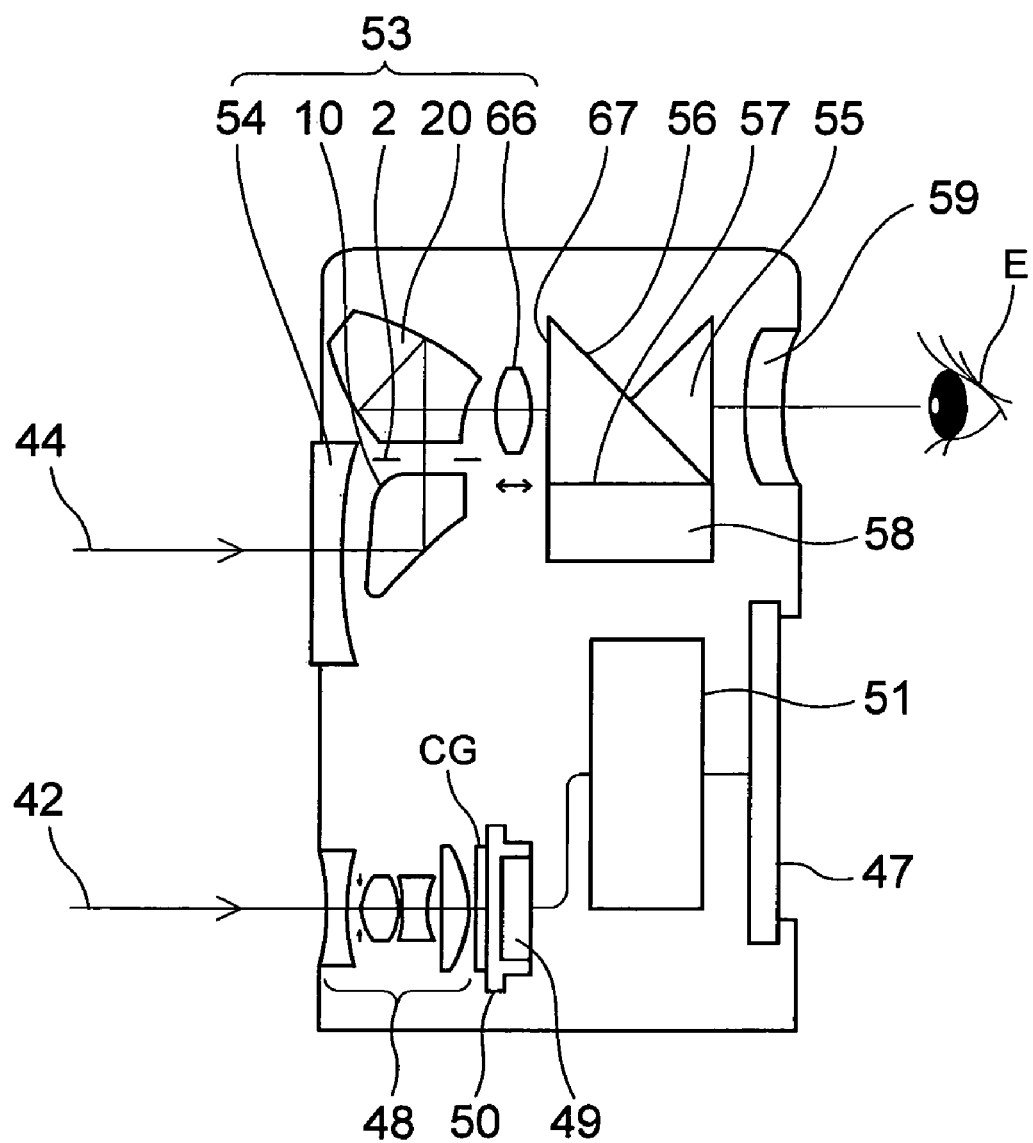
FIG. 51 is a cross-sectional view showing an optical arrangement of the digital camera 40.

In FIG. 49 to FIG. 51 show conceptual diagrams of structures in which the image forming optical system according to the present invention is incorporated in a photographic optical system 41 of a digital camera. FIG. 49 is a frontward perspective view showing an appearance of a digital camera 40, FIG. 50 is a rearward perspective view of the same, and FIG. 51 is a cross-sectional view showing an optical arrangement of the digital camera 40.

The digital camera 40, in a case of this example, includes the photographic optical system 41 (an objective optical system for photography 48) having an optical path for photography 42, a finder optical system 43 having an optical path for finder 44, a shutter 45, a flash 46, and a liquid-crystal display monitor 47. Moreover, when the shutter 45 disposed at an upper portion of the camera 40 is pressed, in conjugation with this, a photograph is taken through the photographic optical system 41 (objective optical system for photography 48) such as the zoom lens in the first embodiment.

An object image formed by the photographic optical system 41 (photographic objective optical system 48) is formed on an image pickup surface 50 of a CCD 49. The object image photoreceived at the CCD 49 is displayed on the liquid-crystal display monitor 47 which is provided on a camera rear surface as an electronic image, via an image processing means 51. Moreover, a memory etc. is disposed in the image processing means 51, and it is possible to record the electronic image photographed. This memory may be provided separately from the image processing means 51, or may be formed by carrying out by writing by recording (recorded writing) electronically by a floppy (registered trademark) disc, memory card, or an MO etc.

Furthermore, an objective optical system for finder 53 is disposed in the optical path for finder 44. This objective optical system for finder 53 includes a cover lens 54, a first prism 10, an aperture stop 2, a second prism 20, and a lens for focusing 66. An object image is formed on an image forming surface 67 by this objective optical system for finder 53. This object image is formed in a field frame of a Porro prism which is an image erecting member equipped with a first reflecting surface 56 and a second reflecting surface 58. On a rear side of this Porro prism, an eyepiece optical system 59 which guides an image formed as an erected normal image is disposed.

According to the digital camera 40 which has been structured in such manner, it is possible to realize an electronic image pickup apparatus which includes a zoom lens which is small-sized and slim, with a fewer number of photographic optical systems 41. The present invention, without being restricted to a digital camera of a collapsible type, is also applicable to a digital camera of bending type which uses a bending optical system.

Figure 52:
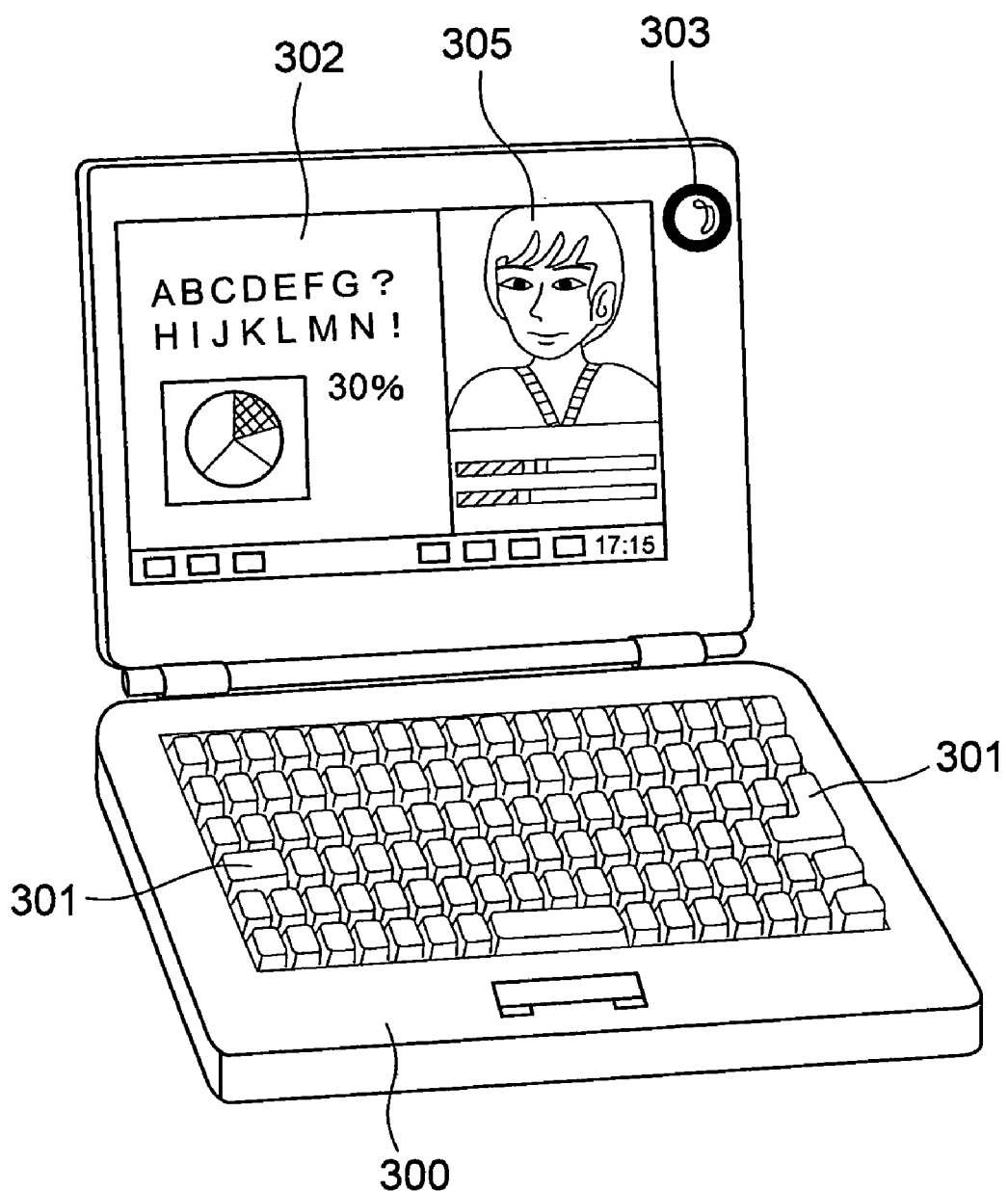
FIG. 52 is a front perspective view of a state in which, a cover of a personal computer 300 which is an example of an information processing apparatus in which, the zooming optical system of the present invention is built-in as an objective optical system, is opened.
Figure 53:
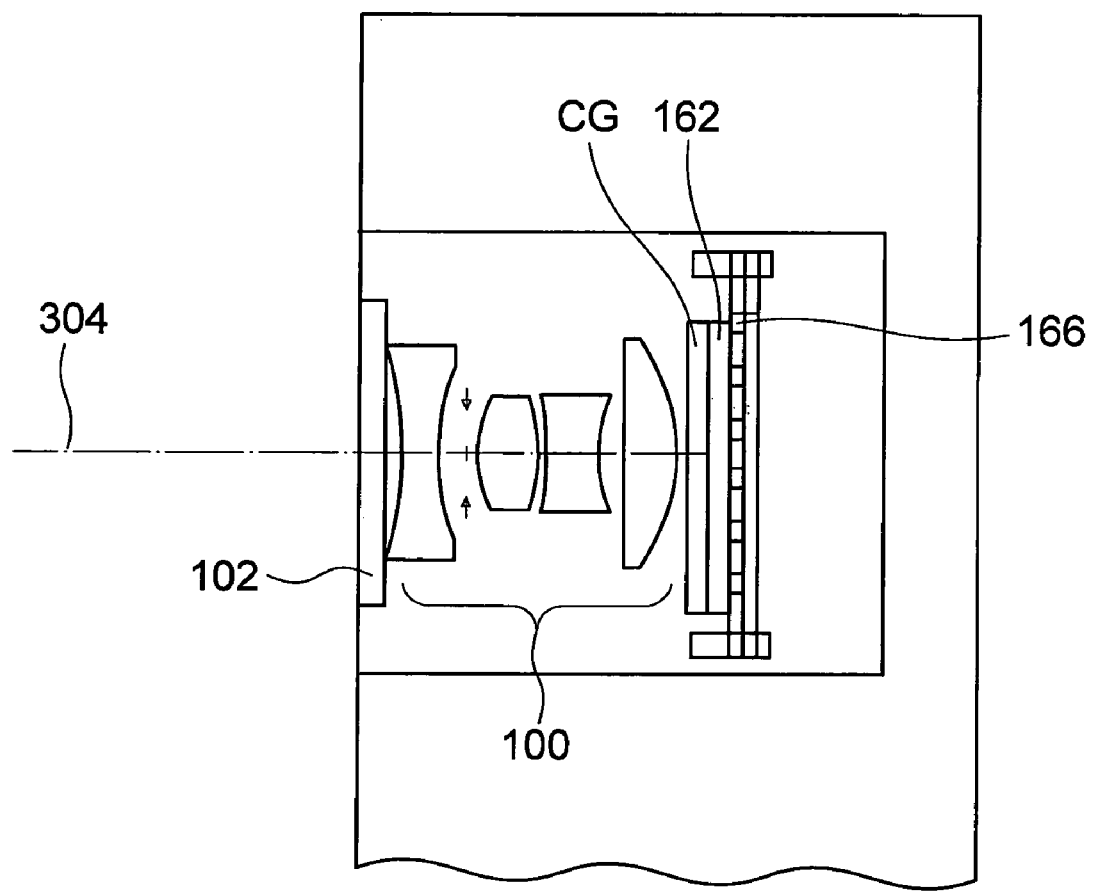
FIG. 53 is a cross-sectional view of a photographic optical system 303 of the personal computer 300.
Figure 54:
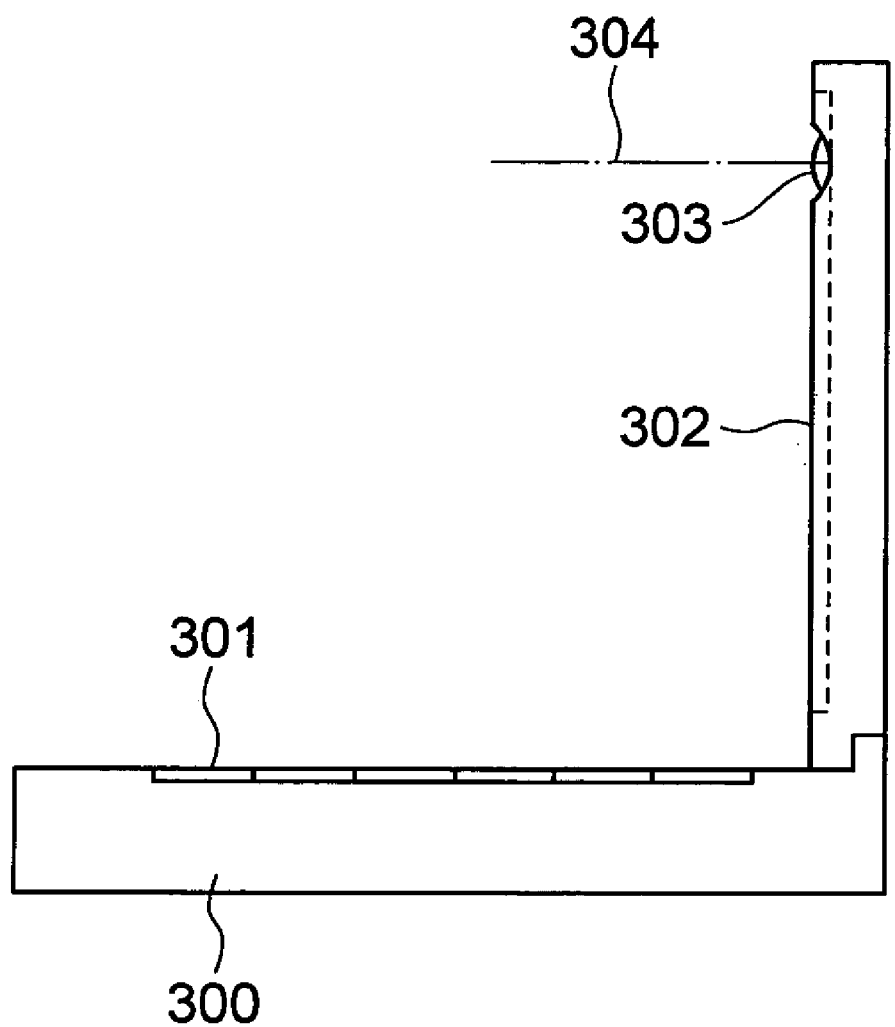
FIG. 54 is a side view of the personal computer 300.

Next, a personal computer which is an example of an information processing apparatus with a built-in image forming system as an objective optical system is shown in FIG. 52 to FIG. 54. FIG. 52 is a frontward perspective view of a personal computer 300 with its cover opened, FIG. 53 is a cross-sectional view of a photographic optical system 303 of the personal computer 300, and FIG. 54 is a side view of FIG. 52. As it is shown in FIG. 52 to FIG. 54, the personal computer 300 has a keyboard 301, an information processing means and a recording means, a monitor 302, and a photographic optical system 303.

Here, the keyboard 301 is for an operator to input information from an outside. The information processing means and the recording means are omitted in the diagram. The monitor 302 is for displaying the information to the operator. The photographic optical system 303 is for photographing an image of the operator or a surrounding. The monitor 302 may be a display such as a liquid-crystal display or a CRT display. As the liquid-crystal display, a transmission liquid-crystal display device which illuminates from a rear surface by a backlight not shown in the diagram, and a reflection liquid-crystal display device which displays by reflecting light from a front surface are available. Moreover, in the diagram, the photographic optical system 303 is built-in at a right side of the monitor 302, but without restricting to this location, the photographic optical system 303 may be anywhere around the monitor 302 and the keyboard 301.

This photographic optical system 303 has an objective optical system 100 which includes the zoom lens in the first embodiment for example, and an electronic image pickup element chip 162 which receives an image. These are built into the personal computer 300.

At a front end of a mirror frame, a cover glass 102 for protecting the objective optical system 100 is disposed.

An object image received at the electronic image pickup element chip 162 is input to a processing means of the personal computer 300 via a terminal 166. Further, the object image is displayed as an electronic image on the monitor 302. In FIG. 52, an image 305 photographed by the user is displayed as an example of the electronic image. Moreover, it is also possible to display the image 305 on a personal computer of a communication counterpart from a remote location via a processing means. For transmitting the image to the remote location, the Internet and telephone are used.

Figure 55A:
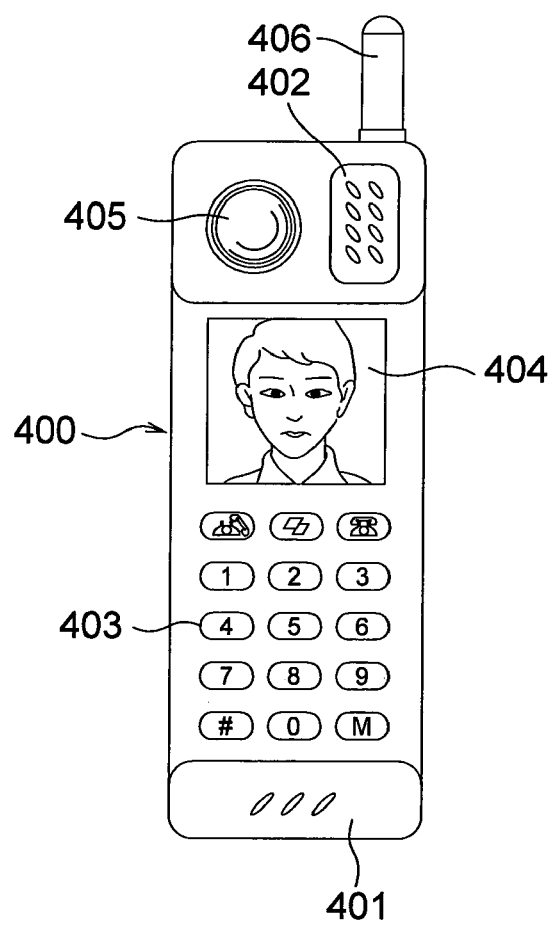
FIG. 55A, FIG. 55B, and FIG. 55C are diagrams showing a mobile telephone which is an example of the information processing apparatus in which, the zooming optical system of the present invention is built-in as a photographic optical system, where.
Figure 55B:
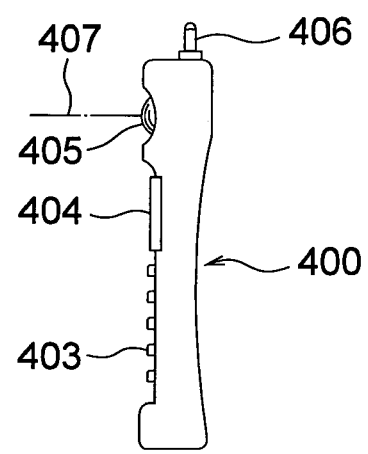
Figure 55C:
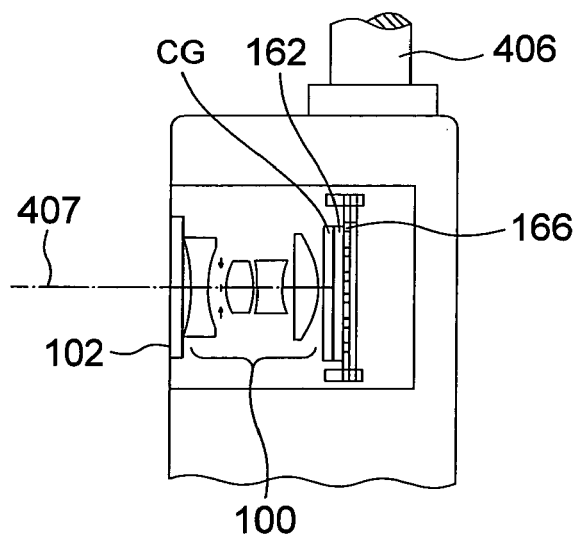

Next, a telephone which is an example of an information processing apparatus in which the image forming optical system of the present invention is built-in as a photographic optical system, particularly a portable telephone which is easy to carry is shown in FIG. 55A, FIG. 55B, and FIG. 55C. FIG. 55A is a front view of a portable telephone 400, FIG. 55B is a side view of the portable telephone 400, and FIG. 55C is a cross-sectional view of a photographic optical system 405. As shown in FIG. 55A to FIG. 55C, the portable telephone 400 includes a microphone section 401, a speaker section 402, an input dial 403, a monitor 404, the photographic optical system 405, an antenna 406, and a processing means.

Here, the microphone section 401 is for inputting a voice of the operator as information. The speaker section 402 is for outputting a voice of the communication counterpart. The input dial 403 is for the operator to input information. The monitor 404 is for displaying a photographic image of the operator himself and the communication counterpart, and information such as a telephone number. The antenna 406 is for carrying out a transmission and a reception of communication electric waves. The processing means (not shown in the diagram) is for carrying out processing of image information, communication information, and input signal etc.

Here, the monitor 404 is a liquid-crystal display device. Moreover, in the diagram, a position of disposing each structural element is not restricted in particular to a position in the diagram. This photographic optical system 405 has an objective optical system 100 which is disposed in a photographic optical path 407 and an image pickup element chip 162 which receives an object image. As the objective optical system 100, the zoom lens in the first embodiment for example, is used. These are built into the portable telephone 400.

At a front end of a mirror frame, a cover glass 102 for protecting the objective optical system 100 is disposed.

An object image received at the electronic image pickup element chip 162 is input to an image processing means which is not shown in the diagram, via a terminal 166. Further, the object image finally displayed as an electronic image on the monitor 404 or a monitor of the communication counterpart, or both. Moreover, a signal processing function is included in the processing means. In a case of transmitting an image to the communication counterpart, according to this function, information of the object image received at the electronic image pickup element chip 162 is converted to a signal which can be transmitted.

Various modifications can be made to the present invention without departing from its essence.

What is claimed is:

1. An image forming optical system comprising:
   a lens component which comprises a lens L1 which is made of a transparent material having Abbe's number vd1, an intermediate layer L2 which is made of a transparent material having Abbe's number vd2, and a lens L3 which is made of a transparent material having Abbe's number vd3, wherein
   the intermediate layer L2 is in a close contact with an optical surface B of the lens L1, and
   a shape of an optical surface C of the intermediate layer L2 is an aspheric shape, and
   the lens L3 is in a close contact with the optical surface C, and the image forming optical system satisfies the following conditions $$0.012 < 1/vd3 - 1/vd1 < 0.090 \quad (1)$$

$$0.010 < 1/vd3 - 1/vd2 \quad (2)$$

$$1.65 < nd1 \quad (4)$$

where,
vd1 denotes Abbe's number $(nd1-1)/(nF1-nC1)$ of the lens L1,
vd2 denotes Abbe's number $(nd2-1)/(nF2-nC2)$ of the intermediate layer L2, and vd3 denotes Abbe's number $(nd3-1)/(nF3-nC3)$ of the lens L3, where, nd1, nC1, and nF1 denote refractive indices of the lens L1 for a d-line, a C-line, and an F-line respectively, nd2, nC2, and nF2 denote refractive indices of the intermediate layer L2 for the d-line, the C-line, and the F-line respectively, and nd3, nC3, and nF3 denote refractive indices of the lens L3 for the d-line, the C-line, and the F-line respectively;

wherein in a rectangular coordinate system with a horizontal axis let to be vd3 and a vertical axis let to be θgF3, when a straight line expressed by θgF3=α3×vd3+βgF3 (provided that α3=−0.00566) is set, an area which is determined by a straight line when it is a lower limit value of a range of the following conditional expression (7) and a straight line when it is an upper limit value of the range of the following conditional expression (7), and an area determined by the following conditional expression (9) include θgF3 and vd3 of the lens L3, in a rectangular coordinate system with a horizontal axis let to be vd3 and a vertical axis let to be nd3, when a straight line expressed by nd3=a3×vd3+b3 (provided that a3=—0.0267) is set, an area which is determined by a straight line when it is a lower limit value of a range of the following conditional expression (8) and a straight line when it is an upper limit value of the range of the following conditional expression (8), and an area determined by the following conditional expression (9) include nd3 and vd3 of the lens L3

$$0.6520 < \beta gF3 < 0.8150 \qquad (7)$$

$$2.0 < b3 < 2.4 \text{ (provided that nd3>1.3)} \qquad (8)$$

$$10 < vd3 < 35 \qquad (9)$$

where,

θgF3 denotes a partial dispersion ratio $(ng3-nF3)/(nF3-nC3)$ of the lens L3, vd3 denotes Abbe's number $(nd3-1)/(nF3-nC3)$ of the lens L3, and nd3, nC3, nF3, and ng3 denote refractive indices of the lens L3 for the d-line, the C-line, the F-line, and the g-line respectively.

2. The image forming optical system according to claim 1, wherein the optical surface C is a refractive surface.

3. The image forming optical system according to claim 1, wherein the optical surface B is a refractive surface.

4. The image forming optical system according to claim 1, wherein the image forming optical system satisfies the following condition $$|nd2-nd3| < 0.27 \qquad (3)$$

where, nd2 and nd3 denote refractive indices for the d-line of the intermediate layer L2 and the lens L3 respectively.

5. The image forming optical system according to claim 1, wherein the lens L1 has an optical surface A, and both the optical surface B and the optical surface A are spherical surfaces.

6. The image forming optical system according to claim 1, wherein the lens L1 has the optical surface A, and the lens L3 has an optical surface D, and both the optical surface A and the optical surface D are surfaces in contact with air.

7. The image forming optical system according to claim 1, wherein in a rectangular coordinate system with a horizontal axis let to be vd3 and a vertical axis let to be θhg3, other than the rectangular coordinates, when a straight line expressed by θhg3=αhg3×vd3+βhg3 (provided that αhg3=−0.00834) is set, an area which is determined by a straight line when it is a lower limit value of a range of the following conditional expression (10) and a straight line when it is an upper limit value of the range of the following conditional expression (10), and an area determined by the following conditional expression (9) include θgF3 and vd3 of the lens L3, in a rectangular coordinate system with a horizontal axis let to be vd3 and a vertical axis let to be nd3, when a straight line expressed by nd3=a3×vd3+b3 (provided that a3=−0.0267) is set, an area which is determined by a straight line when it is a lower limit value of a range of the following conditional expression (8) and a straight line when it is an upper limit value of the range of the following conditional expression (8), and an area determined by the following conditional expression (9) include nd3 and vd3 of the lens L3, $$0.6000 < \beta hg3 < 0.8320 \qquad (10)$$

$$2.0 < b3 < 2.4 \text{ (provided that nd3>1.3)} \qquad (8)$$

$$10 < vd3 < 35 \qquad (9)$$

where,

θhg3 denotes a partial dispersion ratio $(nh3-ng3)/(nF3-nC3)$ of the lens L3, and nh3 denotes a refractive index of the lens L3 for an h-line.

8. The image forming optical system according to claim 1, wherein when a lens having a negative value for a paraxial focal length is let to be a negative lens, the lens L3 is a negative lens.

9. The image forming optical system according to claim 1, wherein when a lens having a positive value for a paraxial focal length is let to be a positive lens, the lens L1 is a positive lens.

10. An image forming optical system comprising:

a lens component which comprises a lens L1 which is made of a transparent material having Abbe's number vd1, an intermediate layer L2 which is made of a transparent material having Abbe's number vd2, and a lens L3 which is made of a transparent material having Abbe's number vd3, wherein the intermediate layer L2 is in a close contact with an optical surface B of the lens L1, and a shape of an optical surface C of the intermediate layer L2 is an aspheric shape, and the lens L3 is in a close contact with the optical surface C, and the image forming optical system satisfies the following conditions $$0.012 < 1/vd3 - 1/vd1 < 0.090 \qquad (1)$$

$$0.010 < 1/vd3 - 1/vd2 \qquad (2)$$

$$1.65 < nd1 \qquad (4)$$

where, vd1 denotes Abbe's number $(nd1-1)/(nF1-nC1)$ of the lens L1, vd2 denotes Abbe's number (nd2−1)/(nF2−nC2) of the intermediate layer L2, and
vd3 denotes Abbe's number (nd3−1)/(nF3−nC3) of the lens L3,
where,
nd1, nC1, and nF1 denote refractive indices of the lens L1 for a d-line, a C-line, and an F-line respectively,
nd2, nC2, and nF2 denote refractive indices of the intermediate layer L2 for the d-line, the C-line, and the F-line respectively, and
nd3, nC3, and nF3 denote refractive indices of the lens L3 for the d-line, the C-line, and the F-line respectively,
wherein the image forming optical system satisfies the following condition $$-0.70 < \phi 3/\phi 1 < -0.10 \quad (5)$$

$$|\phi 1| > |\phi 3| > |\phi 2| \quad (6)$$

where,
$\phi 1$ denotes a refractive power in air, of the lens L1,
$\phi 2$ denotes a refractive power in air, of the intermediate layer L2, and
$\phi 3$ denotes a refractive power in air, of the lens L3.

11. An image forming optical system comprising:
a lens component which comprises a lens L1 which is made of a transparent material having Abbe's number vd1, an intermediate layer L2 which is made of a transparent material having Abbe's number vd2, and a lens L3 which is made of a transparent material having Abbe's number vd3, wherein
the intermediate layer L2 is in a close contact with an optical surface B of the lens L1, and
a shape of an optical surface C of the intermediate layer L2 is an aspheric shape, and
the lens L3 is in a close contact with the optical surface C, and
the image forming optical system satisfies the following conditions $$0.012 < 1/vd3 - 1/vd1 < 0.090 \quad (1)$$

$$0.010 < 1/vd3 - 1/vd2 \quad (2)$$

$$1.65 < nd1 \quad (4)$$

where,
vd1 denotes Abbe's number (nd1−1)/(nF1−nC1) of the lens L1,
vd2 denotes Abbe's number (nd2−1)/(nF2−nC2) of the intermediate layer L2, and
vd3 denotes Abbe's number (nd3−1)/(nF3−nC3) of the lens L3,
where,
nd1, nC1, and nF1 denote refractive indices of the lens L1 for a d-line, a C-line, and an F-line respectively,
nd2, nC2, and nF2 denote refractive indices of the intermediate layer L2 for the d-line, the C-line, and the F-line respectively, and
nd3, nC3, and nF3 denote refractive indices of the lens L3 for the d-line, the C-line, and the F-line respectively,
wherein the intermediate layer L2 is made of an energy curable resin, and a thickness on an optical axis, of the intermediate layer L2 is in a range of 0.03 mm to 2.00 mm.

12. An image forming optical system comprising:
a lens component which comprises a lens L1 which is made of a transparent material having Abbe's number vd1, an intermediate layer L2 which is made of a transparent material having Abbe's number vd2, and a lens L3 which is made of a transparent material having Abbe's number vd3, wherein
the intermediate layer L2 is in a close contact with an optical surface B of the lens L1, and
a shape of an optical surface C of the intermediate layer L2 is an aspheric shape, and
the lens L3 is in a close contact with the optical surface C, and
the image forming optical system satisfies the following conditions $$0.012 < 1/vd3 - 1/vd1 < 0.090 \quad (1)$$

$$0.010 < 1/vd3 - 1/vd2 \quad (2)$$

$$1.65 < nd1 \quad (4)$$

where,
vd1 denotes Abbe's number (nd1−1)/(nF1−nC1) of the lens L1,
vd2 denotes Abbe's number (nd2−1)/(nF2−nC2) of the intermediate layer L2, and
vd3 denotes Abbe's number (nd3−1)/(nF3−nC3) of the lens L3,
where,
nd1, nC1, and nF1 denote refractive indices of the lens L1 for a d-line, a C-line, and an F-line respectively,
nd2, nC2, and nF2 denote refractive indices of the intermediate layer L2 for the d-line, the C-line, and the F-line respectively, and
nd3, nC3, and nF3 denote refractive indices of the lens L3 for the d-line, the C-line, and the F-line respectively,
wherein the lens L3 is made of an energy curable resin, and a thickness on the optical axis, of the lens L3 is in a range of 0.03 mm to 2.00 mm.

13. An image forming optical system comprising:
a lens component which comprises a lens L1 which is made of a transparent material having Abbe's number vd1, an intermediate layer L2 which is made of a transparent material having Abbe's number vd2, and a lens L3 which is made of a transparent material having Abbe's number vd3, wherein
the intermediate layer L2 is in a close contact with an optical surface B of the lens L1, and
a shape of an optical surface C of the intermediate layer L2 is an aspheric shape, and
the lens L3 is in a close contact with the optical surface C, and
the image forming optical system satisfies the following conditions $$0.012 < 1/vd3 - 1/vd1 < 0.090 \quad (1)$$

$$0.010 < 1/vd3 - 1/vd2 \quad (2)$$

$$1.65 < nd1 \quad (4)$$

where,
vd1 denotes Abbe's number (nd1−1)/(nF1−nC1) of the lens L1,
vd2 denotes Abbe's number (nd2−1)/(nF2−nC2) of the intermediate layer L2, and
vd3 denotes Abbe's number (nd3−1)/(nF3−nC3) of the lens L3,
where,
nd1, nC1, and nF1 denote refractive indices of the lens L1 for a d-line, a C-line, and an F-line respectively, nd2, nC2, and nF2 denote refractive indices of the intermediate layer L2 for the d-line, the C-line, and the F-line respectively, and nd3, nC3, and nF3 denote refractive indices of the lens L3 for the d-line, the C-line, and the F-line respectively, wherein the image forming optical system satisfies the following condition $$-0.0700 \leq \theta gF3 - \theta gF1 \leq 0.1500 \quad (11)$$

where, $\theta gF1$ denotes a partial dispersion ratio $(ng1-nF1)/(nF1-nC1)$ of the lens L1, $\theta gF3$ denotes a partial dispersion ratio $(ng3-nF3)/(nF3-nC3)$ of the lens L3, where, nd1, nC1, nF1, and ng1 denote refractive indices of the lens L1 for the d-line, the C-line, the F-line, and the g-line respectively.

14. The image forming optical system according to claim 13, wherein the image forming optical system satisfies the following condition $$-0.1000 \leq \theta hg3 - \theta hg1 \leq 0.2000 \quad (12)$$

where, $\theta hg1$ denotes a partial dispersion ratio $(nh1-ng1)/(nF1-nC1)$ of the lens L1, $\theta hg3$ denotes a partial dispersion ratio $(nh3-ng3)/(nF3-nC3)$ of the lens L3, where, nh1 denotes a refractive index of the lens L1 for the h-line.

15. An image forming optical system comprising:

a lens component which comprises a lens L1 which is made of a transparent material having Abbe's number vd1, an intermediate layer L2 which is made of a transparent material having Abbe's number vd2, and a lens L3 which is made of a transparent material having Abbe's number vd3, wherein the intermediate layer L2 is in a close contact with an optical surface B of the lens L1, and a shape of an optical surface C of the intermediate layer L2 is an aspheric shape, and the lens L3 is in a close contact with the optical surface C, and the image forming optical system satisfies the following conditions $$0.012 < 1/vd3 - 1/vd1 < 0.090 \quad (1)$$

$$0.010 < 1/vd3 - 1/vd2 \quad (2)$$

$$1.65 < nd1 \quad (4)$$

where, vd1 denotes Abbe's number $(nd1-1)/(nF1-nC1)$ of the lens L1, vd2 denotes Abbe's number $(nd2-1)/(nF2-nC2)$ of the intermediate layer L2, and vd3 denotes Abbe's number $(nd3-1)/(nF3-nC3)$ of the lens L3, where, nd1, nC1, and nF1 denote refractive indices of the lens L1 for a d-line, a C-line, and an F-line respectively, nd2, nC2, and nF2 denote refractive indices of the intermediate layer L2 for the d-line, the C-line, and the F-line respectively, and nd3, nC3, and nF3 denote refractive indices of the lens L3 for the d-line, the C-line, and the F-line respectively, wherein the lens component has a combined positive refractive power.

16. An image forming optical system comprising:

a lens component which comprises a lens L1 which is made of a transparent material having Abbe's number vd1, an intermediate layer L2 which is made of a transparent material having Abbe's number vd2, and a lens L3 which is made of a transparent material having Abbe's number vd3, wherein the intermediate layer L2 is in a close contact with an optical surface B of the lens L1, and a shape of an optical surface C of the intermediate layer L2 is an aspheric shape, and the lens L3 is in a close contact with the optical surface C, and the image forming optical system satisfies the following conditions $$0.012 < 1/vd3 - 1/vd1 < 0.090 \quad (1)$$

$$0.010 < 1/vd3 - 1/vd2 \quad (2)$$

$$1.65 < nd1 \quad (4)$$

where, vd1 denotes Abbe's number $(nd1-1)/(nF1-nC1)$ of the lens L1, vd2 denotes Abbe's number $(nd2-1)/(nF2-nC2)$ of the intermediate layer L2, and vd3 denotes Abbe's number $(nd3-1)/(nF3-nC3)$ of the lens L3, where, nd1, nC1, and nF1 denote refractive indices of the lens L1 for a d-line, a C-line, and an F-line respectively, nd2, nC2, and nF2 denote refractive indices of the intermediate layer L2 for the d-line, the C-line, and the F-line respectively, and nd3, nC3, and nF3 denote refractive indices of the lens L3 for the d-line, the C-line, and the F-line respectively, wherein the image forming optical system is a zooming optical system, and the zooming optical system, in order from an object side, comprises a first lens group having a positive refractive power, a second lens group having a negative refractive power, and a rear group having a positive refractive power, and the rear group comprises a plurality of lens groups of which, relative distances are variable at the time of zooming, and relative distances between the first lens group, the second lens group, and the rear group are variable at the time of zooming, and the lens component is used in the first lens group.

17. The image forming optical system according to claim 16, wherein the second lens group, in order from the object side, comprises a negative lens component, and a lens component in which, three lenses are cemented, and a lens at a center of the three lenses satisfies conditional expressions (7), (8), and (9).

18. The image forming optical system according to claim 16, wherein the rear group comprises two positive lens groups.

19. The image forming optical system according to claim 18, wherein among the two positive lens groups, the lens group on the object side comprises one positive lens component and one negative lens component, and the negative lens component has three lenses which are cemented, and the negative lens component includes a positive lens nearest to the object side, a lens at the center, and a negative lens nearest to the image side, and the lens at the center satisfies conditional expressions (7), (8), and (9).

20. The image forming optical system according to claim 16, wherein the first lens group comprises only the lens component.

21. The image forming optical system according to claim 20, wherein a lens nearest to the object side, in the lens component is the lens L1.

22. The image forming optical system according to claim 21, wherein each of a shape of the optical surface B and a shape of the optical surface C is a shape having a convex surface directed toward an image side.

23. An image forming optical system comprising:

a lens component which comprises a lens L1 which is made of a transparent material having Abbe's number vd1, an intermediate layer L2 which is made of a transparent material having Abbe's number vd2, and a lens L3 which is made of a transparent material having Abbe's number vd3, wherein the intermediate layer L2 is in a close contact with an optical surface B of the lens L1, and a shape of an optical surface C of the intermediate layer L2 is an aspheric shape, and the lens L3 is in a close contact with the optical surface C, and the image forming optical system satisfies the following conditions $$0.012 < 1/vd3 - 1/vd1 < 0.090 \quad (1)$$

$$0.010 < 1/vd3 - 1/vd2 \quad (2)$$

$$1.65 < nd1 \quad (4)$$

where, vd1 denotes Abbe's number $(nd1-1)/(nF1-nC1)$ of the lens L1, vd2 denotes Abbe's number $(nd2-1)/(nF2-nC2)$ of the intermediate layer L2, and vd3 denotes Abbe's number $(nd3-1)/(nF3-nC3)$ of the lens L3, where, nd1, nC1, and nF1 denote refractive indices of the lens L1 for a d-line, a C-line, and an F-line respectively, nd2, nC2, and nF2 denote refractive indices of the intermediate layer L2 for the d-line, the C-line, and the F-line respectively, and nd3, nC3, and nF3 denote refractive indices of the lens L3 for the d-line, the C-line, and the F-line respectively, wherein the lens L1 has the optical surface A, and the lens L3 has an optical surface D, and both the optical surface A and the optical surface D are surfaces in contact with air, wherein when coordinate axes are let to be such that, an optical axial direction is z, and a direction perpendicular to the optical axis is h, R is let to be a radius of curvature on an optical axis, of a spherical surface component, k is let to be a conical constant, and $A_4, A_6, A_8, A_{10}, \ldots$ are let to be aspherical coefficients, and when a shape of the aspheric surface is expressed by the following expression (13)

$$z = h^2/R[1+\{1-(1+k)h^2/R^2\}^{1/2}] + A_4 h^4 + A_6 h^6 + A_8 h^8 + A_{10} h^{10} + \quad (13), \text{ and}$$

when an amount of deviation is expressed by the following expression (14)

$$\Delta z = z - h^2/R[1+\{1-h^2/R^2\}^{1/2}] \quad (14)$$

the image forming optical system satisfies the following conditional expression (15)

$$(\Delta z_A(h) + \Delta z_D(h))/2 \leq \Delta z_c(h) \leq 10 \cdot (\Delta z_A(h) + \Delta z_D(h))/2$$
$$\text{(provided that } h = 2.5a) \quad (15)$$

where, $z_A$ is a shape of the optical surface A, which is according to expression (13), $z_D$ is a shape of the optical surface D, which is according to expression (13), and $z_C$ is a shape of the optical surface C, which is according to expression (13), and $\Delta z_A$ denotes an amount of deviation at the optical surface A, which is an amount according to expression (14), $\Delta z_D$ denotes an amount of deviation at the optical surface D, which is an amount according to expression (14), $\Delta z_C$ denotes an amount of deviation at the optical surface C, which is an amount according to expression (14), $R_C$ is a paraxial radius of curvature of the optical surface $C(\leq 0)$, a is an amount according to the following conditional expression (16)

$$a = (y_{10})^2 \cdot \log_{10} \gamma/fw \quad (16)$$

and moreover in expression (16), $y_{10}$ is the maximum image height, fw is a focal length of the overall image forming optical system at a wide angle end, γ is a zooming ratio in the image forming optical system (a focal length of the overall image forming optical system at a telephoto end/a focal length of the overall image forming optical system at the wide angle end), and moreover, for letting an apex of each surface to be an origin point, z(0)=0 all the time.

24. An electronic image pickup apparatus comprising:

an image forming optical system comprising;

a lens component which comprises a lens L1 which is made of a transparent material having Abbe's number vd1, an intermediate layer L2 which is made of a transparent material having Abbe's number vd2, and a lens L3 which is made of a transparent material having Abbe's number vd3, wherein the intermediate layer L2 is in a close contact with an optical surface B of the lens L1, and a shape of an optical surface C of the intermediate layer L2 is an aspheric shape, and the lens L3 is in a close contact with the optical surface C, and the image forming optical system satisfies the following conditions $$0.012 < 1/vd3 - 1/vd1 < 0.090 \quad (1)$$

$$0.010 < 1/vd3 - 1/vd2 \quad (2)$$

$$1.65 < nd1 \quad (4)$$

where, vd1 denotes Abbe's number $(nd1-1)/(nF1-nC1)$ of the lens L1, vd2 denotes Abbe's number (nd2−1)/(nF2−nC2) of the intermediate layer L2, and vd3 denotes Abbe's number (nd3−1)/(nF3−nC3) of the lens L3, where, nd1, nC1, and nF1 denote refractive indices of the lens L1 for a d-line, a C-line, and an F-line respectively, nd2, nC2, and nF2 denote refractive indices of the intermediate layer L2 for the d-line, the C-line, and the F-line respectively, and nd3, nC3, and nF3 denote refractive indices of the lens L3 for the d-line, the C-line, and the F-line respectively, an electronic image pickup element; and an image processing unit which processes image data which has been obtained by picking up an image formed by the image forming optical system by the electronic image pickup element, and outputs as image data in which, a shape of the image has been changed, wherein the image forming optical system is a zoom lens, and the zoom lens satisfies the following conditional expression (16) at the time of infinite object point focusing, $$0.7 < y_{07}/(fw \cdot \tan \omega_{07w}) < 0.97 \qquad (16)$$

where, $y_{07}$ is expressed as $y_{07}=0.7 \cdot y_{10}$, when a distance (the maximum image height) from a center up to the farthest point on an effective image pickup surface (on a surface on which an image can be picked up) of the electronic image pickup element is let to be $y_{10}$, $\omega_{07w}$ is an angle with respect to an optical axis in an object-point direction corresponding to an image point from a center on the image pickup surface up to a position of $y_{07}$, at a wide angle end, and fw is a focal length of the overall image forming zoom lens system at the wide angle end.

25. An image forming optical system comprising:

a lens component which comprises a lens L1 which is made of a transparent material having Abbe's number vd1, an intermediate layer L2 which is made of a transparent material having Abbe's number vd2, and a lens L3 which is made of a transparent material having Abbe's number vd3, wherein the intermediate layer L2 is in a close contact with an optical surface B of the lens L1, a shape of an optical surface C of the intermediate layer L2 is an aspheric shape, and the lens L3 is in a close contact with the optical surface C, the lens L1 has the optical surface A, and the lens L3 has an optical surface D, and both the optical surface A and the optical surface D are surfaces in contact with air, when coordinate axes are let to be such that, an optical axial direction is z, and a direction perpendicular to the optical axis is h, R is let to be a radius of curvature on an optical axis, of a spherical surface component, k is let to be a conical constant, and $A_4, A_6, A_8, A_{10}, \ldots$ are let to be aspherical coefficients, and when a shape of the aspheric surface is expressed by the following expression (13)

$$z = h^2/R[1+\{1-(1+k)h^2/R^2\}^{1/2}] + A_4 h^4 + A_6 h^6 + A_8 h^8 + A_{10} h^{10} + \qquad (13), \text{ and}$$

when an amount of deviation is expressed by the following expression (14)

$$\Delta z = z - h^2/R[1+\{1-h^2/R^2\}^{1/2}] \qquad (14)$$

the image forming optical system satisfies the following conditions (1), (2) and (15), $$0.012 < 1/vd3 - 1/vd1 < 0.090 \qquad (1)$$

$$0.010 < 1/vd3 - 1/vd2 \qquad (2)$$

$$(\Delta z_A(h)+\Delta z_D(h))/2 \leq \Delta z_C(h) \leq 10 \cdot (\Delta z_A(h)+\Delta z_D(h))/2$$
$$(\text{provided that } h=2.5a) \qquad (15)$$

where, vd1 denotes Abbe's number (nd1−1)/(nF1−nC1) of the lens L1, vd2 denotes Abbe's number (nd2−1)/(nF2−nC2) of the intermediate layer L2, and vd3 denotes Abbe's number (nd3−1)/(nF3−nC3) of the lens L3, where, nd1, nC1, and nF1 denote refractive indices of the lens L1 for a d-line, a C-line, and an F-line respectively, nd2, nC2, and nF2 denote refractive indices of the intermediate layer L2 for the d-line, the C-line, and the F-line respectively, and nd3, nC3, and nF3 denote refractive indices of the lens L3 for the d-line, the C-line, and the F-line respectively, $z_A$ is a shape of the optical surface A, which is according to expression (13), $z_D$ is a shape of the optical surface D, which is according to expression (13), and $z_C$ is a shape of the optical surface C, which is according to expression (13), and $\Delta z_A$ denotes an amount of deviation at the optical surface A, which is an amount according to expression (14), $\Delta z_D$ denotes an amount of deviation at the optical surface D, which is an amount according to expression (14), $\Delta z_C$ denotes an amount of deviation at the optical surface C, which is an amount according to expression (14), $R_C$ is a paraxial radius of curvature of the optical surface $C (\leq 0)$, a is an amount according to the following conditional expression (16)

$$a = (y_{10})^2 \cdot \log_{10} \gamma / fw \qquad (16)$$

and moreover in expression (16), $y_{10}$ is the maximum image height, fw is a focal length of the overall image forming optical system at a wide angle end, γ is a zooming ratio in the image forming optical system (a focal length of the overall image forming optical system at a telephoto end/a focal length of the overall image forming optical system at the wide angle end), and moreover, for letting an apex of each surface to be an origin point, z(0)=0 all the time.

26. An image forming optical system comprising:

a lens component which comprises a lens L1 which is made of a transparent material having Abbe's number vd1, an intermediate layer L2 which is made of a transparent material having Abbe's number vd2, and a lens L3 which is made of a transparent material having Abbe's number vd3, wherein the intermediate layer L2 is in a close contact with an optical surface B of the lens L1, and a shape of an optical surface C of the intermediate layer L2 is an aspheric shape, and the lens L3 is in a close contact with the optical surface C, and the image forming optical system satisfies the following conditions (1) and (2), further in a rectangular coordinate system with a horizontal axis let to be vd3 and a vertical axis let to be θgF3, when a straight line expressed by θgF3=α3×vd3+βgF3 (provided that α3=−0.00566) is set, an area which is determined by a straight line when it is a lower limit value of a range of the following conditional expression (7) and a straight line when it is an upper limit value of the range of the following conditional expression (7), and an area determined by the following conditional expression (9) include θgF3 and vd3 of the lens L3, in a rectangular coordinate system with a horizontal axis let to be vd3 and a vertical axis let to be nd3, when a straight line expressed by nd3=a3×vd3+b3 (provided that a3=−0.0267) is set, an area which is determined by a straight line when it is a lower limit value of a range of the following conditional expression (8) and a straight line when it is an upper limit value of the range of the following conditional expression (8), and an area determined by the following conditional expression (9) include nd3 and vd3 of the lens L3, $$0.012 < 1/vd3 - 1/vd1 < 0.090 \quad (1)$$

$$0.010 < 1/vd3 - 1/vd2 \quad (2)$$

$$0.6520 < \beta gF3 < 0.8150 \quad (7)$$

$$2.0 < b3 < 2.4 \text{ (provided that } nd3 > 1.3) \quad (8)$$

$$10 < vd3 < 35 \quad (9)$$

where, vd1 denotes Abbe's number (nd1−1)/(nF1−nC1) of the lens L1, vd2 denotes Abbe's number (nd2−1)/(nF2−nC2) of the intermediate layer L2, and vd3 denotes Abbe's number (nd3−1)/(nF3−nC3) of the lens L3, θgF3 denotes a partial dispersion ratio (ng3−nF3)/(nF3−nC3) of the lens L3, where, nd1, nC1, and nF1 denote refractive indices of the lens L1 for a d-line, a C-line, and an F-line respectively, nd2, nC2, and nF2 denote refractive indices of the intermediate layer L2 for the d-line, the C-line, and the F-line respectively, and nd3, nC3, and nF3 denote refractive indices of the lens L3 for the d-line, the C-line, and the F-line respectively.

\* \* \* \* \*